US006156845A

United States Patent [19]

Saito et al.

[11] Patent Number: 6,156,845

[45] **Date of Patent: *Dec. 5, 2000**

[54] POLYOLEFIN COMPOSITION AND METHOD OF MAKING

[75] Inventors: Jun Saito, Chiba; Hideo Nobuhara, Kumamoto; Shingo Kikukawa, Chiba; Hitoshi Sato, Chiba; Akira Yamauchi, Chiba, all of Japan

[73] Assignee: Chisso Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,863

[22] PCT Filed: Oct. 17, 1996

[86] PCT No.: PCT/JP96/03028

§ 371 Date: Apr. 2, 1997

§ 102(e) Date: Apr. 2, 1997

[87] PCT Pub. No.: WO94/14725

PCT Pub. Date: Apr. 24, 1997

[30] Foreign Application Priority Data

| | | | |
|---|---|---|---|
| Oct. 18, 1995 | [JP] | Japan | 7-269920 |
| Oct. 18, 1995 | [JP] | Japan | 7-269921 |
| Oct. 18, 1995 | [JP] | Japan | 7-269922 |
| Oct. 18, 1995 | [JP] | Japan | 7-269923 |
| Oct. 18, 1995 | [JP] | Japan | 7-269924 |
| Oct. 18, 1995 | [JP] | Japan | 7-269925 |
| Aug. 9, 1996 | [JP] | Japan | 8-210888 |
| Aug. 9, 1996 | [JP] | Japan | 8-210889 |

[51] Int. Cl.[7] .......... C08L 23/00; C08L 23/16; C08F 255/02; C08F 255/08

[52] U.S. Cl. .......... 525/240; 525/320; 525/324

[58] Field of Search .......... 525/240, 320, 525/324

[56] References Cited

U.S. PATENT DOCUMENTS

| | | | |
|---|---|---|---|
| 4,460,757 | 7/1984 | Sato et al. | 502/108 |
| 5,155,080 | 10/1992 | Elder et al. . | |
| 5,252,529 | 10/1993 | Ueda et al. . | |
| 5,260,384 | 11/1993 | Morimoto et al. | 525/240 |
| 5,382,631 | 1/1995 | Stehling et al. . | |
| 5,387,568 | 2/1995 | Ewen et al. . | |
| 5,494,982 | 2/1996 | Nakacho et al. | 526/65 |
| 5,519,100 | 5/1996 | Ewen et al. . | |
| 5,539,067 | 7/1996 | Parodi et al. | 526/125.3 |
| 5,561,092 | 10/1996 | Ewen et al. . | |
| 5,614,457 | 3/1997 | Ewen et al. . | |
| 5,629,254 | 5/1997 | Fukuoka et al. . | |
| 5,663,249 | 9/1997 | Ewen et al. . | |
| 5,854,354 | 12/1998 | Ueda et al. . | |
| 6,004,897 | 12/1999 | Imuta et al. . | |

FOREIGN PATENT DOCUMENTS

| | | |
|---|---|---|
| 0 398 350 | 11/1990 | European Pat. Off. . |
| 0 534 119 | 3/1993 | European Pat. Off. . |
| 0 536 503 | 4/1993 | European Pat. Off. . |
| 0 538 749 | 4/1993 | European Pat. Off. . |
| 0 579 510 | 1/1994 | European Pat. Off. . |
| 0 580 033 | 1/1994 | European Pat. Off. . |
| 0 714 923 | 6/1996 | European Pat. Off. . |
| 32 46 447 | 7/1983 | Germany . |
| 63-12606 | 1/1988 | Japan . |
| 3-12406 | 1/1991 | Japan . |
| 3-12407 | 1/1991 | Japan . |
| 3-50239 | 3/1991 | Japan . |
| 5-140224 | 6/1993 | Japan . |
| 5-255436 | 10/1993 | Japan . |
| 5-255437 | 10/1993 | Japan . |
| 6-206923 | 7/1994 | Japan . |
| 6-206939 | 7/1994 | Japan . |
| 6-234812 | 8/1994 | Japan . |
| 7-188317 | 7/1995 | Japan . |
| 7-188336 | 7/1995 | Japan . |
| 7-238114 | 9/1995 | Japan . |
| 8-217816 | 8/1996 | Japan . |
| 10-017736 | 1/1998 | Japan . |
| WO 88/05792 | 8/1988 | WIPO . |
| WO 88/05793 | 8/1988 | WIPO . |
| WO 94/28034 | 12/1994 | WIPO . |

OTHER PUBLICATIONS

Flory, "Principes of Polymer Chemistry", Cornell University Press, Inthaca, NY, pp. 311–314 (1953).

Takaya Mise et al., "Excellent Stereoregular Isotactic Polymerizations of Propylene with $C_2$–Symmetric Silylene–Bridged Metallocene Catalysts" *Chemistry Letters*, pp. 1853–1856.

Walter Spaleck et al., "The Influence of Aromatic Substituents on the Polymerization Behavior of Bridged Zirconocene Catalysts" *Organometallics*, vol. 13, No. 3 (American Chemical Society), pp. 954–963.

A. Zambelli, et al., Model Compounds and C NMR Observation of Stereosequences of Polypropylene, 1975, pp. 687–689, Macromolecules vol. 8, No. 5.

A. Zambelli, et al., Carbon–13 Observations of the Stereochemical Configuration of Polypropylene, 1973, pp. 925–926, Macromolecules vol. 6, No. 6.

Kaminsky, *Metallocene Catalysts*, Dec. 7–8–9, 1992.

*Primary Examiner*—Donald R. Wilson
*Attorney, Agent, or Firm*—Merchant & Gould P.C.

[57] ABSTRACT

An olefin (co-)polymer composition including 0.01 to 5.0 weight parts of high molecular weight polyethylene which is an ethylene homopolymer or an ethylene-olefin copolymer containing 50 weight % or more of an ethylene polymerization unit; and 100 weight parts of an olefin (co-)polymer other than the high molecular weight polyethylene, wherein said high molecular weight polyethylene has an intrinsic viscosity $[\eta_E]$ of 15 to 100 dl/g measured in tetralin at 135° C. or more, and said high molecular weight polyethylene exists as dispersed fine particles having a numerical average particle size of 1 to 5000 nm.

33 Claims, 11 Drawing Sheets

0.2 μm 0.2 μm 0.2 μm 0.2 μm

POLYOLEFIN COMPOSITION AND METHOD OF MAKING

POLYOLEFIN COMPOSITION AND METHOD OF MAKING

TECHNICAL FIELD

The present invention relates to an olefin (co-)polymer composition and a method for producing the same, and to a catalyst for olefin (co-)polymer polymerization and a method for producing the same. More particularly, the present invention relates to a preliminarily activated catalyst for olefin (co-) polymerization which is obtained by causing a catalyst for producing polyolefin having, as a main component, a transitional metal compound catalyst component containing at least a titanium compound to support polyolefin to be polymerized and polyolefin having a high degree of polymerization and a method for producing the preliminarily activated catalyst for olefin (co-) polymerization, and to a catalyst for olefin (co-) polymerization having the preliminarily activated catalyst as a main component, and a polyolefin composition having high melt tension and high crystallization temperature which uses the catalyst for olefin (co-)polymerization, and a method for producing the same.

BACKGROUND OF THE INVENTION

Since a polyolefin such as polypropyrene, high-density polyethylene, straight chain low-density polyethylene or the like is excellent in mechanical properties, chemical resistance and the like and is very useful in respect of a balance of economy, it has been widely utilized in every molding field. However, the polyolefin has small melt tension and a low crystallization temperature. For this reason, molding properties such as hollow molding, foam molding, extrusion molding and the like are poor and the high-speed productivity of a mold has limitations in various molding methods.

A method for causing polypropylene to react with organic peroxide and a crosslinking auxiliary agent in the melting state (Japanese Unexamined Patent Publication Nos. 59-93711, 61-152754 and the like), a method in which a low decomposition temperature peroxide is caused to react with semicrystalline polypropylene in the absence of oxygen to produce polypropylene which has free end long chain branch and does not contain gel (Japanese Unexamined Patent Publication No. 2-298536) and the like have been disclosed as a method for increasing the melt tension and crystallization temperature of polypropylene.

A composition in which polyethylene having different intrinsic viscosity or molecular weight or polypropylene are blended and a method for producing the same composition by multistep polymerization have been proposed as another method for enhancing melt viscoelasticity such as melt tension or the like.

There have been disclosed a method for adding 2 to 30 weight parts of superhigh molecular weight polypropylene to 100 weight parts of ordinary polypropylene and extruding a product at a temperature which is equal to or higher than a melting point and equal to or lower than 210° C. (Japanese Examined Patent Publication No. 61-28694), a method of preparing an extrusion sheet made of polypropylene which is obtained by a multistep polymerizing method and contains 2 components having the limiting viscosity ratio of 2 or more and different molecular weights (Japanese Examined Patent Publication No. 1-12770), a method for producing a polyethylene composition which contains 1 to 10 weight % of polyethylene having high viscosity-average molecular weight and comprises three kinds of polyethylene having different viscosity-average molecular weights by a melting and kneading method or a multistep polymerizing method (Japanese Examined Patent Publication No. 62-61057), a method for polymerizing superhigh molecular weight polyethylene having a limiting viscosity of 20 dl/g or more with 0.05 to less than 1 weight % according to a multistep polymerizing method using an active titanium-vanadium solid catalyst component (Japanese Examined Patent Publication No. 5-79683), a method for polymerizing 0.1 to 5 weight % of superhigh molecular weight polyethylene having a limiting viscosity of 15 dl/g or more by using an active titanium catalyst component which has preliminarily been polymerized with 1-butene or 4-methyl-1-pentene according to a multistep polymerizing method using a polymerization container having a special arrangement (Japanese Examined Patent Publication No. 7-8890) and the like.

Furthermore, there have been disclosed a method for producing polypropylene having high melt tension in which propylene is polymerized with a support type titanium-containing solid catalyst component and an organic aluminum compound catalyst component by using a preliminary polymerization catalyst which is prepared by preliminarily polymerizing ethylene and a polyene compound (Japanese Unexamined Patent Publication No. 5-222122), and a method for producing an ethylene-α-olefin copolymer having high melt tension by using an ethylene containing a preliminary polymerization catalyst which contains polyethylene having a limiting viscosity of 20 dl/g or more that is obtained by preliminarily polymerizing only ethylene using the same catalyst component (Japanese Unexamined Patent Publication No. 4-55410).

According to various compositions and producing methods which have been proposed in the prior art, the melt tension can be enhanced to some extent but the residual odor of a crosslinking auxiliary agent, crystallization temperature, thermal stability and the like should be improved.

The process for manufacturing high molecular weight polyolefin should be modified for the following reasons. More specifically, it is hard to precisely control the amount of olefin (co-)polymerization in order to generate a small amount of polyolefin having a high molecular weight in the multistep polymerizing method which is to be incorporated into the ordinary olefin (co-)polymerizing step for polymerization. In addition, the polymerization temperature should be lowered to generate polyolefin having a molecular weight which is sufficiently great. Furthermore, the productivity of the final polyolefin composition is lowered.

In the method for preliminarily polymerizing a polyene compound, it is necessary to prepare a polyene compound separately. In the method for preliminarily polymerizing polyethylene, the dispersibility of the preliminarily polymerized polyethylene to the polyolefin which is finally obtained is non-uniform. Consequently, further improvement should be required in respect of the stability of the polyolefin composition.

According to the prior art, the melt tension and the crystallization temperature of polyolefin are insufficiently enhanced as described above. In addition, there are problems to be solved with respect to odor and thermal stability. Furthermore, it is necessary to enhance the productivity of such polyolefin.

SUMMARY OF THE INVENTION

It is an object of the present invention to provide a polyolefin compound having high melt tension and high crystallization temperature which is suitable for hollow molding, foam molding and extrusion molding and can show high speed production for various molding processes, and a method for producing the same polyolefin composition.

It is another object of the present invention to provide a catalyst for olefin (co-)polymerization to be used for producing the polyolefin composition, and a method for producing the same catalyst.

As a result of investigation to accomplish the above-mentioned objects, the present inventors have found that olefin is (co-)polymerized by using a preactivated catalyst by causing a catalyst for producing polyolefin to support a small amount of polyolefin having a specific intrinsic viscosity to be (co-) polymerized and a small amount of polyolefin having a specific high intrinsic viscosity so that a polyolefin composition having high melt tension and high crystallization temperature is obtained. Thus, the present invention has been completed.

A first aspect of the invention is an olefin (co-)polymer composition comprising: 0.01 to 5.0 weight parts of high molecular weight polyethylene which is an ethylene homopolymer or an ethylene-olefin copolymer containing 50 weight % or more of an ethylene polymerization unit; and 100 weight parts of an olefin (co-)polymer other than the high molecular weight polyethylene, wherein the high molecular weight polyethylene has an intrinsic viscosity $[\eta_E]$ of 15 to 100 dl/g measured in tetralin at 135° C. or more, and the high molecular weight polyethylene exists as dispersed fine particles having a numerical average particle size of 1 to 5000 nm.

It is preferable that the intrinsic viscosity $[\eta_E]$ is 15 to 50 dl/g, and more preferably, 17 to 50 dl/g. It is preferable that the amount of the high molecular weight polyethylene is 0.02 to 2.0 weight parts, and more preferably, 0.05 to 1.0 weight part. It is preferable that the numerical average particle size of the high molecular weight polyethylene is 1 to 1000 nm, and more preferably, 10 to 500 nm.

In the first aspect of the invention, it is preferable in the olefin (co-)polymer composition that the intrinsic viscosity $[\eta_r]$ of the olefin (co-)polymer composition that is measured in tetralin at 135° C. is 0.2 to 10 dl/g. It is preferable that the intrinsic viscosity $[\eta_r]$ is 0.2 to 8 dl/g, and more preferably 0.7 to 5 dl/g.

In the first aspect of the invention, it is preferable in the olefin (co-)polymer composition that the olefin (co-)polymer other than the high molecular weight polyethylene is at least one selected from the group consisting of a propylene homopolymer and a propylene-olefin copolymer containing of 50 weight % or more of a propylene polymerization unit.

In the first aspect of the invention, it is preferable in the olefin (co-)polymer composition that the following relationship is satisfied in the bulk state where no rubber component or inorganic filler is present, as expressed by the following formula:

$$\log (G'(\omega=10^0))-\log(G'(\omega=10^{-2}))<2,$$

a storage modulus being $G'(\omega=10^0)$ with a frequency of $\omega=10^0$ for a molten product of 230° C. and a storage modulus is $G'(\omega=10^{-2})$ with a frequency of $\omega=10^{-2}$ In the first aspect of the invention, it is preferable in the olefin (co-)polymer composition that the following relationship is satisfied in the state where electron beam radiation is not performed:

$$\log(N_1)>-\log(MFR)+5$$

a first normal stress difference being expressed by $N_1$ with a shear rate of $4\times10^{-1}$ (sec $^{-1}$) at 190° C., a metal flow rate (unit: g/10 min) being expressed by MFR. In the composition of the present invention, the influence on $N_1$ by the temperature in the measurement is small in the range of 190° C. to 250° C.

In the first aspect of the invention, it is preferable in the olefin (co-)polymer composition that the following relationship is satisfied at 190° C. and 250° C.:

$$(N_1(190° C.)-N_1(250° C.))/N_1(190° C.)<0.6$$

a first normal stress difference being expressed by $N_1$ (190° C.) and $N_1$(250° C.) with a shear rate of $4\times10^{-1}$ ($sec^{-1}$).

In the first aspect of the invention, it is preferable in the olefin (co-)polymer composition that the following relationship is satisfied at 190° C. and 250° C.:

$$(MS(190° C.)-MS(250° C.))/MS(190° C.)<3.1$$

a melt tension being expressed by MS (190° C.) and MS(250° C.) with a shear rate of $3\times10^{-1}$ ($sec^{-1}$).

In the first aspect of the invention, it is preferable in the olefin (co-)polymer composition that the following relationship is satisfied:

$$(G(t=10)-G(t=300))/G(t=10)<1$$

a relaxation elastic modulus being expressed by G (t=10) with t=10 (sec), and a relaxation elastic modulus being expressed by G (t=300) with t=300 (sec) on the condition of 500% of a strain of the molten product at 230° C.

In the first aspect of the invention, it is preferable in the olefin (co-)polymer composition that rapid growth of elongational viscosity occurs in a large deformation region. The term "large deformation region" means a region of an elongational viscosity—time curve showing the relationship between the elongational viscosity of a molten product and the time of applying an elongational strain to the molten product at a constant strain rate, in which the elongational viscosity increases rapidly after a critical time.

In the first aspect of the invention, it is preferable in the olefin (co-)polymer composition that the high molecular weight polyethylene fine particles are added before or during olefin (co-)polymerization.

In the first aspect of the invention, it is preferable in the olefin (co-)polymer composition that the olefin (co-)polymer is a propylene homopolymer or a propylene-olefin copolymer containing 50 weight % or more of a propylene polymerization unit, and the olefin (co-)polymer composition satisfies the following relationship between a melt tension (MS) at 230° C. and an intrinsic viscosity $[\eta_E]$ measured in tetralin at 135° C.:

$$\log(MS)>4.24\times\log[\eta_T]-1.20.$$

In the first aspect of the invention, it is preferable in the olefin (co-)polymer composition that the olefin (co-)polymer is a propylene homopolymer or a propylene-olefin copolymer containing 50 weight % or more of a propylene polymerization unit, and the olefin (co-)polymer composition satisfies the following relationship between a melt tension (MS) at 230° C. and an intrinsic viscosity $[\eta_E]$ measured in tetralin at 135° C.:

$$4.24\times\log[\eta_T]+0.24>4.24\times\log[\eta_T]-1.10.$$

In the first aspect of the invention, it is preferable in the olefin (co-)polymer composition that the olefin (co-)polymer is an ethylene homopolymer or an ethylene-olefin copolymer containing 50 weight % of an ethylene polymerization unit.

In the first aspect of the invention, it is preferable in the olefin (co-)polymer composition that 0.001 to 2 weight parts of at least one stabilizer selected from the group consisting of a phenol antioxidant and a phosphoric antioxidant is added to 100 weight parts of the olefin (co-)polymer composition.

In the first aspect of the invention, it is preferable in the olefin (co-)polymer composition that the olefin (co-)polymer other than high molecular polyethylene is a propylene homopolymer or a propylene-olefin copolymer containing 50 weight % or more of a propylene polymerization unit, the olefin (co-)polymer other than high molecular polyethylene is produced by polymerizing propylene or by copolymerizing propylene and another olefin having 2 to 12 carbon atoms in the presence of a preactivated catalyst comprising an olefin producing catalyst and a polyethylene supported by the olefin producing catalyst, and the olefin producing catalyst is formed by the combination of a transitional metal compound catalyst component containing at least a titanium compound, 0.01 to 1000 mol of an organic metal compound (AL1) selected from the group consisting of a metal that belongs to group I, group II, group XII and group XIII of the periodic table published in 1991 with respect to 1 mol of the transitional metal atom, and 0 to 500 mol of an electron donor (E1) with respect to 1 mol of the transitional metal atom.

In the first aspect of the invention, it is preferable in the olefin (co-)polymer composition that the composition is obtained by polymerizing or copolymerizing either propylene alone or a combination of propylene and an olefin having 2 to 12 carbons in the presence of the preactivated catalyst, that the preactivated catalyst further comprises an organic metal compound (AL2) and an electron donor (E2), the organic metal compound (AL2) is a compound of a metal selected from the group consisting of metals belonging to Groups I, II, XII and XIII of the periodic table issued in 1991, the content of the organic metal compounds (AL1) and (AL2) is 0.05 to 5000 mole per mole of the transitional metal atom in the preactivated catalyst, and the content of the electron donors (E1) and (E2) is 0 to 3000 mole per mole of the transitional metal atom in the preactivated catalyst.

In the first aspect of the invention, it is preferable in the olefin (co-)polymer composition that the preactivated catalyst supports 0.01 to 5,000 g of polyethylene with an intrinsic viscosity $[\eta_E]$ of 15 to 100 dl/g measured in tetralin at 135° C. for 1 g of the transitional metal compound catalyst component. It is preferable that the amount of polyethylene supported for 1 g of the transitional metal compound catalyst component is 0.05 to 2000 g, and more preferably, 0.1 to 1000 g.

In the first aspect of the invention, it is preferable in the olefin (co-)polymer composition that the preactivated catalyst supports 0.01 to 100 g of polypropylene (B) and 0.01 to 5000 g of polyethylene (A) per gram of the transitional metal compound catalyst component, the polypropylene (B) has an intrinsic viscosity $[\eta_B]$ of less than 15 dl/g measured in tetralin at 135° C, and is a propylene homopolymer or a propylene-olefin copolymer comprising a propylene polymerization unit at the rate of 50 wt % or more, and the polyethylene (A) has an intrinsic viscosity $[\eta_E]$ of 15 to 100 dl/g measured in tetralin at 135° C. It is preferable that the intrinsic viscosity $[\eta_B]$ of the preliminarily polymerized polypropylene is 0.2 to 8 dl/g, and more preferably, 0.5 to 8 dl/g. The amount of the preliminarily polymerized polypropylene for 1 g of the transitional metal compound catalyst component is 0.01 to 50 g, and more preferably, 0.5 to 50 g. Furthermore, it is preferable that the content of the preliminarily polymerized polypropylene is 0.001 to 2 weight %, and more preferably 0.005 to 1.5 weight %, and most preferably 0.001 to 1 weight %.

In the first aspect of the invention, it is preferable in the olefin (co-)polymer composition that the olefin (co-)polymer other than high molecular polyethylene is produced by using 0.01 to 1,000 mmol of catalyst converted into a transitional metal atom in a catalyst for 1 liter of (co-)polymerization volume of propylene or another olefin.

In the first aspect of the invention, it is preferable in the olefin (co-)polymer composition that the olefin (co-)polymer other than high molecular polyethylene is produced by mixing a) a propylene homopolymer or a propylene-olefin copolymer which contains 50 weight % or more of a propylene polymerization unit, the propylene homopolymer or propylene-olefin copolymer is produced by polymerizing only propylene or by polymerizing or copolymerizing propylene and another olefin having 2 to 12 carbon atoms in the presence of a preactivated catalyst containing an olefin producing catalyst and polyethylene supported by the olefin producing catalyst, the olefin producing catalyst is formed by the combination of a transitional metal compound catalyst component containing at least a titanium compound, 0.01 to 1.000 mol of an organic metal compound (AL1) selected from a group consisting of metals that belong to group I, group II, group XII and group XIII of the periodic table published in 1991 with respect to 1 mol of the transitional metal atom, and 0 to 500 mol of an electron donor (E1) with respect to 1 mol of the transitional metal atom, and b) a propylene homopolymer or a propylene-olefin copolymer which contains 50 weight % of a propylene polymerization unit.

The second aspect of the invention is a method for producing an olefin (co-)polymer composition comprising the step of polymerizing or copolymerizing olefin in the presence of a preactivated catalyst comprising a polyolefin preparing catalyst and a polyethylene to form an olefin (co-)polymer, wherein the polyolefin preparing catalyst comprises (i) a transitional metal compound catalytic component including at least a titanium compound, (ii) an organic metal compound (AL1) and (iii) an electron donor (E1), the organic metal compound (AL1) is a compound of a metal selected from the group consisting of metals belonging to Groups I, II, XII and XIII according to the periodic table issued in 1991, the content of the metal organic compound (AL1) is 0.01 to 1000 mole per mole of the transitional metal atom, the content of the electron donor (E1) is 0 to 500 mole per mole of the transition metal atom, and wherein the polyethylene is supported by the polyolefin preparing catalyst and comprises ethylene homopolymer or a ethylene-olefin copolymer comprising an ethylene polymerization unit at the rate of 50 wt % or more, the content of polyethylene supported is 0.01 to 5000 g per gram of the transitional metal compound catalytic component, and the polyethylene has an intrinsic viscosity $[\eta]$ of 15 to 100 dl/g measured in tetralin at 135° C.

In the second aspect of the invention, it is preferable in the method for producing an olefin (co-)polymer composition that the olefin to be polymerized or copolymerized is propylene or an olefin having 2 to 12 carbon atoms, and the olefin (co-)polymer is a propylene homopolymer or a propylene-olefin copolymer comprising 50 weight % or more of a propylene polymerization unit and an olefin having 2 to 12 carbon atoms.

In the second aspect of the invention, it is preferable that the method for producing an olefin (co-)polymer composition further comprises a step of adding an organic aluminum compound and an electron donor (E2) to the preactivated catalyst, that the content of the organic metal compound (AL1) and the organic aluminum compound (AL2) in the preactivated catalyst is 0.05 to 5,000 molar parts with respect to 1 mol of titanium atom, and the content of the electron donors (E1) and (E2) in the preactivated catalyst is 0 to 3,000 molar parts with respect to 1 mol of titanium atom in the preactivated catalyst.

In the second aspect of the invention, it is preferable in the method for producing an olefin (co-)polymer composition that the amount of titanium atom in the catalyst is 0.01 to 1,000 mmol for 1 liter of olefin (co-)polymerization volume.

In the second aspect of the invention, it is preferable in the method for producing an olefin (co-)polymer composition that the preactivated catalyst comprises 0.01 to 100 g of polypropylene (B) per gram of the transitional metal compound catalyst component, and the polypropylene (B) has an intrinsic viscosity $[\eta_B]$ of less than 15 dl/g measured in tetralin at 135° C., and is a propylene homopolymer or a propylene-olefin copolymer comprising a propylene polymerization unit at the rate of 50 wt % or more.

In the second aspect of the invention, it is preferable in the method for producing an olefin (co-)polymer composition that the amount of the transitional metal atom in the catalyst is 0.01 to 1,000 mmol for 1 liter of olefin (co-) polymerization volume.

In the second aspect of the invention, it is preferable in the method for producing an olefin (co-)polymer composition that the method comprises the steps of: (a) a preliminary (co-) polymerization process comprising polymerizing or copolymerizing olefin in the presence of a polyolefin preparing catalyst to form 0.01 to 100 g of polyolefin (B) having an intrinsic viscosity $[\eta]$ of less than 15dl/g measured in tetralin at 135° C. per gram of the transition metal compound catalyst component, the polyolefin preparing catalyst comprises (i) a transitional metal compound catalytic component including at least a titanium compound, (ii) an organic metal compound (AL1) and (iii) an electron donor (E1), the organic metal compound (AL1) is a compound of a metal selected from the group consisting of metals belonging to Groups I, II, XII and XIII according to the periodic table issued in 1991, the content of the metal organic compound (AL1) is 0.01 to 1000 mol per mol of the transitional metal atom, the content of the electron donor (E1) is 0 to 500 mole per mole of the transitional metal atom; (b) a preliminary activation (co-) polymerization process comprising polymerizing or copolymerizing olefin to form 0.01 to 100 g of polyolefin (A) having an intrinsic viscosity $[\eta]$ of 15 to 100 dl/g measured in tetralin at 135° C. per gram of the transitional metal compound catalyst component; and (c) a main (co-)polymerization process comprising polymerizing olefin having 2 to 12 carbons in the presence of a preactivated catalyst for polymerizing olefin, the preactivated catalyst is obtained by letting the transitional metal compound catalyst component support polyolefins (B) and (A).

In the second aspect of the invention, it is preferable in the method for producing an olefin (co-)polymer composition that the method comprises the step of polymerizing or copolymerizing olefin in the presence of: (a) a preactivated catalyst for polymerizing or copolymerizing olefin which is obtained by a method for letting the transitional metal compound catalyst component support polyolefins (B) and (A) comprising the steps of: a preliminary (co-) polymerization process comprising polymerizing or copolymerizing olefin in the presence of a polyolefin preparing catalyst to form 0.01 to 100 g of polyolefin (B) having an intrinsic viscosity $[\eta]$ of less than 15 dl/g measured in tetralin at 135° C. per gram of the transitional metal compound catalyst component, the polyolefin preparing catalyst comprising (i) a transitional metal compound catalytic component including at least a titanium compound, (ii) an organic metal compound (AL1) and (iii) an electron donor (E1), the organic metal compound (AL1) is a compound of a metal selected from the group consisting of metals belonging to Groups I, II, XII and X III according to the periodic table issued in 1991, the content of the metal organic compound (AL1) being 0.01 to 1000 mole per mole of the transitional metal atom, the content of the electron donor (E1) being 0 to 500 mole per mole of the transitional metal atom; and a preliminary activation (co-)polymerization process comprising polymerizing or copolymerizing olefin to form 0.01 to 100 g of polyolefin (A) having an intrinsic viscosity $[\eta]$ of 15 to 100 dl/g measured in tetralin at 135° C. per gram of the transitional metal compound catalyst component, (b) an organic metal compound (AL2) which is a compound of a metal selected from the group consisting of metals belonging to Groups I, II, XII and X III according to the periodic table issued in 1991, the content of the metal organic compounds (AL1) and (AL2) is 0.05 to 5000 mole per mol of the transitional metal atom in the preactivated catalyst, and (c) an electron donor (E2), the content of the electron donors (E1) and (E2) being 0 to 3000 mole per mol of the transitional metal atom.

In the second aspect of the invention, it is preferable that the method for producing an olefin (co-)polymer composition further comprises a step of adding 0.001 to 2 weight parts of at least one stabilizer selected from the group consisting of a phenolic antioxidant and a phosphoric antioxidant to the olefin (co-)polymer after (co-)polymerizing an olefin.

In the second aspect of the invention, it is preferable to produce an olefin (co-)polymer, comprising a step of adding 0 to 10,000 weight parts of an olefin (co-)polymer obtained by a known method to 100 weight parts of an olefin (co-)polymer composition obtained by the method as defined in the second aspect of the invention, preferably 0 to 5,000 weight parts, and more preferably 0 to 2,000 weight parts.

The third aspect of the invention is a catalyst for olefin (co-)polymerization comprising a transitional metal compound catalyst which contains at least a titanium compound and an olefin (co-)polymer (A) supported by the catalyst, wherein the olefin (co-)polymer (A) has an intrinsic viscosity $[\eta]$ of 15 dl/g to 100 dl/g measured in tetralin at 135° C., and the content of the olefin (co-)polymer (A) is 0.01 to 5,000 g for 1 g of a titanium containing solid catalyst component.

The forth aspect of the invention is a method for producing a catalyst for olefin (co-)polymerization, comprising the step of polymerizing or copolymerizing olefin in the presence of a polyolefin preparing catalyst to form olefin (co-) polymer (A) having an intrinsic viscosity $[\eta]$ of 15 to 100 dl/g measured in tetralin at 135° C. and to let a titanium containing solid catalytic component support 0.01 to 5000 g of the olefin (co-) polymer (A) per gram of titanium containing solid catalytic component, wherein the polyolefin preparing catalyst comprises (i) a transitional metal compound catalytic component including at least a titanium compound, (ii) an organic metal compound (AL1) and (iii) an electron donor (E1), the content of the organic metal compound (AL1) is 0.01 to 1000 mole per mol of titanium atom, and the content of the electron donor (E1) is 0 to 500 mole per mol of titanium atom.

In the third and fourth aspects of the invention, it is preferable in the catalyst for olefin (co-)polymerization that the transitional metal compound catalyst component is obtained by the combination of 0.01 to 1,000 mol of an organic metal compound (AL1) selected from group I, group II, group XII and group XIII of the periodic table published in 1991 with respect to 1 mol of the transitional metal atom and 0 to 500 mol of an electron donor (E1) with respect to 1 mol of the transitional metal atom.

In the third and fourth aspects of the invention, it is preferable in the catalyst for olefin (co-)polymerization that the olefin (co-)polymer (A) is an ethylene homopolymer or an ethylene-olefin copolymer which contains 50% or more of an ethylene polymerization unit.

In the third and fourth aspects of the invention, it is preferable that the catalyst for olefin (co-)polymerization further comprises an organic aluminum compound and an electron donor (E1), that the content of the organic aluminum compound is 0.01 to 1,000 mole per mol of titanium atom in the catalyst, and the content of the electron donor (E1) is 0 to 500 mole per mol of titanium atom in the catalyst.

In the third and fourth aspects of the invention, it is preferable in the catalyst for olefin (co-)polymerization that a polyolefin (B) to be (co-)polymerized is formed on a layer which is lower than the polyolefin (A) to be (co-) polymerized, polyolefin (B) has an intrinsic viscosity [η] of less than 15 dl/g measured in tetralin at 135° C. and the content of the polyolefin (B) is 0.01 to 100 g for 1 g of a transitional metal compound component.

In the third and fourth aspects of the invention, it is preferable in the catalyst for olefin (co-)polymerization that the transitional metal compound catalyst component is a titanium containing solid catalyst component whose main component is a titanium trichloride composition or titanium tetrachloride.

In the third and fourth aspects of the invention, it is preferable in the catalyst for olefin (co-)polymerization that the organic metal compound (AL1) is an organic aluminum compound.

In the third and fourth aspects of the invention, it is preferable in the catalyst for olefin (co-)polymerization that the electron donor (E1) is an organic compound containing oxygen, nitrogen, phosphorus or sulfur in a molecule, or an organic silicon compound having Si—O—C bonding in a molecule.

In the third and fourth aspects of the invention, it is preferable in the catalyst for olefin (co-)polymerization that the polyolefin (B) is a homopolymer or copolymer of an olefin having 2 to 12 carbon atoms.

In the third and fourth aspects of the invention, it is preferable that the catalyst for olefin (co-)polymerization further comprises an electron donor (E2), that the content of the electron donors (E1) and (E2) is 0 to 3,000 mole per mol of the transitional metal atom in the catalyst.

In the third and fourth aspects of the invention, it is preferable in the catalyst for olefin (co-)polymerization that the electron donor (E2) is an organic compound containing oxygen, nitrogen, phosphorus or sulfur in a molecule, or an organic silicon compound having Si—O—C bonding in a molecule.

In the third and fourth aspects of the invention, it is preferable that the catalyst for olefin (co-)polymerization further comprises an organic metal compound (AL2) and an electron donor (E2), that the organic metal compound (AL2) comprises a metal selected from the group consisting of metals that belong to group I, group II, group XII and group XIII of the periodic table published in 1991, the content of the organic metal compounds (AL1) and (AL2) is 0.05 to 5,000 mole with respect to 1 mole of a transitional metal atom in the preactivated catalyst, and the content of the electron donors (E1) and (E2) is 0 to 3000 mole wit respect to 1 mole of a transitional metal atom in the preactivated catalyst.

PREFERRED EMBODIMENTS OF THE INVENTION

Figure 1:
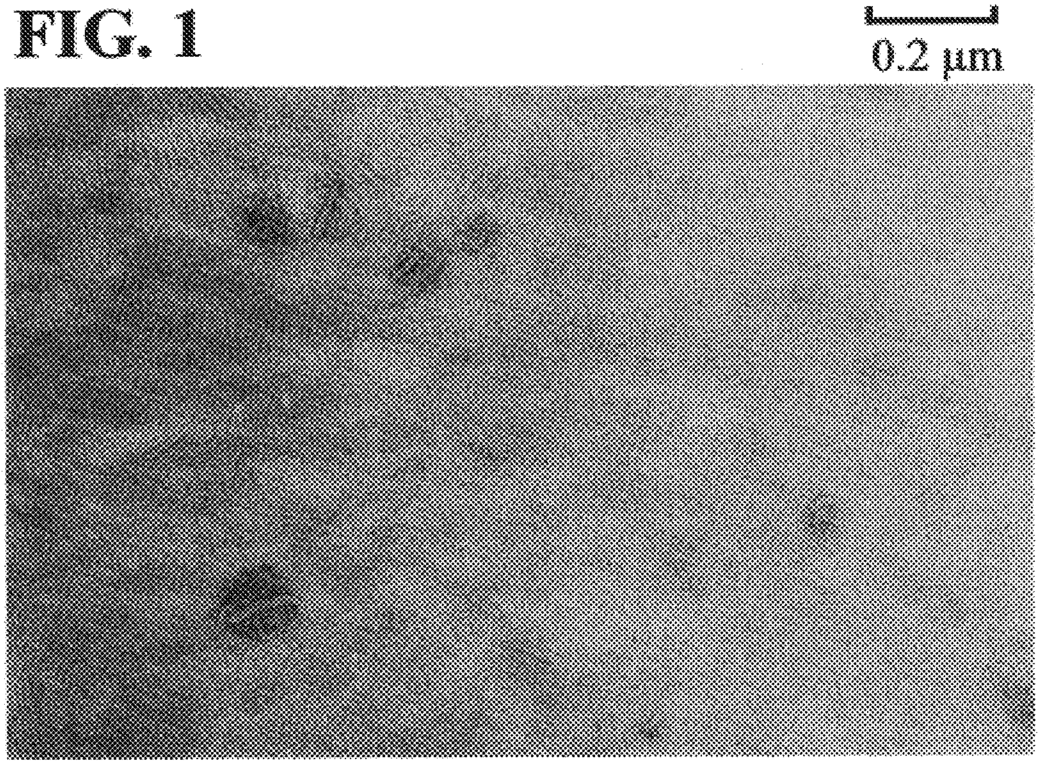
FIG. 1 is a photograph at 75000× magnification that is obtained by observing a polymer composition according to Example 26 of the present invention by means of a transmission electron microscope (TEM)

In the specification, the term “polyolefins” refers to olefin polymers including (i) olefin homopolymers comprising olefin monomers having 2 to 12 carbon atoms, (ii) olefin random copolymers comprising at least 2 olefin monomers, and (iii) olefin block copolymers comprising at least 2 olefin monomers. The terms “polyethylenes”, “ethylene polymers” and “ethylene copolymers” are meant to include ethylene polymers and ethylene copolymers including (i) ethylene homopolymers, (ii) ethylene-olefin random copolymers containing ethylene monomers at the rate of 50 wt % or more, and (iii) ethylene-olefin block copolymers containing ethylene monomers at the rate of 50 wt % or more. The term “polypropylenes” refers to (i) polypropylene homopolymers, (ii) propylene-olefin random copolymers containing propylene monomers at the rate of 50 wt %, and (iii) propylene-olefin block copolymers containing propylene monomers at the rate of 50 wt %. The term “polyolefin composition” refers to a mixture of polyolefins different from each other in the kind of monomers, the molecular weight, the randomness, the blocking unit and the like. The term “preliminary activation” means activation of a polyolefin-preparing catalyst in activity prior to polymerization or copolymerization of olefin. The preliminary activation is performed by polymerizing or copolymerizing olefin in the presence of a polyolefin-preparing catalyst to preliminarily activate for making the catalyst support a polymerized or copolymerized olefin. The term "preactivated catalyst" means a catalyst comprising a conventional polyolefin-preparing catalyst and a small amount of at least two polyolefins. Those two polyolefins are a polyolefin to polymerize having a specific intrinsic viscosity and a polyolefin having a specific and high intrinsic viscosity. The preactivated catalyst is preliminarily activated by making the polyolefin-preparing catalyst support the above two polyolefins. The conventional polyolefin-preparing catalyst is a catalyst for conventional use in preparing a polyolefin, and the conventional polyolefin-preparing catalyst comprises a catalytic component of a transitional metal compound including at least a titanium compound, an organic metal compound, and if required, an electron donor. The catalytic component of a transitional metal compound can be any known polyolefin-preparing catalytic component containing a catalytic component of a transitional metal compound including at least a titanium compound as a main component. A titanium-containing solid catalytic component is preferably used from among the known catalytic components in terms of manufacture. The titanium-containing solid catalytic component can be any from among titanium-containing solid catalytic components containing a titanium trichloride composition. Examples of the titanium-containing solid catalytic components include those proposed in Japanese Examined Patent Publication Nos. 56-3356, 59-28573, 63-66323 and the like, a titanium-containing supported catalytic component including titanium, magnesium, halogen and electron donor as essential components where a magnesium compound supports titanium tetrachloride proposed in Japanese Unexamined Patent Publication Nos. 62-104810, 62-104811, 62-104812, 57-63310, 57-63311, 58-83006, 58-138712 and the like.

The organic metal compound can be a compound having an organic group (a ligand) of a metal selected from the group consisting of Group I metals, Group II metals, Group X II metals and Group X III metals in terms of the periodic table issued in 1991. Examples of the compound having an organic group (a ligand) of a metal include organic lithium compounds, organic sodium compounds, organic magnesium compounds, organic zinc compounds and organic aluminum compounds. The organic metal compound can be used in combination with the above-mentioned catalytic components of a transitional metal compound. From among the examples, it is preferable to use organic aluminum compounds represented by a formula $$AlR^1_pR^2_qX_{(3-(p+q))}$$

wherein $R^1$ and $R^2$ each represent a hydrocarbon group such as alkyl group, cycloalkyl group or aryl group, or an alkoxy group, X represents a halogen atom, and p and q are a positive integer satisfying a formula $0<p+q\leqq 3$. Examples of organic aluminum compounds include trialkyl aluminums such as trimethyl aluminum, triethyl aluminum, tri-n-propyl aluminum, tri-n-butyl aluminum, tri-i-butyl aluminum, tri-n-hexyl aluminum, tri-i-hexyl aluminum or tri-n-octyl aluminum; dialkyl aluminum monohalides such as diethyl aluminum chloride, di-n-propyl aluminum chloride, di-i-butyl aluminum chloride, diethyl aluminum bromide or diethyl aluminum iodide; dialkyl aluminum hydrides such as diethyl aluminum hydride; alkyl aluminum sesquihalide such as ethyl aluminum sesquichloride; monoalkyl aluminum dihalide such as ethyl aluminum dichloride; and alkoxyalkyl aluminum such as diethoxy monoethyl aluminum, preferably trialkyl aluminum or dialkyl aluminum monohalide. Those organic aluminum compounds can be used either alone or in combination.

The electron donor is, if required, used to control the preparation rate and/or stereoregularity of the polyolefin. Examples of the electron donor include organic compounds having any of oxygen, nitrogen, sulfur and phosphorus in the molecule, such as ethers, alcohols, esters, aldehydes, fatty acids, ketones, nitriles, amines, amides, urea, isourea, isothiourea, isocyanates, azo-compounds, phosphines, phosphites, hydrogen sulfide, thioethers, neoalcohols, silanols and organic silicon compounds containing an Si—O—C bond in molecule.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether and tetrahydrofuran.

Examples of alcohols include methanol, ethanol, propanol, butanol, pentanol, hexanol, octanol, 2-ethyl hexanol, allyl alcohol, benzyl alcohol, ethylene glycol and glycerin.

Examples of phenols include phenol, cresol, xylenol, ethyl phenol and naphthol.

Examples of esters include monocarboxylic acid esters such as methyl methacrylate, methyl formate, methyl acetate, methyl butyrate, ethyl acetate, vinyl acetate, propyl-n-acetate, propyl-i-acetate, butyl formate, amyl acetate, butyl-n-acetate, octyl acetate, phenyl acetate, ethyl propionate, methyl benzoate, ethyl benzoate, propyl benzoate, butyl benzoate, octyl benzoate, 2-ethylhexyl benzoate, toluic acid methyl ester, toluic acid ethyl ester, anisic acid methyl ester, anisic acid propyl ester, anisic acid phenyl ester, ethyl cinnamate, naphthoic acid methyl ester, naphthoic acid ethyl ester, naphthoic acid propyl ester, naphthoic acid methyl ester, 2-ethylhexyl naphthoic acid, or ethyl phenylacetate; aliphatic polycarboxylic acid esters such as diethyl succinate, methylmalonic acid diethyl ester, butylmalonic acid diethyl ester, dibutyl maleate or diethyl butylmaleic acid; and aromatic polycarboxylic acid esters such as monomethyl phthalate, dimethyl phthalate, diethyl phthalate, di-n-propyl phthalate, mono-n-butyl phthalate, di-n-butyl phthalate, diisobutyl phthalate, di-n-heptyl phthalate, di-2-ethylhexyl phthalate, di-n-octyl phthalate, diethyl isophthalate, dipropyl isophthalate, dibutyl isophthalate, di-2-ethylhexyl isophthalate, diethyl terephthalate, dipropyl terephthalate, dibutyl terephthalate or naphthalenedicarboxylic acid diisobutylester.

Examples of aldehydes include acetaldehyde, propionaldehyde and benzaldehyde. Examples of carboxylic acids include monocarboxylic acids such as formic acid, acetic acid, propionic acid, butyric acid, oxalic acid, succinic acid, acrylic acid, maleic acid, valeric acid or benzoic acid; and acid anhydrides such as benzoic anhydride, phthalic anhydride or tetrahydrophthalic anhydride. Examples of ketones include acetone, methylethyl ketone, methylisobutyl ketone and benzophenone.

Examples of nitrogen containing organic compounds include nitriles such as acetonitrile or benzonitrile; amines such as methyl amine, diethyl amine, tributyl amine, triethanol amine, β-(N,N-dimethylamino)ethanol, pyridine, quinoline, α-picoline, 2,4,6-trimethyl pyridine, 2,2,5,6-tetramethyl piperidine, 2,2,5,5 -tetramethyl pyrrolidine, N,N,N',N-tetramethyl ethylenediamine, aniline or dimethyl aniline; amides such as formaldehyde, hexamethyl phosphoric acid triamide, N,N,N',N',N'-pentamethyl-N'-β-dimethylaminomethyl phosphoric acid triamide or octamethyl pyrophosphoryl amide; ureas such as N,N,N',N'-tetramethyl urea; isocyanates such as phenyl isocyanate or toluyl isocyanate; azo compounds such as azobenzene.

Examples of the phosphorus containing compounds include phosphines such as ethyl phosphine, triethyl phosphine, di-n-octyl phosphine, tri-n-octyl phosphine, triphenyl phosphine or triphenyl phosphine oxide; phosphites such as dimethyl phosphite, di-n-octyl phosphite, triethyl phosphite, tri-n-butyl phosphite or triphenyl phosphite.

Examples of the sulfur containing compounds include thioethers such as diethyl thioether, diphenyl thioether or methyl phenyl thioether; and thioalcohols such as ethyl thioalcohol, n-propyl thioalcohol or thiophenol.

Examples of the organic silicon compounds include silanols such as trimethyl silanol, triethyl silanol or triphenyl silanol; and organic silicon compounds having a Si—O—C bond, such as trimethyl methoxysilane, dimethyl dimethoxysilane, methylphenyl dimethoxysilane, diphenyl dimethoxysilane, methyltrimethoxysilane, vinyltrimethoxysilane, phenyltrimethoxysilane, trimethyl ethoxysilane, dimethyl diethoxysilane, diisopropyl dimethoxysilane, diisobutyl dimethoxysilane, diphenyl diethoxysilane, methyl triethoxysilane, ethyl triethoxysilane, vinyl triethoxysilane, cyclopentyl methyl dimethoxysilane, cyclopentyl trimethoxysilane, dicyclopentyl dimethoxysilane, cyclohexyl methyl dimethoxysilane, cyclohexyl trimethoxysilane, dicyclohexyl dimethoxysilane or 2-norbornyl methyl diethoxysilane.

The above electron donors can be used either alone or in combination.

In the preactivated catalysts for olefin polymerization, a polyolefin (A) has an intrinsic viscosity [η] in the range of 15 to 100 dl/g, preferably 17 to 50dl/g. The intrinsic viscosity [η] is to be measured in tetralin at 135° C. The polyolefin (A) is a monopolymer or copolymer comprising olefin having 2 to 12 carbon atoms, preferably a monopolymer comprising ethylene or propylene, or an ethylene- or propylene-olefin copolymer comprising ethylene or propylene monomer at the rate of 50 wt % or more, preferably at least 70 wt %, further preferably at least 90 wt %. Further, the polyolefin (A) is more preferably ethylene monopolymer or ethylene-olefin copolymer comprising ethylene monomer at the rate of 50 wt % or more, preferably at least 70 wt %, further preferably at least 90 wt %.

A too small intrinsic viscosity [η] of polyolefin (A) can hardly provide a sufficient melting tension and a sufficient crystallization temperature for the intended polyolefin composition as a final product. The upper limit for the intrinsic viscosity [η] is not particularly specified. However, a preferable upper limit can be about 100 dl/g in view of manufacturing efficiency and the following reason; when the intrinsic viscosity [η] of polyolefin (A) is too different from that of the intended polyolefin composition as a final product, polyolefin (A) cannot be dispersed in the polyolefin composition, causing the melting tension to be insufficient. Further, the intrinsic viscosity [η] of polyolefin (A) measured in tetralin at 135° C. has to be raised up to 15 dl/g to provide the final product with a high molecular weight. For this reason, ethylene monopolymer or ethylene-olefin copolymer comprising ethylene monomer at the rate of 50 wt % or more is preferable in view of polymerization efficiency.

Though the density of polyolefin (A) is not particularly specified, a density of 880 to 980 g/l is preferred.

The amount of polyolefin (A) for a catalytic component of a transitional metal compound to support is 0.01 to 5000 g per gram of the catalytic component, preferably 0.05 to 2000 g, further preferably 0.1 to 1000 g. Less than 0.01 g of polyolefin (A) per gram of the catalytic component cannot provide the intended polyolefin composition as a final product with a sufficient melting tension and a sufficient crystallization temperature. More than 5000 g of polyolefin (A) per gram of the catalytic component is not effective and can deteriorate the homogeneity of a final product.

Examples of preferable olefin monomers for polyolefin (A) include ethylene, propylene, 1-butene, 1-pentene, 1-hexene, 1-octene, 1-decene, 4-methyl-1-pentene and 3-methyl-1-pentene. From among those, ethylene, propylene, 1-butene and 4-methyl-1-pentene are particularly preferable.

Polyolefin (B) is the same as the polyolefin to be polymerized having an intrinsic viscosity [η] of less than 15 dl/g measured in tetralin at 135° C. Polyolefin (B) provides polyolefin (A) contained in a polyolefin composition as a final product with good dispersion in the composition. The intrinsic viscosity [η] of polyolefin (B) is preferred to be lower than that of polyolefin (A) and be higher than that of a polyolefin composition as a final product.

The amount of polyolefin (B) for use to let a catalytic component of a transitional metal compound support is preferably 0.01 to 100 g per gram of the catalytic component. In other words, the amount is preferred to be 0.001 to 1 wt % in terms of a polyolefin composition as a final product. A too small amount of polyolefin (B) prevents polyolefin (A) from dispersing in the polyolefin composition as a final product. A too large amount of polyolefin (B) makes preparation of the preactivated catalysts for olefin polymerization less effective because the dispersibility is saturated easily.

The preactivated catalysts for olefin polymerization are prepared by a preliminary activation treatment which lets a catalytic component of a transitional metal compound support polyolefins (B) and (A). The preliminary activation treatment comprises steps of a preliminary polymerization and a preliminary activation polymerization in the presence of a polyolefin-preparing catalyst. The preliminary polymerization preliminarily polymerizes olefin to form polyolefin (B). The preliminary activation polymerization polymerizes olefin to form polyolefin (A). The polyolefin-preparing catalyst is a combination of a catalytic component of a transitional metal compound containing at least a titanium compound, an organic metal compound and, if required, an electron donor.

In the polyolefin-preparing catalyst for the preliminary activation treatment, the organic metal compound is 0.01 to 1000 molar parts, preferably 0.05 to 500 molar parts, and the electron donor is 0 to 500 molar parts, preferably 0 to 100 molar parts per molar part of the transitional metal contained in the catalytic component of a transitional metal compound containing at least a titanium compound.

The following method lets the catalytic component of a transitional metal compound support polyolefins (B) and (A). First, polyolefin (B) of 0.01 to 100 g per gram of a catalytic component of a transitional metal compound is formed by preliminary polymerization using 0.01 to 500 g of olefin to be polymerized in the presence of the polyolefin-preparing catalyst of 0.001 to 5000 mmol, preferably 0.01 to 100 mmol, in terms of transitional metal atom in the catalyst component per liter of olefin polymerization volume. In this process, no solvent or a solvent of at most 500 g per gram of a catalytic component of a transitional metal compound is used. Then polyolefin (A) of 0.01 to 5000 g per gram of a catalytic component of a transitional metal compound is formed by polymerization using 0.01 to 1000 g of olefin. The term "polymerization volume" refers to a volume of liquid phase in a polymerization container for liquid phase polymerization or a volume of gas phase in a polymerization container for gas phase polymerization.

The amount of the catalytic component of a transitional metal compound for use is preferably within the above-mentioned range in view of efficient and controlled polymerization of polyolefin (A). A too small amount of the organic metal compound for use makes polymerization inappropriately slow down. A too large amount of the organic metal compound is not efficient because the obtained polyolefin composition as a final product is apt to contain much residue of the organic metal compound. A too large amount of the electron donor for use makes polymerization inappropriately slow down. A too large amount of the solvent for use requires a large reactor and makes it difficult to efficiently control polymerization.

The preliminary activation treatment is performed in liquid phase using solvents. Examples of the solvents include aliphatic hydrocarbons such as butane, pentane, hexane, heptane, octane, isooctane, decane or dodecane; alicyclic hydrocarbons such as cyclopentane, cyclohexane or methyl cyclohexane; aromatic hydrocarbons such as toluene, xylene or ethylbenzene; inert solvents such as gasoline fraction or hydrogenized diesel oil fraction; and olefins. The preliminary activation treatment is also performed in gas phase using no solvent.

To form a polyolefin (A) having a high molecular weight and an intrinsic viscosity [η] of 15 to 100 dl/g, the preliminary activation treatment is preferably performed without using hydrogen, though the treatment can be performed in the presence of hydrogen.

The preliminary polymerization for polyolefin to be polymerized is performed at a condition for forming polyolefin (B) of 0.01 to 100 g per gram of a catalytic component of a transitional metal compound, usually at −40 to 100° C. and 0.1 to 5 MPa for 1 min to 24 hr. The preliminary activation polymerization is performed at a condition for forming 0.01 to 5000 g of polyolefin (A), preferably 0.05 to 2000 g, further preferably 0.1 to 1000 g per gram of a catalytic component of a transitional metal compound. That condition is usually at a low temperature such as −40 to 40° C., preferably −40 to 30° C., further preferably −40 to 20° C., and 0.1 to 5 MPa, preferably 0.2 to 5 MPa, further preferably 0.3 to 5 MPa for 1 min to 24 hr, preferably 5min to 18 hr, further preferably 10 min to 12 hr.

After the preliminary activation is performed, an addition polymerization can be performed by using 0.01 to 100 g of olefin to be polymerized per gram of a catalytic component of a transitional metal compound. The addition polymerization keeps an activity in polymerization by the preliminary activation high. The amount of the organic metal compound, electron donor, solvent and olefin is within the same range as mentioned for the preliminary activation, preferably an electron donor of 0.005 to 10 mol, preferably 0.01 to 5 mol. The addition polymerization is preferably performed at −40 to 100° C. and 0.1 to 5 MPa for 1 min to 24 hr. The kind of organic metal compounds, electron donors and solvents for the addition polymerization can be the same as that in preliminary activation polymerization. The kind of olefin for addition polymerization is identical to the olefin to be polymerized.

The intrinsic viscosity [η] of polyolefin obtained by addition polymerization is at most within the range of intrinsic viscosity [η] of polyolefin (A). The intrinsic viscosity [η] of polyolefin obtained by addition polymerization is incorporated in the final polyolefin.

To provide the intended polyolefin composition, the preactivated catalyst can be used for main polymerization using olefin having 2 to 12 carbon atoms, either alone or in combination with an organic metal compound (AL2) and an electron donor (E2).

The olefin main-polymerization catalyst comprises the above-mentioned preactivated catalyst, organic metal compound (AL2) and electron donor (E2). The total amount of the organic metal compounds (AL1) and (AL2) for the polyolefin-preparing catalyst is 0.05 to 3000 mol, preferably 0.1 to 1000 mol per mol of the transitional metal atom contained in the preactivated catalyst. The total amount of the electron donors (E1) and (E2) for the polyolefin-preparing catalyst is 0 to 5000 mol, preferably 0 to 3000 mol per mol of the transitional metal atom contained in the preactivated catalyst.

When the total amount of the organic metal compounds (AL1) and (AL2) is too small, a reaction rate in main polymerization of olefin gets too slow. A too large amount of the organic metal compounds (AL1) and (AL2) is not efficient and unpreferably makes much residue of the organic metal compound in the obtained polyolefin composition as a final product. A too large amount of the electron donors (E1) and (E2) for the polyolefin-preparing catalyst makes a reaction rate in main polymerization of olefin extremely slow.

The kind of organic metal compound (AL2) and electron donor (E2) to prepare an olefin main-polymerization catalyst is the same as that of organic metal compound (AL1) and electron donor (E1). The organic metal compound (AL1) and electron donor (E1) can each be used either alone or in combination. The kind of organic metal compound (AL2) and electron donor (E2) can be the same as that for use in the preliminary activation treatment or be different from that for use in the preliminary activation treatment.

The olefin main-polymerization catalyst can be a combination of a powdery precipitate, organic metal compound (AL2) and, if required electron donor (E2). The powdery precipitate can be mixed with a solvent as a suspension. The powdery precipitate is formed by removing the solvent, unreacted olefin, unreacted organic metal compound (AL1) and electron donor (E1) from the preactivated catalyst by filtration or decantation. The olefin main-polymerization catalyst can also be a combination of another powdery precipitate, organic metal compound (AL2) and, if required electron donor (E2). This powdery precipitate is formed by evaporating and removing the solvent and unreacted olefin from the preactivated catalyst by reduced pressure distillation or inert gas flow.

The polyolefin composition of the invention is prepared as follows. Olefin is polymerized in the presence of a preactivated catalyst or an olefin main-polymerization catalyst. The amount of the preactivated catalyst or olefin main-polymerization catalyst for use is 0.001 to 1000 mmol, preferably 0.005 to 500 mmol per liter of polymerization volume in terms of a transitional metal atom in the preactivated catalyst. The above-defined range of the catalytic component of a transitional metal compound enables efficient control of olefin polymerization.

The olefin main-polymerization can be performed by a known polymerization process, such as slurry polymerization, bulk polymerization, gas phase polymerization, liquid polymerization, or a combination thereof. With slurry polymerization, olefin is polymerized in solvents such as aliphatic hydrocarbon including propane, butane, pentane, hexane, heptane, octane, isooctane, decane or dodecane, alicyclic hydrocarbons including cyclopentane, cyclohexane or methyl cyclohexane; aromatic hydrocarbons such as toluene, xylene or ethylbenzene; inert solvents such as gasoline fraction or hydrogenized diesel oil fraction; and olefins. With bulk polymerization, olefin works as a solvent. With gas phase polymerization, olefin is polymerized in a gas phase. With liquid polymerization, polyolefin formed by polymerization is in a liquid state. An example of preferable polymerization conditions for the above processes is a temperature of 20 to 120° C., preferably 30 to 100° C., further preferably 40 to 100° C., a pressure of 0.1 to 5 MPa, preferably 0.3 to 5 MPa of continuous, semi-continuous or batch polymerization, and a polymerization time of 5 min to 24 hr. This condition efficiently forms polyolefin.

The polymerization condition is set to form polyolefin formed in the main polymerization and a polyolefin composition as a final product with an intrinsic viscosity [η] of 0.2 to 10 dl/g, preferably 0.7 to 5 dl/g and to adjust polyolefin (A) derived from the used preactivated catalyst to 0.01 to 5 wt % of the composition. Similarly to known olefin polymerization, the molecular weight of polymer is adjusted by the use of hydrogen in polymerizing.

Less than 0.2 dl/g for the intrinsic viscosity [η] for the intended polyolefin composition results in deteriorated mechanical properties of a final molded polyolefin product. More than 10 dl/g for the intrinsic viscosity [η] deteriorates molding properties.

When the content of polyolefin (A) derived from the preactivated catalyst is less than 0.01 wt % of the intended polyolefin composition, the melting tension and crystallization temperature for the polyolefin composition are not sufficiently improved. More than 5 wt % of polyolefin (A) in the intended polyolefin composition is not efficient, and the content value can deteriorate homogeneity of the polyolefin composition.

Olefin having 2 to 12 carbon atoms is preferable to polymerize in preparing the polyolefin composition of the invention. Examples of preferred olefin include ethylene, propylene, 1-butene, 1-pentene, 1-hexene, 1-octene, 1-decene, 4-methyl-1-pentene and 3-methyl-1-pentene. From among those, ethylene, propylene, 1-butene and 4-methyl-1-pentene are particularly preferable. Those olefins can be used either alone or in combination.

The polyolefin formed by main-polymerization can be olefin homopolymer, or olefin-random or olefin-block copolymer comprising olefin monomer at the rate of 50 wt % or more. The polyolefin is preferably olefin homopolymer, olefin-random copolymer comprising olefin monomer at the rate of 90 wt % or more or olefin-block copolymer comprising olefin monomer at the rate of 70 wt %.

After main-polymerization of olefin, known processes such as catalyst inactivation treatment, catalyst removing treatment and drying are performed if required. Then the intended polyolefin composition is finally provided. The intended polyolefin composition has a high melting tension and a high crystallization temperature.

The preliminary activation process provides polyolefin (A) having a high molecular weight, and polyolefin (A) is evenly dispersed in the polyolefin composition as a final product. Because the invention uses the above process, the necessary amount of preactivated catalyst can be prepared at a time. Further, main-polymerization is performed by a conventional olefin polymerization process. Therefore, similar productivity for polyolefin is achieved, compared to conventional polyolefin production.

The polyolefin composition prepared using the preactivated catalyst in the invention has a high melting tension. When polypropylene was used as olefin, a melting tension (MS) of the obtained polypropylene composition has the following relation with an intrinsic viscosity [η] of the obtained polypropylene composition, measured in tetralin at 135° C.:

$$\log(MS)>4.24\times\log[\eta]-1.05$$

A too large melting tension deteriorates molding properties of the obtained polyolefin composition. Therefore, a preferable range for the invention is $4.24\times\log[\eta]+0.05>\log(MS)>4.24\times\log[\eta]-1.05$, preferably $4.24\times\log[\eta]+0.24>\log(MS)>4.24\times\log[\eta]-1.05$, more preferably $4.24\times\log[\eta]+0.24>\log(MS)>4.24\times\log[\eta]-0.93$.

The term melting tension at 230° C. refers to a tension (cN) of a filament of a polyolefin measured in the following condition: polyolefin is heated up to 230° C., and with a device named MELT TENSION II produced by TOYO SEIKI SEIKAKU-SHO Ltd., melting polyolefin is extruded into air through a nozzle having a diameter of 2.095 mm at a rate of 200 mm/min to form a strand, and finally a tension of the filament of the polyolefin is measured while the obtained strand is wound up at a rate of 3.14 m/min.

After main-polymerization, known processes such as catalyst inactivation treatment, catalyst removing treatment and drying are performed if required. Then the intended polypropylene composition is finally provided. The following explanation is an example of polypropylene (PP) composition.

Phenol stabilizers are added to the composition to improve thermal stability, melting tension and crystallization temperature of the composition. The amount of the stabilizer for use is 0.001 to 2 weight parts, preferably 0.005 to 1.5 weight parts, further preferably 0.01 to 1 weight part with respect to 100 weight parts of polypropylene (PP) composition. The range for the amount realizes effects of the stabilizer without inhibiting properties of the composition as polyolefin (A). The range defined above is also preferable in view of cost.

The phenol stabilizers can be any of known phenol stabilizers having a phenol structure. Examples are 2,6-di-t-butyl-p-cresol, 2,6-di-t-butyl-4-ethylphenol, 2,6-dicyclohexyl-p-cresol, 2,6-diisopropyl-4-ethylphenol, 2,6-di-t-amyl-p-cresol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2 -cyclohexyl-4-n-butyl-6-isopropylphenol, 2-t-butyl-6-(3'-t-butyl)-5'-methyl-2'hydroxybenzyl)-4-methylphenylacrylate, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-p-cresol), 1,1,3-tris(2-methyl-4-hydroxy-5-t-butylphenyl)butane, triethyleneglycol-bis[3-(3-t-butyl-5-methyl-4-hydroxyphenyl)propionate], 1,6-hexanediol-bis[3-(3,5-di-t-butyl-4-hydroxyphenyl) propionate], 2,2-thiodiethylenebis[3-(3,5-di-t-butyl-4-hydroxyphenyl)propionate], n-octadecyl-3-(3',5'-di-t-butyl-4'-hydroxyphenyl)propionate, N,N'-hexamethylenebis(3,5-di-t-butyl-4-hydroxy-hydrocinnamide), 3,5-di-t-butyl-4-hydroxybenzylphosphonate-diethylester, 1,3,5-tris(2,6-dimetyl-3-hydroxy-4-t-butylbenzyl)isocyanurate, 1,3,5-tris[(3,5-di-t-butyl-4-hydroxyphenyl)propyonyloxyethyl] isocyanurate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl)propionate]methane, bis(3,5-di-t-butyl-4-hydroxybenzylphosphonate ethyl)calcium, bis(3,5-di-t-butyl-4-hydroxybenzylphosphoric acid ethyl)nickel, N,N'-bis[3,5-di-t-butyl-4-hydroxyphenyl)propyonyl] hydrazine, 2,2'-methylenebis(4-methyl-6-t-butylphenol) terephthalate, 1,3,5-trimethyl-2,4,6 -tris(3,5-di-t-butyl-4- hydroxybenzyl)benzene, 3,9-bis[1,1-dimethyl-2-{3-(3-t-butyl-4-hydroxy-5-methylphenyl)propionyloxy}ethyl]-2,4,8,10-tetraoxaspiro[5,5]undecane, 2,2-bis[4-{2-(3,5-di-t-butyl-4-hydroxyhydrocinnamoyloxy)}ethoxyphenyl] propane, β-(3,5-di-t-butyl-4-hydroxyphenyl)propionate alkylester, and the like.

In particular, preferred examples are 2,6-di-t-butyl-p-cresol, tetrakis[methylene-3-(3,5-di-t-butyl-4-hydroxyphenyl)propionate]methane, n-octadecyl-3-(3',5'-di-t-butyl-4'-hydroxyphenyl)propionate, 2-t-butyl-6-(3'-t-butyl-5'-methyl-2'-hydroxybenzyl)-4-methylphenylacrylate, 2,2'-ethylidenebis(4,6-di-t-butylphenyl), and the like. A phenolic stabilizer can be solely used, or two or more kinds of phenolic stabilizers can be combined for use.

In the present invention, a phosphoric antioxidant is blended as a component which displays high melt tension, high crystallization temperature of a polypropylene composition which should be obtained during molding, heat resistant oxidation properties, weather resistance, and coloring prevention.

The blending amount is 0.001 to 2 weight parts, more preferably 0.005 to 1.5 weight parts, most preferably 0.01 to 1 weight part with respect to 100 weight parts of a polypropylene composition (PP) of a component A) with respect to the display of performance of the polypropylene composition according to the present invention and the cost of the antioxidant.

The phosphoric antioxidant which is used for the polypropylene composition according to the prior art can be utilized without restriction. More specifically, examples are as follows. The phosphoric antioxidant can be solely used, or two or more kinds of phosphoric antioxidants can be used together.

Examples of biphenylene-di-phosphonate are tetrakis(2,4-di-t-butylphenyl)-4,4'-biphenylene-di-phosphonate, tetrakis(2,4-di-t-amylphenyl)-4,4'-biphenylene-di-phosphonate, tetrakis(2,4-di-t-butyl-5-methylphenyl)-4,4'-biphenylene-di-phosphonate, tetrakis(2,6-di-t-butyl-4-methylphenyl)-4,4'-biphenylene-di-phosphonate, tetrakis(2,6-di-t-butyl-4-n-octadecyloxycarbonylethyl-phenyl)-4,4'-biphenylene-di-phosphonate, tetrakis[2,6-di-t-butyl-4-(2',4'-di-t-butylphenoxycarbonyl)-phenyl]-4,4'-biphenylene-di-phosphonate, tetrakis(2,6-di-t-butyl-4-n-hexadecyloxycarbonyl-phenyl)-4,4'-biphenylene-di-phosphonate, bis[2,2'-methylene-bis(4-methyl-6-t-butylphenyl)]-4,4'-biphenylene-di-phosphonate, bis[2,2'-methylene-bis(4,6)-di-t-butylphenyl)]-4,4'-biphenylene-di-phosphonate, bis(2,2'-ethylidene-bis(4-methyl-6-t-butylphenyl)]-4,4'-biphenylene-di-phosphonate, bis[2,2'-ethylidene-bis(4,6-di-t-butylphenyl)]-4,4'-biphenylene-d-phosphonate, and the like.

Examples are catecyl-2,6-di-t-butyl-4-methylphenylphosphite, catecyl-2,4,6-tri-t-butylphenylphosphite, α-naphthylcatecylphosphite, 2,2'-methylenebis(4-methyl-6 -t-butylphenyl)-2-naphthylphosphite, 4,4'-butylidene-bis(3-methyl-6-t-butylphenyl-di-tridecylphosphite), 1,1,3-tris(2-methyl-4-di-tridecylphosphite-5-t-butylphenyl)butane, trilauryltrithiophosphite, tricetyltrithiophosphite, 9,10-dihydro-9-oxa-10-phosphaphenanthrene-10-oxide, 10-hydroxy-9,10-dihydro-9-oxa-10-phosphaphenanthrene-10-oxide, triphenylphosphite, tris(nonylphenyl)phosphite, tris(2,4-di-nonylphenyl)phosphite, tris(mono-, or di-nonylphenyl)phosphite, tris(2,4-di-t-butylphenyl) phosphite, tris(2,6-di-t-butyl-4-methylphenyl)phosphite, and the like.

Examples of pentaerythritol-diphosphite are distearyl-pentaerythritol-diphosphite, diphenyl-pentaerythritol-diphosphite, bis(nonylphenyl)-pentaerythritol-diphosphite, bis(2,4-di-t-butylphenyl)pentaerythritol-diphosphite, bis(2,4-di-t-amylphenyl)pentaerythritol-diphosphite, bis(2,4-dicumylphenyl)pentaerythritol-diphosphite, bis(2,4-di-t-butyl-5-methylphenyl)-pentaerythritol-diphosphite, bis(2,6-di-t-butyl-4-methylphenyl)pentaerythritol-diphosphite, bis (2,6-di-t-butyl-4-s-butylphenyl)pentaerythritol-diphosphite, bis(2,4,6-tri-t-butylphenyl)pentaerythritol-diphosphite, bis (2,4,6-tri-t-amylphenyl)pentaerythritol-diphosphite, bis(2,6-di-t-butyl-4-n-octadecyloxycarbonylethyl-phenyl) pentaerythritol-diphosphite, bis[2,6-di-t-butyl-4-(2',4'-di-t-butylphenoxycarbonyl)-phenyl]pentaerythritol-diphosphite, bis(2,6-di-t-butyl-4 -n-hexadecyloxycarbonyl-phenyl) pentaerythritol-diphosphite, and the like.

Examples of tetraoxaspiro[5.5]undecane-diphosphite are tetrakis(2,4-di-t-butylphenyl)-3,9-bis(1,1-dimethyl-2-hydroxyethyl)-2,4,8,10-tetraoxaspiro[5.5]undecane-diphosphite, tetrakis(2,4-di-t-amylphenyl)-3,9-bis(1,1-dimethyl-2-hydroxyethyl)-2,4,8,10-tetraoxaspiro[5.5] undecane-diphosphite, tetrakis(2,6-di-t-butyl-4-methylphenyl)-3,9-bis(1,1-dimethyl-2-hydroxyethyl)-2,4,8,10-tetraoxaspiro[5.5]undecane-diphosphite, tetrakis(2,4,6-tri-t-butylphenyl)-3,9-bis(1,1-dimethyl-2-hydroxyethyl)-2,4,8,10-tetraoxaspiro[5.5]undecane-diphosphite, tetrakis(2,4,6-tri-t-amylphenyl)-3,9-bis(1,1-dimethyl-2-hydroxyethyl)-2,4,8,10-tetraoxaspiro[5.5]undecane-diphosphite, tetrakis(2,6-di-t-butyl-4-n-octadecyloxycarbonylethyl-phenyl)-3,9-bis (1,1-dimethyl-2-hydroxyethyl)-2,4,8,10-tetraoxaspiro[5.5] undecane-diphosphite, tetrakis[2,6-di-t-butyl-4-(2',4'-di-t-butylphenoxycarbonyl-phenyl]-3,9-bis(1,1-dimethyl-2-hydroxyethyl)-2,4,8,10-tetraoxaspiro[5.5]undecane-diphosphite, tetrakis(2,6-di-t-butyl-4-n-hexadecyloxycarbonyl-phenyl)-3,9-bis(1,1-dimethyl-2-hydroxyethyl)-2,4,8,10-tetraoxaspiro[5.5]undecane-diphosphite, bis[2,2'-methylene-bis(4-methyl-6-t-butylphenyl)]-3,9-bis(1,1-dimethyl-2-hydroxyethyl)-2,4,8,10-tetraoxaspiro[5.5]undecane-diphosphite, bis[2,2'-methylene-bis(4,6-di-t-butylphenyl)]-3,9-bis(1,1-dimethyl-2 -hydroxyethyl)-2,4,8,10-tetraoxaspiro[5.5] undecane-diphosphite, bis[2,2'-methylene-bis(4,6-di-t-amylphenyl)]-3,9-bis(1,1-dimethyl-2-hydroxyethyl)-2,4,8,10-tetraoxaspiro[5.5]undecane-diphosphite, bis[2,2'-ethylidene-bis(4-methyl-6-t-butylphenyl)]-3,9-bis(1,1-dimetyl-2-hydroxyethyl)-2,4,8,10-tetraoxaspiro[5.5] undecane-diphosphite, bis[2,2'-ethylidene-bis(4,6-di-t-butylphenyl)]-3,9-bis(1,1-dimethyl-2-hydroxyethyl)-2,4,8,10-tetraoxaspiro[5.5]undecane-diphosphite, bis[2,2'-ethylidene-bis(4,6-di-t-amylphenyl)]-3,9-bis(1,1-dimethyl-2-hydroxyethyl)-2,4,8,10-tetraoxaspiro[5,5]undecane-diphosphite, and the like.

Examples of 2,2'-bis(4,6-di-t-butylphenyl)phosphite are 2,2'-bis(4,6-di-t-butylphenyl)octylphosphite, 2,2'-bis(4,6-di-t-butylphenyl)nonylphosphite, 2,2'-bis(4,6-di-t-butylphenyl)laurylphosphite, 2,2'-bis(4,6-di-t-butylphenyl) tridecylphosphite, 2,2'-bis(4,6-di-t-butylphenyl) myristylphosphite, 2,2'-bis(4,6-di-t-butylphenyl) stearylphosphite, 2,2'-bis(4,6-di-t-butylphenyl)(2,4-di-t-butylphenyl)phosphite, 2,2'-bis(4,6-di-t-butylphenyl)(2,6-di-t-butyl-4-methylphenyl)phosphite, 2,2'-bis(4,6-di-t-butylphenyl)(2,4,6-tri-t-butylphenyl)phosphite, 2,2'-bis(4,6-di-t-butylphenyl)(2,6-di-t-butyl-4-n-octadecyloxycarbonylethyl-phenyl)phosphite, 2,2'-bis(4,6-di-t-butylphenyl)[2,6-di-t-butyl-4-(2',4'-di-t-butylphenoxycarbonyl)-phenyl]phosphite, 2,2'-bis(4,6-di-t-butylphenyl)(2,6-di-t-butyl-4-n-hexadecyloxycarbonyl-phenyl)phosphite, and the like.

Examples of 2,2'-methylene-bis(4-methyl-6-t-butylphenyl)phosphite are 2,2'-methylene-bis(4-methyl-6-t- butylphenyl)octylphosphite, 2,2'-methylene-bis(4-methyl-6-t-butylphenyl)nonylphosphite, 2,2'-methylene-bis(4-methyl-6-t-butylphenyl)laurylphosphite, 2,2'-methylene-bis(4-methyl-6-t-butylphenyl)tridecylphosphite, 2,2'-methylene-bis(4-methyl-6-t-butylphenyl)myristylphosphite, 2,2'-methylene-bis(4-methyl-6-t-butylphenyl)stearylphosphite, 2,2'-methylene-bis(4-methyl-6-t-butylphenyl)(2,4-di-t-butylphenyl)phosphite, 2,2'-methylene-bis(4-methyl-6-t-butylphenyl)(2,6-di-t-butyl-4-methylphenyl)phosphite, 2,2'-methylene-bis(4-methyl-6-t-butylphenyl)(2,4,6-tri-t-butylphenyl)phosphite, 2,2'-methylene-bis(4-methyl-6-t-buthylphenyl)(2,6-di-t-butyl-4-n-octadecyloxycarbonylethyl-phenyl)phosphite, 2,2'-methylene-bis(4-methyl-6-t-butylphenyl)[2,6-di-t-butyl-4-(2',4'-di-t-butylphenoxycarbonyl)-phenyl]phosphite, 2,2'-methylene-bis(4-methyl-6-t-butylphenyl)(2,6-di-t-butyl-4-n-hexadecyloxycarbonyl-phenyl)phosphite, and the like.

Examples of 2,2'-methylene-bis(4,6-di-t-butylphenyl) phosphite are 2,2'-methylene-bis(4,6-di-t-butylphenyl) octylphosphite, 2,2'-methylene-bis(4,6-di-t-butylphenyl) nonylphosphite, 2,2'-methylene-bis(4,6-di-t-butylphenyl) laurylphosphite, 2,2'-methylene-bis(4,6 -di-t-butylphenyl) tridecylphosphite, 2,2'-methylene-bis(4,6-di-t-butylphenyl) myristylphosphite, 2,2'-methylene-bis(4,6-di-t-butylphenyl) stearylphosphite, 2,2'-methylene-bis(4,6-di-t-butylphenyl) (2,4-di-t-butylphenyl)phosphite, 2,2'-methylene-bis(4,6-di-t-butylphenyl)(2,6-di-t-butyl-4-methylphenyl)phosphite, 2,2'-methylene-bis(4,6-di-t-butylphenyl)(2,4,6-tri-t-butylphenyl)phosphite, 2,2'-methylene-bis(4,6-di-t-butylphenyl)(2,6-di-t-butyl-4-n-octadecyloxycarbonylethyl-phenyl)phosphite, 2,2'-methylene-bis(4,6-di-t-butylphenyl) [2,6-di-t-butyl-4-(2',4'-di-t-butylphenoxycarbonyl)-phenyl] phosphite, 2,2'-methylene-bis(4,6-di-t-butylphenyl)(2,6-di-t-butyl-4-n-hexadecyloxycarbonyl-phenyl)phosphite, and the like.

Examples of 2,2'-methylene-bis(4,6-di-t-amylphenyl) phosphite are 2,2'-methylene-bis(4,6-di-t-amylphenyl) octylphosphite, 2,2'-methylene-bis(4,6-di-t-amylphenyl) stearylphosphite, 2,2'-methylene-bis(4,6-di-t-amylphenyl) (2,4-di-t-butylphenyl)phosphite, 2,2'-methylene-bis(4,6-di-t-amylphenyl)(2,6-di-t-butyl-4-methylphenyl)phosphite, 2,2'-methylene-bis(4,6-di-t-amylphenyl)(2,4,6-tri-t-amylphenyl)phosphite, 2,2'-methylene-bis(4,6-di-t-amylphenyl)(2,6-di-t-butyl-4-n-octadecyloxycarbonylethyl-phenyl)phosphite, 2,2'-methylene-bis(4,6-di-t-amylphenyl) [2,6-di-t-butyl-4-(2',4'-di-t-butylphenoxycarbonyl)-phenyl] phosphite, 2,2'-methylene-bis(4,6 -di-t-amylphenyl)(2,6-di-t-butyl-4-n-hexadecyloxycarbonyl-phenyl)phosphite, and the like.

Examples of 2,2'-ethylidene-bis(4-methyl-6-t-butylphenyl)phosphite are 2,2'-ethylidene-bis(4-methyl-6-t-butylphenyl)octylphosphite, 2,2'-ethylidene-bis(4-methyl-6-t-butylphenyl)nonylphosphite, 2,2'-ethylidene-bis(4-methyl-6-t-butylphenyl)laurylphosphite, 2,2'-ethylidene-bis(4-methyl-6-t-butylphenyl)tridecylphosphite, 2,2'-ethylidene-bis(4-methyl-6-t-butylphenyl)myristylphosphite, 2,2'-ethylidene-bis(4-methyl-6-t-butylphenyl)stearylphosphite, 2,2'-ethylidene-bis(4-methyl-6-t-butylphenyl)(2,4-di-t-butylphenyl)phosphite, 2,2'-ethylidene-bis(4-methyl-6-t-butylphenyl)(2,6-di-t-butyl-4-methylphenyl)phosphite, 2,2'-ethylidene-bis(4-methyl-6-t-butylphenyl)(2,4,6-tri-t-butylphenyl)phosphite, 2,2'-ethylidene-bis(4-methyl-6-t-butylphenyl)(2,6-di-t-butyl-4-n-octadecyloxycarbonylethyl-phenyl)phosphite, 2,2'-ethylidene-bis(4-methyl-6-t-butylphenyl)[2,6-di-t-butyl-4-(2',4'-di-t-butylphenoxycarbonyl)-phenyl]phosphite, 2,2'-ethylidene-bis(4-methyl-6-t-butylphenyl)(2,6-di-t-butyl-4-n-hexadecyloxycarbonyl-phenyl)phosphite, and the like.

Examples of 2,2'-ethylidene-bis(4,6-di-t-butylphenyl) phosphite are 2,2-ethylidene-bis(4,6-di-t-butylphenyl) octylphosphite, 2,2'-ethylidene-bis(4,6-di-t-butylphenyl) nonylphosphite, 2,2'-ethylidene-bis(4,6 -di-t-butylphenyl) laurylphosphite, 2,2'-ethylidene-bis(4,6-di-t-butylphenyl) tridecylphosphite, 2,2'-ethylidene-bis(4,6-di-t-butylphenyl) myristylphosphite, 2,2'-ethylidene-bis(4,6-di-t-butylphenyl) stearylphosphite, 2,2'-ethylidene-bis(4,6-di-t-butylphenyl) (2,4-di-t-butylphenyl)phosphite, 2,2'-ethylidene-bis(4,6-di-t-butylphenyl)(2,6-di-t-butyl-4-methylphenyl)phosphite, 2,2'-ethylidene-bis(4,6-di-t-butylphenyl)(2,4,6-tri-t-butylphenyl)phosphite, 2,2'-ethylidene-bis(4,6-di-t-butylphenyl)(2,6-di-t-butyl-4-n-octadecyloxycarbonylethyl-phenyl)phosphite, 2,2'-ethylidene-bis(4,6-di-t-butylphenyl) [2,6-di-t-butyl-4-(2',4'-di-t-butylphenoxycarbonyl)-phenyl] phosphite, 2,2'-ethylidene-bis(4,6-di-t-butylphenyl)(2,6-di-t-butyl-4-n-hexadecyloxycarbonyl-phenyl)phosphite, and the like.

Examples of 2,2'-ethylidene-bis(4,6-di-t-amylphenyl) phosphite are 2,2'-ethylidene-bis(4,6-di-t-amylphenyl) octylphosphite, 2,2'-ethylidene-bis(4,6-di-t-amylphenyl) stearylphosphite, 2,2'-ethylidene-bis(4,6-di-t-amylphenyl) (2,4-di-t-amylphenyl)phosphite, 2,2'-ethylidene-bis(4,6-di-t-amylphenyl)(2,4,6-tri-t-amylphenyl)phosphite, 2,2'-ethylidene-bis(4,6-di-t-amylphenyl)(2,6-di-t-butyl-4-n-octadecyloxycarbonylethyl-phenyl)phosphite, 2,2'-ethylidene-bis(4,6-di-t-amylphenyl)[2,6-di-t-butyl-4-(2',4'-di-t-butylphenoxycarbonyl)-phenyl]phosphite, 2,2'-ethylidene-bis(4,6 -di-t-amylphenyl)(2,6-di-t-butyl-4-n-hexadecyloxycarbonyl-phenyl)phosphite, and the like.

Examples of 2,2'-thio-bis(4-methyl-6-t-butylphenyl) phosphite are 2,2'-thio-bis(4-methyl-6-t-butylphenyl) octylphosphite, 2,2'-thio-bis(4-methyl-6-t-butylphenyl) nonylphosphite, 2,2'-thio-bis(4-methyl-6-t-butylphenyl) laurylphosphite, 2,2'-thio-bis(4-methyl-6-t-butylphenyl) tridecylphosphite, 2,2'-thio-bis(4-methyl-6-t-butylphenyl) myristylphosphite, 2,2'-thio-bis(4-methyl-6-t-butylphenyl) stearylphosphite, 2,2'-thio-bis(4-methyl-6-t-butylphenyl)(2,4-di-t-butylphenyl)phosphite, 2,2'-thio-bis(4-methyl-6-t-butylphenyl)(2,6-di-t-butyl-4-methylphenyl)phosphite, 2,2'-thio-bis(4-methyl-6-t-butylphenyl)(2,4,6-tri-t-butylphenyl) phosphite, 2,2'-thio-bis(4-methyl-6-t-butylphenyl)(2,6-di-t-butyl-4-n-octadecyloxycarbonylethyl-phenyl)phosphite, 2,2'-thio-bis(4-methyl-6-t-butylphenyl)[2,6-di-t-butyl-4-(2',4'-di-t-butylphenoxycarbonyl-phenyl]phosphite, 2,2'-thio-bis(4-methyl-6-t-butylphenyl)(2,6-di-t-butyl-4-n-hexadecyloxycarbonyl-phenyl)phosphite, and the like.

Examples of fluorophosphite are 2,2'-bis(4,6-di-t-butylphenyl)fluorophosphite, 2,2'-bis(4-methyl-6-t-butylphenyl)fluorophosphite, 2,2'-bis(4-t-amyl-6-methylphenyl)fluorophosphite, 2,2'-bis(4-s-eicosylphenyl) fluorophosphite, 2,2'-methylene-bis(4-methyl-6-t-butylphenyl)fluorophosphite, 2,2'-methylene-bis(4-ethyl-6-t-butylphenyl)fluorophosphite, 2,2'-methylene-bis(4-methyl-6-nonylphenyl)fluorophosphite, 2,2'-methylene-bis (4,6-dinonylphenyl)fluorophosphite, 2,2'-methylene-bis(4-methyl-6-cyclohexylphenyl)fluorophosphite, 2,2'-methylene-bis(4-methyl-6-(1'-methylcyclohexyl)phenyl) fluorophosphite, 2,2'-i-propylidene-bis(4-nonylphenyl) fluorophosphite, 2,2'-butylidene-bis(4,6-dimethylphenyl) fluorophosphite, 2,2'-methylene-bis(4,6-di-t-butylphenyl) fluorophosphite, 2,2'-methylene-bis(4,6-di-t-amylphenyl) fluorophosphite, 2,2'-ethylidene-bis(4-methyl-6-t-butylphenyl)fluorophosphite, 2,2'-ethylidene-bis(4-ethyl-6-t-butylphenyl)fluorophosphite, 2,2'-ethylidene-bis(4-s-butyl-6-t-butylphenyl)fluorophosphite, 2,2'-ethylidene-bis (4,6-di-t-butylphenyl)fluorophosphite, 2,2'-ethylidene-bis(4, 6-di-t-amylphenyl)fluorophosphite, 2,2'-methylene-bis(4-methyl-6-t-octylphenyl)fluorophosphite, 2,2'-butylidene-bis(4-methyl-6-(1'-methylcyclohexyl)phenyl)fluorophosphite, 2,2'-methylene-bis(4,6-dimethylphenyl)fluorophosphite, 2,2'-thio-bis(4-t-octylphenyl)fluorophosphite, 2,2'-thio-bis(4,6-di-s-amylphenyl)fluorophosphite, 2,2'-thio-bis(4,6-di-i-octylphenyl)fluorophosphite, 2,2'-thio-bis(5-t-butylphenyl) fluorophosphite, 2,2'-thio-bis(4-methyl-6-t-butylphenyl) fluorophosphite, 2,2'-thio-bis(4-methyl-6-α-methylbenzylphenyl)fluorophosphite, 2,2'-thio-bis(3-methyl-4,6-di-t-butylphenyl)fluorophosphite, 2,2'-thio-bis(4- t-amylphenyl)fluorophosphite, and the like:

Examples of diphosphite are bis[2,2'-methylene-bis(4,6-di-t-butylphenyl)] -ethyleneglycol-diphosphite, bis[2,2'-methylene-bis(4,6-di-t-butylphenyl)]-1,4-butanediol-diphosphite, bis[2,2'-methylene-bis(4,6-di-t-butylphenyl)]-1,6-hexanediol-diphosphite, bis[2,2'-methylene-bis(4-methyl-6-t-butylphenyl)]-3,9-bis(1,1-dimethyl-2-hydroxyethyl)-2,4,8,10-tetraoxaspiro[5,5]undecane-diphosphite, bis[2,2'-methylene-bis(4,6-di-t-butylphenyl)]-3,9-bis(1,1-dimethyl-2-hydroxyethyl)-2,4,8,10-tetraoxaspiro[5,5]undecane-diphosphite, bis[2,2'-methylene-bis(4,6-di-t-amylphenyl)]-3,9-bis(1,1-dimethyl-2-hydroxyethyl)-2,4,8,10-tetraoxaspiro[5,5]undecane-diphosphite, bis[2,2'-ethylidene-bis(4-methyl-6-t-butylphenyl)]-3,9-bis(1,1-dimethyl-2-hydroxyethyl)-2,4,8,10-tetraoxaspiro[5,5]undecane-diphosphite, bis[2,2'-ethylidene-bis(4,6-di-t-butylphenyl)]-3,9-bis(1,1-dimethyl-2-hydroxyethyl)-2,4,8,10-tetraoxaspiro[5,5]undecane-diphosphite, bis[2,2'-ethylidene-bis(4,6-di-t-amylphenyl)]-3,9-bis(1,1-dimethyl-2-hydroxyethyl)-2,4,8,10-tetraoxaspiro[5,5]undecane-diphosphite, and bis[2,2'-methylene-bis(4,6-di-t-butylphenyl)]-N,N'-bis(2-hydroxyethyl)oxamide-diphosphite, and the like.

Examples of triphosphite are tris[2,2'-methylene-bis(4,6-di-t-butylphenyl)]-glycerin-triphosphite, tris[2,2'-methylene-bis(4,6-di-t-butylphenyl)]-trimethylolethane-triphosphite, tris[2,2'-methylene-bis(4,6-di-t-butylphenyl)]-trimethylolpropane-triphosphite, tris[2,2'-bis(4,6-di-t-butylphenyl)]-triethanolamine-triphosphite, tris[2,2'-bis(4,6-di-t-amylphenyl)]-triethanolamine-triphosphite, tris[2,2'-methylene-bis(4,6-di-t-butylphenyl)]-triethanolamine-triphosphite, tris[2,2'-methylene-bis(4,6-di-t-amylphenyl)]-triethanolamine-triphosphite, tris[2,2'-ethylidene-bis(4,6-di-t-butylphenyl)]-triethanolamine-triphosphite, tris[2,2'-ethylidene-bis(4,6-di-t-amylphenyl)]-triethanolamine-triphosphite, tris[2,2'-methylene-bis(4,6-di-t-butylphenyl)]-N,N',N''-tris(2-hydroxyethyl)isocyanurate-triphosphite, and the like.

Examples of the phosphoric antioxidant are tetrakis[2,2'-methylene-bis(4,6-di-t-butylphenyl)]-erythritol-tetraphosphite, tetrakis[2,2'-methylene-bis(4,6-di-t-butylphenyl)]-pentaerythritol-tetraphosphite, bis(2,4-di-t-butyl-6-methylphenyl)ethylphosphite, bis(2,4-di-t-butyl-6-methylphenyl)-2-ethylhexylphosphite, bis(2,4-di-t-butyl-6-methylphenyl)stearylphosphite, 2,4,6-tri-t-butylphenyl-2-ethyl-2-butyl-1,3-propanediolphosphite, and the like.

For the compositions according to the present invention, antioxidants other than the phosphoric antioxidants can be used so as to accomplish the objects of the present invention.

Examples of the antioxidant are the well-known phenolic antioxidants and thio antioxidants which are used for polypropylene compositions. Examples of the thio antioxidant include dimyristylthiodipropionate, distearylthiodipropionate, laurylstearylthiodipropionate, dilaurylstearylthiodipropionate, pentaerythritol-tetrakis(3-laurylthiopropionate), dioctadecyldisulfide, distearylthiodibutylate, and the like.

These phenolic and thio antioxidants can be used solely or in combination with two or more kinds of phenolic antioxidants.

The content of those antioxidants for use is each 0.001 to 1.5 weight parts to 100 weight parts of the polypropylene composition, preferably 0.005 to 1 weight part, particularly preferably 0.01 to 0.5 weight part.

For the compositions according to the present invention, stabilizers other than the above can be used so as to accomplish the objects of the present invention.

Examples of the stabilizers include a halogen scavenger. The halogen scavenger works to capture halogen remaining as a residue of the catalyst in polypropylene contained in the composition. The use of the halogen scavenger improves the compositions of the invention in terms of thermal stability, odors, hue, corrosion resistance, weather resistance and the like.

The halogen scavengers can be any of fatty acid metal salts, alkanoyl lactic acid metal salts, aliphatic hydroxy acid metal salts, hydrotalcites, lithium aluminum complex hydroxide salts, metal oxides, metal hydroxides, metal carbonates, metal aliphatic phosphates, epoxy compounds, aliphatic amines, aliphatic amides, hindered amine compounds, aminotriazine compounds, and the like.

Examples of the halogen scavengers include metal salts of aliphatic acids such as acetic acid, propionic acid, butyric acid, valeric acid, α-methyl butyric acid, hexanoic acid, sorbic acid, octanoic acid, 2-ethyl hexanoic acid, nonanoic acid, decanoic acid, 9-decenic acid, undecanoic acid, undecylenic acid, lauric acid, linderic acid, myristic acid, physeteric acid, myristoleic acid, palmitic acid, palmitoleic acid, hiragoic acid, stearic acid, petroselinic acid, oleic acid, elaidic acid, cis-11-octadecenic acid, vaccenic acid, linolic acid, α-eleostearic acid, β-eleostearic acid, punicic acid, linolenic acid, γ-linolenic acid, moroctic acid, stearidonic acid, stearolic acid, arachic acid, gadoleic acid, cis-11-eicosenic acid, arachidonic acid, behenic acid, cetoleic acid, erucic acid, brassidic acid, clupanodonic acid, lignoceric acid, selacholeic acid, 4,8,12,15,18,21-tetracohexanic acid, cerotic acid, ximeric acid, montanic acid, melissic acid, lumequeic acid; metal salts of alkanoyl lactic acids such as dodecanoyl lactic acid, tetradodecanoyl lactic acid, octadecanoyl lactic acid; metal salts of aliphatic hydroxy acids such as glycollic acid, lactic acid, hydracrylic acid, α-hydroxybutyric tartronic acid, glyceric acid, malic acid, tartaric acid, methotartaric acid, racemic acid, citric acid, 2-hydroxytetradecanoic acid, ipurolic acid, 2-hydroxyhexadecanoic acid, jalapinolic acid, juniperic acid, ambrettolic acid, 9,10,16-trihydroxyhexadecenic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, 22-hydroxydocosanic acid or cerebronic acid; metal alicyclic carboxylates such as metal naphthenates; metal aromatic carboxylates derived from aromatic carboxylic acids such as benzoic acid or p-t-butyl-benzoic acid; metal alicyclic hydroxylates derived from alicyclic hydroxy acids such as hydroxy naphthenic acid; metal aromatic hydroxylates derived from aromatic hydroxylic acid such as salicylic acid, m-hydroxy benzoic acid, p-hydroxy benzoic acid or 3,5-di-t-butyl-4-hydroxy benzoic acid; a variety of metal amino carboxylates; lithium aluminum complex hydroxide metal salts of basic aluminum lithium hydroxy carbonate hydrate and basic aluminum lithium hydroxy sulfate hydrate; metal oxides; metal hydroxides; metal carbonates; and metal phosphates.

Examples of metal salt of aliphatic phosphate are (mono-, or di-mixed)hexylphosphate, (mono, dimixed)

octylphosphate, (mono-, or di-mixed)2-ethylhexylphosphate, (mono-, or di-mixed)decylphosphate, (mono-, or di-mixed)laurylphosphate, (mono-, or di-mixed) myristylphosphate, (mono-, or di-mixed)palmitylphosphate, (mono-, or di-mixed)stearylphosphate, (mono-, or di-mixed) oleylphosphate, (mono-, or di-mixed)linoleicphosphate, (mono-, or di-mixed)linoleylphosphate, (mono-, or di-mixed)docosylphosphate, (mono-, or di-mixed) erucylphosphate, (mono-, or di-mixed)tetracosylphosphate, (mono-, or di-mixed)hexacosylphosphate, (mono-, or di-mixed)octacosylphosphate, and the like.

Examples of metal salt of aromatic phosphate are bis(p-t-butylphenyl)phosphate, mono(p-t-butylphenyl)phosphate, 2,2'-methylene-bis(4,6-di-t-butylphenyl)phosphate, 2,2'-methylene-bis(4,6-di-t-amylphenyl)phosphate, 2,2'-ethylidene-bis(4,6-di-t-butylphenyl)phosphate, 2,2'-ethylidene-bis(4,6-di-t-amylphenyl)phosphate, and the like.

Further examples are tribasic sulfate, hydrazone, alkene, cyclic ester, organic metal compounds, benzhydrol, epoxy compounds such as condensation product of epichlorohydrin and bisphenol A, condensation product of 2-methylepichlorohydrin and bisphenol A, triglycidylisocyanurate, epoxidation soybean oil, epoxidation linseed oil, epoxidation castor oil and the like: and hydroxylamine:

Examples of aliphatic amine are octylamine, laurylamine, myristylamine, palmitylamine, stearylamine, oleylamine, cocoamine, tallowamine, soyamine, N,N-dicocoamine, N,N-ditallowamine, N,N-disoyamine, N-lauryl-N,N-dimethylamine, N-myristyl-N,N-dimethylamine, N-palmityl-N,N-dimethylamine, N-stearyl-N,N-dimethylamine, N-cocoa-N,N-dimethylamine, N-tallow-N, N-dimethylamine, N-soy-N,N-dimethylamine, N-methyl-N, N-ditallowamine, N-methyl-N,N-dicocoamine, N-oleyl-1,3-diaminopropane, N-tallow-1,3-diaminopropane, hexamethylenediamine, and the like.

Examples of ammonium chloride are N-lauryl-N,N,N-trimethylammoniumchloride, N-palmityl-N,N,N-trimethylammoniumchloride, N-stearyl-N,N,N-trimethylammoniumchloride, N-docosyl-N,N,N-trimethylammoniumchloride, N-cocoa-N,N,N-trimethylammoniumchloride, N-tallow-N,N,N-trimethylammoniumchloride, N-soy-N,N,N-trimethylammoniumchloride, N,N,N-triethyl-N-benzylammoniumchloride, N-lauryl-N,N-dimethyl-N-benzylammoniumchloride, N-myristyl-N,N-dimethyl-N-benzylammoniumchloride, N-stearyl-N, N-dimethyl-N-benzylammoniumchloride, N-cocoa-N,N-dimethyl-N-benzylammoniumchloride, N,N-dioleyl-N,N-dimethylammoniumchloride, N,N-dicocoa-N,N-dimethylammoniumchloride, N, N-ditallow-N,N-dimethylammoniumchloride, N,N-diiso-N,N-dimethylammoniumchloride, N,N-bis(2-hydroxyethyl)-N-lauryl-N-methylammoniumchloride, N,N-bis(2-hydroxyethyl)-N-stearyl-N-methylammoniumchloride, N,N-bis(2-hydroxyethyl)-N-oleyl-N-methylammoniumchloride, N,N-bis(2 -hydroxyethyl)-N-cocoa-N-methylammoniumchloride, N,N-bis (polyoxyethylene)-N-lauryl-N-methylammoniumchloride, N,N-bis(polyoxyethylene)-N-stearyl-N-methylammoniumchloride, N,N-bis(polyoxyethylene)-N-oleyl-N-methylammoniumchloride, N,N-bis (polyoxyethylene)-N-cocoa-N-methylammoniumchloride, and the like.

Examples of betaine are N,N-bis(2-hydroxyethyl) laurylaminobetaine, N,N-bis(2-hydroxyethyl) tridecylaminobetaine, N,N-bis(2-hydroxyethyl)

myristylaminobetaine, N,N-bis(2-hydroxyethyl) pentadecylaminobetaine, N,N-bis(2-hydroxyethyl) palmitylaminobetaine, N,N-bis(2-hydroxyethyl) stearylaminobetaine, N,N-bis(2-hydroxyethyl) oleylaminobetaine, N,N-his(2-hydroxyethyl) docosylaminobetaine, N,N-bis(2-hydroxyethyl) octacosylaminobetaine, N,N-bis(2-hydroxyethyl) cocoaminobetaine, N,N-bis(2-hydroxyethyl) tallowaminobetaine, and the like. hexamethylenetetramine: alkanolamine such as triethanolamine, triisopropanolamine and the like. Examples of N-(2-hydroxyethyl)amine are N-(2-hydroxyethyl)laurylamine, N-(2-hydroxyethyl) tridecylamine, N-(2-hydroxyethyl)myristylamine, N-(2-hydroxyethyl)pentadecylamine, N-(2-hydroxyethyl) palmitylamine, N-(2-hydroxyethyl)stearylamine, N-(2-hydroxyethyl)oleylamine, N-(2 -hydroxyethyl) docosylamine, N-(2-hydroxyethyl)octacosylamine, N-(2-hydroxyethyl)cocoamine, N-(2-hydroxyethyl)tallowamine, N-methyl-N-(2-hydroxyethyl)laurylamine, N-methyl-N-(2-hydroxyethyl)tridecylamine, N-methyl-N-(2-hydroxyethyl) myristylamine, N-methyl-N-(2-hydroxyethyl) pentadecylamine, N-methyl-N-(2-hydroxyethyl) palmitylamine, N-methyl-N-(2-hydroxyethyl)stearylamine, N-methyl-N-(2-hydroxyethyl)oleylamine, N-methyl-N-(2-hydroxyethyl)docosylamine, N-methyl-N-(2-hydroxyethyl) octacosylamine, N-methyl-N-(2-hydroxyethyl)cocoamine, N-methyl-N-(2-hydroxyethyl)tallowamine, and the like.

Examples of N,N-bis(2-hydroxyethyl)aliphatic amine are N,N-bis(2-hydroxyethyl)laurylamine, N,N-bis(2-hydroxyethyl)tridecylamine, N,N-bis(2-hydroxyethyl) myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl) oleylamine, N,N-bis(2-hydroxyethyl)docosylamine, N,N-bis(2-hydroxyethyl)octacosylamine, N,N-bis(2-hydroxyethyl)cocoamine, N,N-bis(2-hydroxyethyl) tallowamine, and the like. Mono- or di-ester of N,N-bis(2-hydroxyethyl)aliphatic amine and aliphatic acid such as lauric acid, myristic acid, palmitic acid, stearic acid, oleic acid, behenic acid, erucic acid, and the like. Examples of aminoether are polyoxyethylenelaurylaminoether, polyoxyethylenestearylaminoether, polyoxyethyleneoleylaminoether, polyoxyethylenecocoaminoether, polyoxyethylenetallowaminoether, and the like. Examples of diaminoalkyl are N,N,N',N'-tetra(2-hydroxyethyl)-1,3-diaminopropane, N,N,N',N'-tetra(2-hydroxyethyl)-1,6-diaminohexane, N-lauryl-N,N',N'-tris(2-hydroxyethyl)-1,3-diaminopropane, N-stearyl-N,N',N'-tris(2-hydroxyethyl)-1,3-diaminopropane, N-cocoa-N,N',N'-tris(2-hydroxyethyl)-1,3-diaminopropane, N-tallow-N,N',N'-tris(2-hydroxyethyl)-1,3-diaminopropane, N,N-dicocoa-N',N'-bis (2-hydroxyethyl)-1 3-diaminopropane, N,N-ditallow-N',N'-bis(2-hydroxyethyl)-1,3-diaminopropane, N-coco-N,N',N',-tris(2-hydroxyethyl)-1,6-diaminohexane, N-tallow-N,N',N'-tris(2-hydroxyethyl)-1,6-diaminohexane, N,N-dicocoa-N', N'--bis(2-hydroxyethyl)-1,6-diaminohexane, N,N-ditallow-N',N'-bis(2-hydroxyethyl)-1,6-diaminohexane, and the like.

Examples of aliphatic amide are oleic acid amide, stearic acid amide, erucic acid amide, behenic acid amide, montanic acid amide, N-stearylstearic acid amide, N-oleyloleyic acid amide, N-stearyloleic acid amide, N-oleylstearic acid amide, N-stearylerucic acid amide, N-oleylpalmitic acid amide, N,N'-methylene-bis-lauric acid amide, N,N'-methylene-bis-myristic acid amide, N,N'-methylene-bis-palmitic acid amide, N,N'-methylene-bis-palmitoleic acid amide, N,N'-methylene-bis-stearamide, N,N'-methylene-bis-12- hydroxystearic acid amide, N,N'-methylene-bis-oleic acid amide, N,N'-methylene-bis-behenic acid amide, N,N'-methylene-bis-erucic acid amide, N,N'-methylene-bis-montanic acid amide, N,N'-ethylene-bis-lauric acid amide, N,N'-ethylene-bis-myristic acid amide, N,N'-ethylene-bis-palmitic acid amide, N,N'-ethylene-bis-palmitoleic acid amide, N,N'-ethylene-bis stearic acid amide, N,N'-ethylene-bis-12-hydroxystearic acid amide, N,N'-ethylene-bis-oleic acid amide, N,N'-ethylene-bis-behenic acid amide, N,N'-ethylene-bis-erucic acid amide, N,N'-ethylene-bis-montanic acid amide, N,N'-hexamethylene-bis-stearamide, N,N'-hexamethylene-bis-oleic acid amide, N,N'-hexamethylene-bis-behenic acid amide, N,N'-distearyloxalic acid amide, N,N'-dioleyloxalic acid amide, N,N'-distearylsuccinic acid amide, N,N'-dioleylsuccinic acid amide, N,N'-distearyladipic acid amide, N,N'-dioleyladipic acid amide, N,N'-distearylsebacic acid amide, N,N'-dioleylsebacic acid amide, and the like.

Examples of aliphatic amide are N,N-bis(2-hydroxyethyl) laurylamide, N,N-bis(2-hydroxyethyl)tridecylamide, N,N-bis(2-hydroxyethyl)myristyl amide, N,N-bis(2-hydroxyethyl)pentadecylamide, N,N-bis(2-hydroxyethyl) palmitylamide, N,N-bis(2-hydroxyethyl)stearylamide, N,N-bis(2-hydroxyethyl)oleylamide, N,N-bis(2-hydroxyethyl) dococylamide, N,N-bis(2-hydroxyethyl)octacocylamide, N,N'-bis(2-hydroxyethyl)cocoamide, N,N-bis(2 -hydroxyethyl)tallowamide, and the like. Examples of polyoxyalkylene of aliphatic amide are polyoxyethylenelaurylamideether, polyoxyethylenestearylamideether, polyoxyethyleneoleylamideether, polyoxyethylenecocoamideether, polyoxydethylenetallowamideether, and the like.

Examples of a hindered amine compound are 4-hydroxy-2,2,6,6-tetramethylpiperidine, 1-aryl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 4-methacryloyloxy-1,2,2,6,6-pentamethylpiperidine, 1-benzyl-2,2,6,6-tetramethyl-4-piperidylmaleate, bis(2,2,6,6-tetramethyl-4-piperidyl) succinate, bis(1,2,2,6,6-pentamethyl-4-piperidyl)succinate, bis(2,2,6,6-tetramethyl-4-piperidyl)adipate, bis(2,2,6,6-tetramethyl-4-piperidyl)cevacate, bis(2,2,6,6-tetramethyl-4-piperidyl)fumarate, bis(1,2,3,6-tetramethyl-2,6-diethyl-4-piperidyl)cevacate, bis(1-aryl-2,2,6,6-tetramethyl-4-piperidyl)phthalate, bis(1,2,2,6,6-pentamethyl-4-piperidyl) cevacate, 1,1'-(1,2-ethanediyl)bis(3,3,5,5-tetramethylpiperiazinone), 2-methyl-2-(2,2,6,6-tetramethyl-4-piperidyl)imino-N-(2,2,6,6-tetramethyl-4-piperidyl) propioneamide, 2-methyl-2-(1,2,2,6,6-pentametyl-4-peperidyl)imino-N-(1,2,2,6,6-pentamethyl-4 -piperidyl) propioneamide, 1-propargyl-4-β-cyanoethyloxy-2,2,6,6-tetramethylpiperidine, 1-acetyl-2,2,6,6-tetramethyl-4-piperidyl-acetate, trimellitic acid-tris(2,2,6,6-tetramethyl-4-piperidyl)ester, 1-acryloyl-4-benzyloxy-2,2,6,6-tetramethylpiperidine, bis(1,2,2,6,6-pentamethyl-4-piperidyl)dibutylmalonate, bis(1,2,2,6,6-pentamethyl-4-piperidyl)dibenzyl-malonate, bis(1,2,3,6-tetramethyl-2,6-diethyl-4-piperidyl)dibenzyl-malonate, bis(1,2,2,6,6-pentamethyl-4-piperidyl)-2-(3,5-di-t-butyl-4-hydroxybenzyl)-2-n-butylmalonate, and the like.

Examples of a hindered amine compound are bis(2,2,6,6-tetramethyl-4-piperidyl)-1,5-dioxaspiro[5.5]undecane-3,3-dicarboxylate, bis(1,2,2,6,6-pentamethyl-4-piperidyl)-1,5-dioxaspiro[5.5]undecane-3,3-dicarboxylate, bis(l-acetyl-2,2,6,6-tetramethyl-4-piperidyl)-1,5-dioxaspiro[5.5]undecane-3,3-dicarboxylate, 1,3-bis[2,2'-[bis(2,2,6,6-tetramethyl-4-piperidyl)-1,3-dioxacyclohexane-5,5-dicarboxylate)], bis(2,2,6,6-tetramethyl-4-piperidyl)-2-[1-methylethyl[1,3-dioxacyclohexane-5,5-dicarboxylate]], 1,2-bis[2,2'-[bis(2,2,6,6-tetramethyl-4-piperidyl)-2-methyl-1,3-dioxacyclohexane-5,5-dicarboxylate]], bis(2,2,6,6-tetramethyl-4-piperidyl)-2-[2-(3,5-di-t-butyl-4-hydroxyphenyl)]ethyl-2-methyl-1,3-dioxacyclohexane-5,5-dicarboxylate, bis(2,2,6,6-tetramethyl-4-piperidyl)-1,5-dioxaspiro[5.11]heptadecane-3,3-dicarboxylate, and the like.

Examples of a hindered amine compound are hexane-1',6'-bis-(4-carbamoyloxy-1-n-butyl-2,2,6,6-tetramethylpiperidine), toluene-2',4'-bis(4-carbamoyloxy-1-n-butyl-2,2,6,6-tetramethylpiperydine), dimethyl-bis(2,2,6,6-tetramethylpiperidine-4-oxy)-silane, phenyl-tris(2,2,6,6-tetramethylpiperidine-4-oxy)-silane, tris(1-propyl-2,2,6,6-tetramethyl-4-piperidyl)-phosphite, tris(1-propyl-2,2,6,6-tetramethyl-4-piperidyl)-phosphate, phenyl-[bis(1,2,2,6,6-pentamethyl-4-piperidyl)]-phosphonate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylic acid amide, tetrakis (1,2,2,6,6-pentamethyl-4-piperidyl)1,2,3,4-butanetetracarbonamide, and the like.

Examples of a hindered amine compound are 2-dibutylamino-4,6-bis(9-aza-3-ethyl-8,8,10,10-tetramethyl-1,5-dioxaspiro[5.5]-3-undecylmethoxy)-s-triazine, 2-dibutylamino-4,6-bis(9-aza-3-ethyl-8,8,9,10,10-pentamethyl-1,5-dioxaspiro[5.5]-3-undecylmethoxy)-s-triazine, tetrakis(9-aza-3-ethyl-8,8,10,10-tetramethyl-1,5-dioxaspiro[5.5]-3-undecylmethyl)-1,2,3,4-butanetetracarboxylate, tetrakis(9-aza-3-ethyl-8,8,9,10,10-pentamethyl-1,5-dioxaspiro[5.5]-3-undecylmethyl)-1,2,3,4-butanetetracarboxylate, tridecyletris(2,2,6,6-tetramethyl-4-piperidyl)1,2,3,4 -butanetetracarboxylate, tridecyl-tris(1,2,2,6,6-pentamethyl-4-piperidyl)1,2,3,4-butanetetracarboxylate, di(tridecyl) bis(2,2,6,6-tetramethyl-4-piperidyl)1,2,3,4-butanetetracarboxylate, di(tridecyl)-bis(1,2,2,6,6-pentamethyl-4-piperidyl)-1,2,3,4-butanetetracarboxylate, 2,2,4,4-tetramethyl-7-oxa-3,20-diazadispiro[5.1.11.2]heneicosane-21-one, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl) butylcarbonyloxy}ethyl]-2,4,8,10-tetraoxaspiro[5.5] undecane, and the like.

Examples of a hindered amine compound are poly(2,2,6,6-tetramethyl-4-piperidylacrylate), poly(1,2,2,6,6-pentamethyl-4-piperidylacrylate), poly(2,2,6,6-tetramethyl-4-piperidylmethacrylate), poly(1,2,2,6,6-pentamethyl-4-piperidylmethacrylate), poly[[bis(2,2,6,6-tetramethyl-4-piperidyl)itaconate][vinylbutylether]], poly[[bis(1,2,2,6,6-pentamethyl-4-piperidyl)itaconate](vinylbutylether]], poly [[bis(2,2,6,6-tetramethyl-4-piperidyl)itaconate] [vinyloctylether]], poly[[bis(1,2,2,6,6-pentamethyl-4-piperidyl)itaconate][vinyloctylether]], dimethylsuccinate-2-(4-hydroxy-2,2,6,6-tetramethylpiperidyl)ethanol condensation products, and the like.

Examples of a hindered amine compound are poly [hexamethylene[(2,2,6,6-tetramethyl-4-piperidyl)imino]], poly[ethylene[[2,2,6,6-tetramethyl-4-piperidyl)imino] hexamethylene[(2,2,6,6-tetramethyl-4-piperidyl)imino]], poly[[1,3,5-triazine-2,4-diyl][(2,2,6,6-tetramethyl-4-piperidyl)imino]]hexamethylene[(2,2,6,6-tetramethyl-4- piperidyl)imino]], poly[[6-(diethylimino)-1,3,5-triazine-2,4-diyl][(2,2,6,6-tetramethyl-4-piperidyl)imino]hexamethylene[[2,2,6,6-tetramethyl-4-piperidyl)imino]], poly[[6-[(2-ethylhexyl)imino]-1,3,5-triazine-2,4-diyl][(2,2,6,6-tetramethyl-4-piperidyl)imino]hexamethylene[(2,2,6,6-tetramethyl-4-piperidyl)imino]], poly[[6-[(1,1,3,3-tetramethylbutyl)imino]-1,3,5-triazine-2,4-diyl][(2,2,6,6-tetramethyl-4-piperidyl)imino]hexamethylene[(2,2,6,6-tetramethyl-4-piperidyl)imino]], poly[[6-(cyclohexylimino)-1,3,5-triazine-2,4-diyl][(2,2,6,6-tetramethyl-4-piperidyl)imino]hexamethylene[(2,2,6,6-tetramethyl-4-piperidyl)imino]], poly[[6-morpholino-1,3,5-triazine-2,4-diyl][(2,2,6,6-tetramethyl-4-piperidyl)imino]hexamethylene[(2,2,6,6-tetramethyl-4-piperidyl)imino]], poly[[6-(butoxyimino)-1,3,5-triazine-2,4-diyl][(2,2,6,6-tetramethyl-4-piperidyl)imino]hexamethylene[(2,2,6,6-tetramethyl-4 -piperidyl)imino]], poly[[1,1,3,3-tetramethylbutyl)oxy]-1,3,5-triazine-2,4-diyl][(2,2,6,6-tetramethyl-4-piperidyl)imino]hexamethylene[(2,2,6,6-tetramethyl-4-piperidyl)imino]], and the like.

Examples of a hindered amine compound are poly[oxy[6-[(1-piperidyl)-1,3,5-triazine-2,4-diyloxy-1,2-ethanediyl][(2,2,6,6-tetramethyl-3-oxo-1,4-piperidyl)-1,2-ethanediyl][(3,3,5,5-tetramethyl-2-oxo-1,4-piperidyl)-1,2-ethanediyl]], poly[oxy[6-[1,1,3,3-tetramethylbutyl)imino]-1,3,5-triazine-2,4-diyloxy-1,2-ethanediyl][(2,2,6,6-tetramethyl-3-oxo-1,4-piperidyl)-1,2-ethanediyl][(3,3,5,5-tetramethyl-2-oxo-1,4-piperidyl)-1,2-ethanediyl]], poly[[6-[(ethylacetyl)imino]-1,3,5-triazine-2,4-diyl][(2,2,6,6-tetramethyl-4-piperidyl)imino)hexamethylene[(2,2,6,6-tetramethyl-4-piperidyl)imino]], poly[[6-[(2,2,6,6-tetramethyl-4-piperidyl)butylimino]-1,3,5-triazine-2,4-diyl][(2,2,6,6-tetramethyl-4-piperidyl)imino]hexamethylene[(2,2,6,6-tetramethyl-4-piperidyl)imino]], and the like.

Examples of a hindered amine compound are 1,6,11-tris[{4,6-bis(N-butyl-N-(2,2,6,6-tetramethyl-4-piperidyl)amino)-1,3,5-triazine-2-yl}amino]undecane, 1,6,11-tris[{4,6-bis(N-butyl-N-(1,2,2,6,6-pentamethyl-4-piperidyl)amino)-1,3,5-triazine-2-yl}amino]undecane, 1,6,11-tris[{4,6-bis(N-octyl-N-(2,2,6,6-tetramethyl-4-piperidyl)amino)-1,3,5-triazine-2 -yl}amino]undecane, 1,6,11-tris[{4,6-bis(N-octyl-N-(1,2,2,6,6-pentamethyl-4-piperidyl)amino)-1,3,5-triazine-2-yl}amino]undecane, 1,5,8,12-tetrakis[4,6-bis(N-(2,2,6-6-tetramethyl-4-piperidyl)-butylamino)-1,3,5-triazine-2-yl]-1,5,8,12-tetraazadodecane, 1,5,8,12-tetrakis[4,6-bis(N-(1,2,2,6,6-pentamethyl-4-piperidyl)-butylamino)-1,3,5-triazine-2-yl]-1,5,8,12-tetraazadodecane, and the like.

Examples of an aminotriazine compound are 2,4,6-triamino-1,3,5-triazine, 2,4-diamino-6-methyl-1,3,5-triazine, 2,4-diamino-6-phenyl-1,3,5-triazine, 1,4-bis(3,5-diamino-2,4,6-triazinyl)butane, 3,9-bis[2-(3,5-diamino-2,4,6-triazaphenyl)ethyl]-2,4,8,10-tetraoxaspiro[5.5]undecane, and the like.

Examples of metals for the above metal salts include lithium, sodium, potassium, magnesium, calcium, strontium, barium, zinc or aluminum. Those metal salts can exist as a normal salt or basic salt. Examples of preferred metal salts include fatty acid metal salts, alkanoyl lactic acid metal salts, aliphatic hydroxy acid metal salts, hydrotalcites, lithium aluminum complex hydroxide salts, metal oxides, metal hydroxides, metal carbonates, metal aliphatic phosphates, epoxy compounds, aliphatic amines, aliphatic amides, hindered amine compounds, aminotriazine compounds or a mixture thereof. Those halogen scavengers can be either alone or in combinations of two kinds or more.

The amount of the halogen scavengers for addition is 0.001 to 2 weight parts to 100 weight parts of the polypropylene composition (PP) as a component A, preferably 0.005 to 1.5 weight parts, particularly preferably 0.01 to 1 weight part.

For the compositions according to the present invention, additives for polypropylene, other than the above halogen scavengers, can be used so as to accomplish the objects of the present invention. Examples of the additives include light stabilizers, metal deactivators, clarifiers, nucleating agents, lubricants, antistatic agents, anti-fogging agents, anti-blocking agents, anti-dropping agents, radical generators such as peroxide, flame retardants, flame retardant assistants, pigments, organic or inorganic anti-bacterial agents, inorganic fillers such as talc, mica, clay, wollastonite, zeolite, kaolin, bentonite, perlite, diatomaceous earth, asbestos, silicon dioxide, titanium dioxide, zinc sulfate, barium sulfate, magnesium sulfate, calcium silicate, aluminum silicate, glass fiber, potassium titanate, carbon fiber, carbon black, graphite or metal fiber, coupling agents such as silane-based, titanate-based, boron-based, aluminate-based or zirco aluminate-based coupling agents, inorganic fillers treated with a surface active agent such as a coupling agent and organic fillers such as wood meal, pulp, recycled paper, synthetic fiber or natural fiber.

The obtained polypropylene compositions can be mixed with a variety of additives or synthetic fiber if required. Examples of the additives include antioxidants, ultraviolet absorbers, antistatic agents, nucleating agents, lubricants, flame retardants, anti-blocking agents, colors, organic or inorganic fillers. Afterward, the compositions are usually subjected to heat treatment, melting and kneading. Further, the compositions are shaped to granulated-cut pellets and supplied to produce a variety of molded products.

Examples

Hereinafter the present invention will be explained in further details with reference to examples and comparative examples.

Definitions of the terms and measurement methods used in the examples and comparative examples are as follows. Further, in the following examples and comparative examples, polypropylene may be abbreviated as PP, and polyethylene as PE. (1) Intrinsic viscosity [η] :values of the limiting viscosity in tetralin at 135° C. measured with an Ostwald 's viscometer produced by Mitsui Toatsu Chemicals Inc. (unit:dl/g). (2) Melt tension (MS):values measured with a Melt Tension II produced by Toyo Seiki Seisaku-sho, Ltd. (unit:cN). (3) Crystallization temperature (Tc):values measured with a Differential Scanning Calorimetry VII produced by Perkin-Elmer, Ltd. of the temperature indicating the maximum value of the heat absorption at the crystallization of a polypropylene composition after raising the temperature from room temperature to 230° C. in the temperature rising condition of 30° C./minute, maintaining the same temperature for 10 minutes, lowering the temperature to −20° C. in the condition of −20° C./minute, maintaining the same temperature for 10 minutes, raising the temperature to 230° C. in the temperature rising condition of 20° C. /minute, maintaining the same temperature for 10 minutes, lowering the temperature to 150° C. in the condition of −180° C./minute, and further lowering the temperature by −5° C. /minute (unit:° C.). (4) Thermal stability:pellets of a polyolefin composition were prepared by mixing 0.1 weight part of 2,6-di-t-butyl-p-cresol and 0.1 weight part of calcium stearate to 100 weight parts of polyolefin composition, and melting and mixing and then pelletizing the mixture at 230° C. with an extruder having a screw diameter of 40 mm.

Melt flow rates (MFR) (unit:g/10 minutes) of the pellets obtained in the above mentioned operation and the pellets obtained by further processing by the above mentioned melting and kneading, and pelletizing with the extruder two more times were measured based on the condition 14 of Table 1 of the JIS K 7210. The condition 14 in Table 1 of JIS K7210 is a general method for measuring a melt flow rate of a sample, and measures a weight of a sample melted at 230° C. and extruded through a die with an inner diameter of 2.095±0.005 mm in 10 minutes when applying a load of 2.16 kg to the sample. The difference between the MFRs of the pellets finally obtained and the pellets initially obtained (final pellets' MFR−initial pellets' MFR=ΔMFR) was calculated as the thermal stability.

A smaller difference (ΔMFR) indicates a better thermal stability. (5) Coloring-preventing property:Using the same pellets used in measuring the above mentioned thermal stability, the yellowness index (YI) of the pellets obtained initially and the pellets finally obtained by further processing by the pelletization of two more times were measured based on the JIS K7103, and the difference between the yellowness index of the pellets finally obtained and the pellets initially obtained (ΔYI p final pellets' YI−initial pellets' YI) was calculated.

A smaller difference (YI) indicates a better coloring-preventing property.

Example 1

(1) Preparation of catalyst composition including transition metal compound 0.3 liter of decane, 48 g of magnesium chloride anhydride, 170 g of orthotitanate-n-butyl and 195 g of 2-ethyl-1-hexanol were mixed in a stainless steel polymerization reactor with an agitator, then dissolved by kneading at 130° C. for one hour to form a u niform solution. The uniform solution was he ated to 70° C., then 18 g of di-i-butyl phthalate was added thereto while kneading. One hour later, 520 g of silicon tet rachloride was added over 2.5 hour to have a solid precipitated and further maintained at 70° C. for one hour. The solid was separated from the solution and washed with hexane to obtain a solid product.

All the solid product was mixed with 1.5 liters of titanium tetrachloride dissolved in 1.5 liters of 1,2-dichloroethane. 36 g of di-i-butyl phthalate was added thereto and the mixture was reacted for two hours at 100° C. while kneading. The liquid phase portion was eliminated by decantation at the same temperature, then 1.5 liters of 1,2-dichloroethane and 1.5 liters of titanium tetrachloride were added and maintained at 100° C. for two hours while kneading. Then by washing with hexane and drying, a supported titanium catalyst component (transitional metal compound catalyst component) containing 2.8 weight % of titanium was obtained.

(2) Preparation of preactivated catalyst

After providing a nitrogen gas atmosphere in a 5 liter capacity stainless steel polymerization reactor having an inclined-turbine agitator, 2.8 liters of n-hexane, 4 millimole of triethyl aluminum (organic metal compound (AL1)) and 9.0 g of the supported titanium catalyst component prepared as mentioned above (5.26 millimole per 1 mole Ti atom) were added, and then 20 g of propylene was supplied to conduct a preliminary polymerization for 10 minutes at −2° C.

Polymer generated in a preliminary polymerization obtained in the same conditions was analyzed and it was found that 2 g of propylene became polypropylene (B) per 1 g of the supported titanium catalyst component, and the intrinsic viscosity $[\eta_B]$ of the polypropylene (B) measured in tetralin of 135° C. was 2.8 dl/g.

After the reaction period, unreacted propylene was discharged outside the reaction container. After substituting the gas phase portion in the polymerization reactor with a nitrogen gas, ethylene was supplied continuously for two hours so as to maintain the inside pressure at 0.59 MPa with an inside temperature of −1° C. to conduct the preliminary activation.

Polymer generated in a preliminary activated polymerization obtained in the same conditions was analyzed and it was found that 24 g of polymer existed per 1 g of the supported titanium catalyst component, and the intrinsic viscosity $[\eta_{T2}$ measured in tetralin at 135° C. was 31.4 dl/g.

The amount ($W_2$) of polyethylene (A) per 1 g of the supported titanium catalyst component generated in the preliminary activating polymerization with ethylene can be calculated as the difference between the polymer generation amount ($W_{T2}$) per 1 g of the supported titanium catalyst component after the preliminary activating treatment and the polypropylene (B) generation amount (W1) per 1 g of the supported titanium catalyst component after the preliminary polymerization by the following formula $$W_2=W_{T2}-W_1.$$

The intrinsic viscosity $[\eta_E]$ of polyethylene (A) generated in the preliminary activating polymerization with ethylene can be calculated from the intrinsic viscosity $[\eta_B]$ of polypropylene (B) generated in the preliminary polymerization and the intrinsic viscosity $[\eta T_2]$ of the polymer generated in the preliminary activating treatment by the following formula:

$$[\eta_{E]=(\eta T2}]\times W_{T2}-[\eta_B]\times W_1)/(W_{T2}-W_1)=[\eta_E].$$

According to the above mentioned formulae, the amount of the polyethylene (A) generated in the preliminary activating polymerization with ethylene was 22 g per 1 g of the supported titanium catalyst component and the intrinsic viscosity $[\eta_E]$ was 34.0 dl/g.

After the reaction period, unreacted ethylene was discharged outside the polymerization reactor. After substituting the gas phase portion of the polymerization reactor with a nitrogen gas and adding 1.6 millimole of diisopropyldimethoxy silane (electron donor (E1)), 20 g of propylene was supplied and maintained for 10 minutes at 1° C. to conduct the addition polymerization after the preliminary activating treatment.

Polymer generated in an addition polymerization obtained in the same conditions was analyzed and it was found that 26 g of polymer existed per 1 g of the supported titanium catalyst component, and the intrinsic viscosity $[\eta_{T3}]$ measured in tetralin at 135° C. was 29.2 dl/g. The generation amount ($W_3$) of polypropylene generated in the addition polymerization calculated as mentioned above was 2 g per 1 g of the supported titanium catalyst component, and the intrinsic viscosity $[\eta_C]$ was 2.8 dl/g.

After the reaction period, unreacted propylene was discharged outside the polymerization reactor. The gas phase portion of the polymerization reactor was substituted with a nitrogen gas once to obtain the preactivated catalyst slurry of the main (co-)polymerization.

(3) Production of polypropylene composition (main (co-) polymerization of propylene)

After providing a nitrogen gas atmosphere in a 500 liter capacity stainless steel polymerization reactor with an agitator, 240 liters of n-hexane, 780 millimole of triethyl aluminum (organic metal compound (AL2)), 78 millimole of diisopropyldimethoxy silane (electron donor (E2)) and ½ amount of the preactivated catalyst slurry obtained as mentioned above were added at 20° C. Then after introducing 55 liters of hydrogen into the polymerization reactor and raising the temperature to 70° C., propylene was continuously supplied into the polymerization reactor so as to maintain the pressure of the gas phase portion in the polymerization reactor at 0.79 MPa for two hours in the condition of the polymerization temperature of 70° C. to conduct the main polymerization of propylene.

After the polymerization duration, 1 liter of methanol was introduced to the polymerization reactor and the catalyst deactivation reaction was conducted at 70° C. for 15 minutes. Then after discharging the unreacted gas, the solvent was separated and the polymer was dried to obtain 40.1 kg of a polymer having the intrinsic viscosity [$\eta_T$] of 1.97 dl/g.

The obtained polymer was a polypropylene composition containing 0.25 weight % of the polyethylene (A) according to the preliminary activating polymerization as the (a) component and the intrinsic viscosity [$\eta_P$] of the polypropylene as the (b) component was 1.89 dl/g.

0.1 weight part of 2,6-di-t-butyl-p-cresol and 0.1 weight part of calcium stearate were mixed to 100 weight parts of the obtained polypropylene composition. The mixture was pelletized at 230° C. with an extruder having a screw diameter of 40 mm to have pellets. Various physical properties of the pellets were measured and evaluated to find the MFR, the crystallization temperature, and the melt tension (MS) to be 3.5 g/10 minutes, 122.5° C. and 4.9 cN, respectively. Detailed physical properties are shown in Table 1.

Example 2

Comparative Example 1

Polypropylene compositions were produced using the same conditions as in example 1 except that the preliminary activating polymerization conditions with ethylene were changed to change the generated amount of polyethylene (A) to prepare the evaluation specimens of example 2 and comparative example 1.

Various physical properties of the obtained polypropylene compositions are shown in Table 1.

Comparative Example 2

A polypropylene composition was produced using the same conditions as in example 1 (2) except that the preliminary activating polymerization with ethylene was replaced by the procedure that the 220 g of propylene was supplied into the polymerization reactor in three steps; 80 g at initiating the preliminary activating polymerization, 80 g at 30 minutes after the initiation and 60 g at one hour after the initiation to prepare the evaluation specimen of comparative example 2.

Various physical properties of the obtained polypropylene composition are shown in Table 1.

Comparative Example 3

A polypropylene composition was produced using the same conditions as in example 1 except that the preliminarily activated polymerization with ethylene of the supported catalyst component containing titanium was not conducted.

Various physical properties of the obtained polypropylene compositions are shown in Table 1.

Comparative Example 4

After providing a nitrogen gas atmosphere in a stainless steel polymerization reactor having an inclined-turbine agitator, 10 kg of propylene homopolymer powders having an intrinsic viscosity [$\eta_T$] of 1.67 dl/g and an average particle size of 150 μm obtained by the slurry polymerization of propylene in n-hexane using a catalyst prepared by combining a catalyst titanium component comprising a titanium trichloride composition, diethyl aluminum chloride and diethylene glycol dimethyl ether as the third component were added. Then after repeating 10 times the operation to have a vacuum inside the polymerization reactor and supplying a nitrogen gas to the atmospheric pressure, a 70 weight % concentration toluene solution of 0.35 mole of di-2-ethyl hexyl peroxydicarbonate (reforming agent) was added and mixed in the nitrogen gas atmosphere at 25° C. while kneading. The temperature in the polymerization reactor was raised to 120° C. and maintained for 30 minutes for reaction. After the reaction period, the temperature in the polymerization reactor was raised to 135° C. and the after-treatment was conducted at the same temperature for 30 minutes. After the after-treatment, the polymerization reactor was cooled to the room temperature and then opened to obtain polypropylene.

0.1 weight part of 2,6-di-t-butyl-p-cresol and 0.1 weight part of calcium stearate were mixed to 100 weight parts of the obtained polypropylene composition. The mixture was pelletized at 230° C. with an extruder having a screw diameter of 40 mm to form pellets to prepare the evaluation specimen of comparative example 4.

Various physical properties of the pellets obtained in the examples 1–2 and the comparative examples 1–4 were evaluated and the results are shown in Table 1.

TABLE 1

| | Examples | | Comparative Examples | | | |
|---|---|---|---|---|---|---|
| | 1 | 2 | 1 | 2[3] | 3 | 4 |
| Preliminary polymerization <polypropylene (B)> Intrinsic viscosity [$\eta_B$] (dl/g) | 2.8 | 2.8 | 2.8 | 2.8 | 2.8 | — |
| Generated amount[1] (g/g) | 2.0 | 2.0 | 2.0 | 2.0 | 2.0 | — |
| Composition ratio[2] (wt %) | 0.02 | 0.02 | 0.02 | 0.02 | 0.02 | — |
| Preliminary activation <polyethylene (A)> Intrinsic viscosity [$\eta_E$] (dl/g) | 34.0 | 34.0 | 34.0 | 2.8 | — | — |
| Generated amount[1] (g/g) | 22.0 | 4.5 | 0.005 | 22.0 | — | — |
| Composition ratio[2] (wt %) | 0.25 | 0.05 | 0.0001 | 0.25 | — | — |
| Addition polymerization <polypropylene (C)> Intrinsic viscosity [$\eta_C$] (dl/g) | 2.8 | 2.8 | 2.8 | 2.8 | 2.8 | — |
| Generated amount[1] (g/g) | 2.0 | 2.0 | 2.0 | 2.0 | 2.0 | — |
| Composition ratio[2] (wt %) | 0.02 | 0.02 | 0.02 | 0.02 | 0.02 | — |
| Polymerization process Intrinsic viscosity [$\eta_D$] (dg/l) | 1.89 | 1.90 | 1.89 | 1.89 | 1.89 | 1.67 |
| Composition ratio[2] (wt %) | 99.7 | 99.9 | 100 | 99.7 | 100 | 100 |
| Propylene (co-)polymer Intrinsic viscosity [$\eta_P$] (dl/g) | 1.89 | 1.90 | 1.89 | 1.89 | 1.89 | 1.67 |
| Propylene (co-)polymer composition Intrinsic viscosity [$\eta_T$] (dl/g) | 1.97 | 1.92 | 1.89 | 1.89 | 1.89 | 1.67 |
| Melt tension (MS) (cN) | 4.9 | 2.0 | 1.0 | 0.8 | 0.8 | 7.2 |
| Crystallization temperature (° C.) | 122.5 | 121.3 | 117.0 | 116.2 | 116.0 | 129.4 |

TABLE 1-continued

| | Examples | | Comparative Examples | | | |
|---|---|---|---|---|---|---|
| | 1 | 2 | 1 | 2[3] | 3 | 4 |
| MFR initial (g/10 minutes) | 3.5 | 4.1 | 4.5 | 4.5 | 4.5 | 9.2 |
| final (g/10 minutes) | 3.6 | 4.3 | 4.6 | 4.6 | 4.6 | 17.5 |
| ΔMFR (g/10 minutes) | 0.1 | 0.2 | 0.1 | 0.1 | 0.1 | 8.3 |

Note 1: Generated amount (g) per 1 g of transitional metal compound catalyst component
Note 2: Composition ratio (wt %) in the propylene (co-)polymer composition
Note 3: Comparative example 2; propylene was used as the monomer for the preliminary activation.

Example 3

(1) Preparation of catalyst composition including transition metal compound 37.5 liters of decane, 7.14 kg of magnesium chloride anhydride, 35.1 liters of 2-ethyl-1-hexanol were mixed in a stainless steel polymerization reactor with an agitator, then dissolved by kneading at 140° C. for 4 hours to provide a uniform solution. To the uniform solution, 1.67 kg of phthalic anhydride was added and further kneaded and mixed for one hour at 130° C. to dissolve the phthalic anhydride into the uniform solution.

After cooling all the obtained uniform solution to a room temperature (23° C.), all the uniform solution was dropped into 200 liters of titanium tetrachloride maintained at −20° C. over three hours. After the dropping, the solution was heated to 110° C. over four hours. When the temperature reached 110° C., 5.03 liters of di-i-butyl phthalate was added and kneaded for two hours at 110° C. for reaction. After the two hour reaction, the solid portion was collected by heat filtration. The solid portion was resuspended with 275 liters of titanium tetrachloride, and maintained at 110° C. for two hours again for reaction.

After the reaction, again the solid portion was collected by heat filtration. The solid portion was washed with n-hexane sufficiently so that titanium radicals are not detected in the rinsing liquid. Subsequently, the solvent was separated by filtration, and the solid portion was dried under a reduced pressure to obtain a supported titanium catalyst component (transitional metal compound catalyst component) containing 2.4 weight % of titanium.

(2) Preparation of preactivated catalyst

After substituting a 30 liter capacity stainless steel polymerization reactor having an inclined-turbine agitator with a nitrogen gas, 18 liters of n-hexane, 60 millimole of triethyl aluminum (organic metal compound (AL1)) and 150 g of the supported titanium catalyst component prepared as mentioned above (75.16 millimole per 1 mole titanium atom) were added, then 210 g of propylene was supplied to conduct a preliminary polymerization for 20 minutes at −1° C.

Polymer generated in a preliminary polymerization obtained under the same conditions was analyzed and it was found that 1.2 g of polypropylene (B) was generated per 1 g of the supported titanium catalyst component, and the intrinsic viscosity $[\eta_B]$ measured in tetralin at 135° C. of polypropylene (B) was 2.7 dl/g.

After the reaction period, unreacted propylene was discharged outside the polymerization reactor. After substituting the gas phase portion with a nitrogen gas once, ethylene was supplied continuously for three hours to the polymerization reactor so as to maintain the inside pressure at 0.59 MPa with the inside temperature at −1° C. to conduct the preliminary activating polymerization.

Polymer generated in a preliminary activating polymerization obtained in the same conditions was analyzed and it was found that 33.2 g of polymer existed per 1 g of the supported titanium catalyst component, and the intrinsic viscosity $[\eta_{T2}]$ measured in tetralin at 135° C. was 29.2 dl/g.

The amount of polyethylene (A) generated in the preliminary activating polymerization with ethylene per 1 g of the supported catalyst component containing titanium and the intrinsic viscosity $[\eta_E]$ were found to be 32 g per 1 g of the supported titanium catalyst component and 30.2 dl/g, respectively.

After the reaction period, unreacted ethylene was discharged outside the polymerization reactor. After substituting the gas phase portion with a nitrogen gas once, and adding 22.5 millimole of diisopropyldimethoxy silane (electron donor (E1)) into the polymerization reactor, 385 g of propylene was supplied and maintained for 20 minutes at 0 ° C. to conduct the addition polymerization after the preliminary activating treatment. After the reaction period, unreacted propylene was discharged outside the reaction container and the gas phase portion of the reaction container was substituted with nitrogen to obtain a preactivated catalyst slurry of the main (co-)polymerization.

Polymer generated in an addition polymerization obtained using the same conditions was analyzed and it was found that 35.4 g of polymer existed per 1 g of the supported titanium catalyst component, and the intrinsic viscosity $[\eta_{T3}]$ of the polymer measured in tetralin at 135° C. was 27.6 dl/g.

From the above mentioned results, the amount of polypropylene generated in the addition polymerization was 2.2 g per 1 g of the supported titanium catalyst component, and the intrinsic viscosity $[\eta_C]$ was 2.8 dl/g.

(3) Production of polypropylene composition (main (co-) polymerization of propylene)

After providing a nitrogen gas atmosphere in a 110 liter capacity continuous horizontal gas phase polymerization reactor with an agitator (length/diameter =3.7), 25 kg of polypropylene powders were introduced, and further 0.61 g/h of the preactivated catalyst slurry as the supported titanium catalyst component and 15 weight % n-hexane solution of triethyl aluminum (organic metal compound (AL2)) and diisopropyl dimethoxy silane (electron donor (E2)) were continuously supplied so that the respective molar ratios became 90 and 15 based on the titanium atoms in the supported titanium catalyst component.

Further, under the condition of polymerization temperature of 70° C., hydrogen was supplied so as to have the hydrogen/propylene ratio in the polymerization reactor became 0.006, and further, propylene was supplied so as to maintain the pressure inside the polymerization reactor at 2.15 MPa to conduct the gas phase polymerization of propylene continuously for 150 hours.

During the polymerization period, polymer was taken out from the polymerization reactor at the rate of 11 kg/h so as to maintain the polymer level in the polymerization reactor at 60 volume % .

The taken-out polymer was treated by contacting with a nitrogen gas containing 5 volume % of water vapor at 100° C. for 30 minutes to obtain a polymer having an intrinsic viscosity $[\eta_T]$ of 1.80 dl/g.

The ratio of polyethylene (A) generated by the preliminary activating treatment in the polymer was 0.18 weight % and the intrinsic viscosity $[\eta p]$ of polypropylene was 1.75 dl/g.

Subsequently, using the same conditions as example 1, polymer pellets were prepared with an extruder. Various physical properties of the pellets were measured and evaluated to find the MFR, the crystallization temperature, and the melt tension (MS) to be 6.0 g/10 minutes, 122.0 ° C. and 2.5 cN, respectively.

Example 4

A polypropylene composition was produced using the same conditions as example 3 except that the hydrogen/propylene ratio in the gas phase was altered to 0.008 to change the MFR in example 3 to prepare the evaluation specimen of example 4.

Various physical properties of the obtained polypropylene composition are shown in Table 2.

Comparative Example 5

A polymer was produced using the same conditions as example 3 except that the preliminary activating polymerization with ethylene was not conducted to prepare the evaluation specimen of comparative example 5.

Various physical properties of the obtained polymer are shown in Table 2.

Example 5

(1) Preparation of catalyst composition including transition metal compound

Using the same conditions as example 3, a supported titanium catalyst component was obtained.

(2) Preparation of preactivated catalyst

Using the same preliminary activating polymerization conditions the same as example 3 (2) except that the reaction temperature was 0° C., 30 g of propylene was supplied in addition to ethylene and the reaction temperature was 45 minutes, a preactivated catalyst slurry was obtained.

A catalyst obtained by processing with the preliminary activating treatment using the same conditions was analyzed and it was found that 23.2 g of polymer existed per 1 g of the supported titanium catalyst component, and the intrinsic viscosity $[\eta_{T2}]$ of the polymer measured in tetralin at 135° C. was 21.5 dl/g and an ethylene-propylene random copolymer (A) having an intrinsic viscosity $[\eta_E]$ of 22.5 dl/g and a propylene polymerization unit containing ratio of 0.7 weight % (constant by C-NMR) was generated in the amount of 22 g per 1 g of the supported titanium catalyst component by the preliminary activating treatment.

A polymer obtained by the addition polymerization after the preliminary activating treatment using the same conditions was analyzed and it was found that 25.3 g of polymer existed per 1 g of the supported titanium catalyst component, and the intrinsic viscosity $[\eta_{T3}]$ of the polymer measured in tetralin at 135° C. was 19.9 dl/g and a polymer having an intrinsic viscosity $[\eta_C]$ of 2.2 dl/g was generated in the amount of 2.1 g per 1 g of the supported titanium catalyst component by the addition polymerization.

(3) Production of polypropylene composition (main (co-) polymerization of propylene)

A polymer having an intrinsic viscosity $[\eta_T]$ of 1.54 dl/g and the ethylene polymerization unit of 0.8 weight % was obtained at the rate of 11.6 kg/h by conducting the gas phase polymerization for 150 hours continuously using the same conditions as example 3 (3) except that the preactivated catalyst slurry obtained in the above mentioned (2) was used as the preactivated catalyst slurry, the hydrogen/propylene ratio in the gas phase was 0.012, and ethylene was supplied in addition to propylene so that the ratio with respect to the propylene concentration in the polymerization reactor is kept at 0.003 continuously.

The ratio of the ethylene-propylene random copolymer (A) in the polymer generated in the preliminary activating treatment was 0.12 weight %, and the intrinsic viscosity $[\eta_P]$ of the propyleneethylene copolymer was 1.52 dl/g.

Subsequently, in the same conditions as example 1 (3), polypropylene composition pellets were prepared with an extruder. Various physical properties of the pellets were measured and evaluated to find the MFR, the crystallization temperature, and the melt tension (MS) to be 15.4 g/10 minutes, 121.2 ° C. and 1.4 cN, respectively.

Comparative Example 6

A polymer was produced using the same conditions as example 5 except that the preliminary activating polymerization with ethylene and propylene was not conducted to prepare the evaluation specimen of comparative example 6.

Various physical properties of the obtained polymer are shown in Table 2.

Comparative Example 7

Only the preliminary activating polymerization with ethylene in example 1 (2) was conducted without the preliminary polymerization with propylene nor the addition polymerization. 1 liter of methanol was added to the obtained preactivated catalyst slurry to conduct the deactivation of the catalyst for one hour at 70° C. After the reaction, polyethylene was separated from the slurry by filtration, then dried under a reduced pressure to obtain 200 g of polyethylene having an intrinsic viscosity $[\eta_E]$ of 32.5 dl/g.

20 kg of polypropylene obtained by the main polymerization of propylene without the preliminary activating polymerization with ethylene nor the addition polymerization with propylene in example 1 (2), and 50 g of the above mentioned prepared polyethylene were mixed. Further, 20 g of 2,6-di-t-butyl-p-cresol and 20 g of calcium stearate were added and mixed for 3 minutes in a 100 liter capacity Henschel mixer. Then the mixture was pelletized with an extruder having a screw diameter of 40 mm at 230° C. to prepare the evaluation specimen of comparative example 7.

Various physical properties of the obtained pellets include an intrinsic viscosity $[\eta_T]$ of 1.97 dl/g, MFR of 3.5 g/10 minutes, the crystallization temperature of 116.2° C. and the melt tension (MS) of 1.0 cN.

TABLE 2

| | Examples | | | Comparative Examples | | |
|---|---|---|---|---|---|---|
| | 3 | 4 | 5[3] | 5 | 6 | 7[4] |
| Preliminary polymerization <polypropylene (B)> Intrinsic viscosity $[\eta_B]$ (dl/g) | 2.7 | 2.7 | 2.7 | 2.7 | 2.7 | — |
| Generated amount[1] (g/g) | 1.2 | 1.2 | 1.2 | 1.2 | 1.2 | — |
| Composition ratio[2] (wt %) | 0.01 | 0.01 | 0.01 | 0.01 | 0.01 | — |
| Preliminary activation <polyethylene (A)> Intrinsic viscosity $[\eta_E]$ (dl/g) | 30.2 | 30.2 | 22.5 | — | — | 32.5 |
| Generated amount[1] (g/g) | 32.0 | 32.0 | 22.0 | — | — | — |
| Composition ratio[2] (wt %) | 0.18 | 0.17 | 0.12 | — | — | 0.25 |

TABLE 2-continued

| | Examples | | | Comparative Examples | | |
|---|---|---|---|---|---|---|
| | 3 | 4 | 5[3] | 5 | 6 | 7[4] |
| Addition polymerization <polypropylene (C)> Intrinsic viscosity [$\eta_C$] (dl/g) | 2.8 | 2.8 | 2.2 | 2.8 | 2.2 | — |
| Generated amount[1] (g/g) | 2.2 | 2.2 | 2.1 | 2.2 | 2.1 | — |
| Composition ratio[2] (wt %) | 0.01 | 0.01 | 0.01 | 0.01 | 0.01 | — |
| Polymerization process Intrinsic viscosity [$\eta_D$] (dg/l) | 1.75 | 1.63 | 1.52 | 1.75 | 1.52 | 1.89 |
| Composition ratio[2] (wt %) | 99.8 | 99.8 | 99.9 | 100 | 100 | 99.7 |
| Propylene (co-)polymer Intrinsic viscosity [$\eta_P$] (dl/g) | 1.75 | 1.63 | 1.52 | 1.75 | 1.52 | 1.89 |
| Propylene (co-)polymer composition Intrinsic viscosity [$\eta_T$] (dl/g) | 1.80 | 1.68 | 1.54 | 1.75 | 1.52 | 1.97 |
| Melt tension (MS) (cN) | 2.5 | 2.4 | 1.4 | 0.6 | 0.3 | 1.0 |
| Crystallization temperature (° C.) | 122.0 | 122.7 | 121.2 | 116.1 | 115.2 | 116.2 |
| MFR initial (g/10 minutes) | 6.0 | 8.1 | 15.4 | 7.2 | 16.7 | 3.5 |
| final (g/10 minutes) | 6.1 | 8.0 | 15.2 | 7.4 | 16.5 | 3.6 |
| ΔMFR (g/10 minutes) | 0.1 | −0.1 | −0.2 | 0.2 | −0.2 | 0.1 |

Note 1: Generated amount (g) per 1 g of transitional metal compound catalyst component
Note 2: Composition ratio (wt %) in the propylene, α-olefin (co-)polymer composition
Note 3: Comparative example 5; a gas mixture of ethylene and propylene was used as the monomer for the preliminary activation
Note 4: Comparative example 7; mechanical simple mixing of polyethylene and main polymerization polypropylene

Example 6

(1) Preparation of catalyst composition including transition metal compound

Using the same conditions as example 3, a supported titanium catalyst component was obtained.

(2) Preparation of preactivated catalyst Using the same conditions as example 3, a preactivated catalyst slurry was obtained.

(3) Production of polypropylene composition (main (co-) polymerization of propylene)

Using the same conditions as example 3 except that hydrogen was supplied so as to have the hydrogen/propylene ratio in the polymerization reactor (I) at 0.002, and propylene was further supplied to maintain the inside pressure of the polymerization reactor at 1.77 MPa to implement the polymerization process (I).

A polymer obtained by the polymerization process using the same conditions was analyzed and it was found that the MFR was 1.1 g/lOminutes, the intrinsic viscosity [$\eta_T$] of the polymer measured in tetralin of 135° C. was 2.39 dl/g. The intrinsic viscosity [$\eta_P$] of polypropylene in the polymerization process (I) was 2.32 dl/g.

The polymer obtained in the above mentioned process was continuously supplied to a polymerization reactor (II) of 60° C. so as to maintain the hydrogen/propylene ratio and the hydrogen/ethylene ratio in the polymerization reactor at 0.003 and 0.2, respectively, and to maintain the pressure inside the polymerization reactor at 1.57 MPa to implement the polymerization process (II).

During the polymerization period, polymer was taken out from the polymerization reactor at the rate of 9.4 kg/h so as to maintain the polymer level in the polymerization reactor at 60 volume % .

The taken-out polymer was treated by contacting with a nitrogen gas containing 5 volume % of water vapor at 100° C. for 30 minutes to obtain a polymer having an intrinsic viscosity [$\eta_T$] of 2.69 dl/g.

The ratio of polyethylene (A) generated by the preliminary activating treatment in the polymer was 0.21 weight % and the intrinsic viscosity [$\eta_P$] of the polypropylene' α-olefin block copolymer composition (b) was 2.63 dl/g.

The polymerization ratio between the polymerization process (I) and the polymerization process (II) was calculated by preparing copolymers having different reaction amount ratios of ethylene/propylene beforehand, and using this as the standard sample to make a calibration curve with the infrared absorption spectrum and find the ethylene/propylene reaction amount ratio in the polymerization process (II), and further calculated from the ethylene containing amount in the entire polymer. The results are shown in Table 3.

Subsequently, using the same conditions as example 1, polymer pellets were prepared with an extruder. Various physical properties of the pellets were measured and evaluated to find the MFR, the crystallization temperature, and the melt tension (MS) to be 0.52 g/10 minutes, 121.9° C. and 5.2 cN, respectively.

Example 7

(1) Preparation of catalyst composition including transition metal compound

Using the same conditions as example 1, a supported titanium catalyst component was obtained.

(2) Preparation of preactivated catalyst

In the preliminary activating polymerization conditions the same as example 1, a preactivated catalyst slurry was obtained.

(3) Production of polypropylene composition (main (co-) polymerization of propylene)

After providing a nitrogen gas atmosphere in a 500 liter capacity stainless steel polymerization reactor with an agitator, 240 liters of n-hexane, 780 millimole of triethyl aluminum (organic metal compound (AL2)), 78 millimole of diisopropyldimethoxy silane (electron donor (E2)) and ½ amount of the preactivated catalyst slurry obtained as mentioned above were added at 20° C. Then after introducing 100 liters of hydrogen into the polymerization reactor and raising the temperature to 70° C., propylene was continuously supplied into the polymerization reactor so as to maintain the pressure of the gas phase portion at 0.79 MPa for 90 minutes at the polymerization temperature of 70° C. to conduct the polymerization process (I). After the polymerization process (I), supply of propylene was terminated and the temperature inside the polymerization reactor was cooled to 30° C., and then hydrogen and unreacted propylene were discharged. A part of the polymerized slurry was taken out for measuring the MFR, which was found to be 7.5.

After raising the temperature inside the polymerization reactor to 60° C., 30 liters of hydrogen was introduced to the polymerization container, and ethylene and propylene were supplied so as to have the supply ratio of the ethylene become 35 weight % continuously for two hours. The entire supplied amount of the ethylene was 7.5 kg.

After the polymerization period, 1 liter of methanol was introduced to the polymerization reactor and the deactivation of catalyst was conducted at 70° C. for 15 minutes. Then after discharging the unreacted gas, the solvent was separated and the polymer was dried to obtain 40.5 kg of a polymer having an intrinsic viscosity $[\eta_T]$ of 1.95 dl/g.

The obtained polymer was a propylene' α-block polymer composition containing 0.26 weight % of polyethylene (A) according to the preliminary activating polymerization as the (a) component and the intrinsic viscosity $[\eta_P]$ of the propylene' α-block polymer composition as the (b) component was 1.87 dl/g.

The polymerization ratio between the polymerization process (I) and the polymerization process (II) was calculated by preparing copolymers having different reaction amount ratios of ethylene/propylene beforehand, and using this as the standard sample to make a calibration curve with the infrared absorption spectrum and find the ethylene/propylene reaction amount ratio in the polymerization process (II), and further calculated from the ethylene containing amount in the entire polymer. The results are shown in Table 3.

Subsequently, using the same conditions as example 1, polymer pellets were prepared with an extruder. Various physical properties of the pellets were measured and evaluated to find the MFR, the crystallization temperature, and the melt tension (MS) to be 3.0 g/10 minutes, 121.5° C. and 2.1 cN, respectively.

Example 8

The polymerization process (I) was conducted using the same conditions as example 7 (3), except that the production conditions of the main (co-)polymer composition were altered, that is, after supplying so as to have the propylene/ethylene ratio at 0.3 in the first stage, 50 liters of hydrogen was introduced inside the polymerization reactor and the temperature was raised to 60° C., propylene was supplied continuously for 90 minutes under the condition of the polymerization temperature of 60° C. and maintaining the gas phase pressure inside the polymerization reactor at 0.79 MPa. After the polymerization process (I), supply of propylene and ethylene was terminated and the temperature inside the container was cooled to 30° C., then hydrogen and unreacted propylene were discharged. A part of the polymerized slurry was taken out for measuring the MFR, which was found to be 3.0.

After raising the temperature inside the container to 60° C., 50 liters of hydrogen was introduced to the polymerization reactor, and ethylene and propylene were supplied so as to have the supply ratio of the ethylene become 35 weight % continuously for two hours. The entire supply amount of ethylene was 8.2 kg.

After the polymerization period, 1 liter of methanol was introduced to the polymerization reactor and the deactivation of catalyst was conducted at 70° C. for 15 minutes. Then after discharging the unreacted gas, the solvent was separated and the polymer was dried to obtain 40.5 kg of a polymer having an intrinsic viscosity $[\eta_T]$ of 2.08 dl/g.

The obtained polymer was a propylene' α-olefin block copolymer composition containing 0.24 weight % of polyethylene (A) according to the preliminary activating polymerization as the (a) component and the intrinsic viscosity $[\eta_P]$ of the polypropylene' α-olefin block copolymer composition as the (b) component was 2.00 dl/g.

The polymerization ratio between the polymerization process (I) and the polymerization process (II) was calculated by preparing copolymers having different reaction amount ratios of ethylene/propylene beforehand, and using this as the standard sample to make a calibration curve with the infrared absorption spectrum and find the ethylene/propylene reaction amount ratio in the polymerization process (II), and further calculated from the ethylene containing amount in the entire polymer. The results are shown in Table 3.

Subsequently, using the same conditions as example 1, polymer pellets were prepared with an extruder. Various physical properties of the pellets were measured and evaluated to find the MFR, the crystallization temperature, and the melt tension (MS) to be 2.0 g/10 minutes, 116.8° C. and 2.5 cN, respectively.

Comparative Example 8

Using the same conditions as comparative example 5, a supported titanium catalyst slurry was obtained. Using the supported titanium catalyst slurry, a propylene' α-olefin block copolymer composition was produced using the same conditions as example 6 (3) to prepare an evaluation specimen of comparative example 8.

Various physical properties of the obtained propylene' α-olefin block copolymer composition are shown in Table 3.

Comparative Example 9

Using the same conditions as comparative example 3, a supported titanium catalyst slurry was obtained. Using the supported titanium catalyst slurry, a propylene' α-olefin block copolymer composition was produced using the same conditions as example 7 (3) to prepare an evaluation specimen of comparative example 9.

Various physical properties of the obtained propylene' α-olefin block copolymer composition are shown in Table 3.

Comparative Example 10

Using the same conditions as comparative example 3, a supported titanium catalyst slurry was obtained. Using the supported titanium catalyst slurry, a propylene' α-olefin block copolymer composition was produced using the same conditions as example 8 (3) to prepare an evaluation specimen of comparative example 10.

Various physical properties of the obtained propylene' α-olefin block copolymer composition are shown in Table 3.

TABLE 3

| | Examples | | | Comparative Examples | | |
|---|---|---|---|---|---|---|
| | 6 | 7 | 8 | 8 | 9 | 10 |
| Preliminary polymerization <polypropylene (B)> Intrinsic viscosity $[\eta_B]$ (dl/g) | 2.7 | 2.8 | 2.8 | 2.7 | 2.8 | 2.8 |
| Generated amount[1] (g/g) | 1.2 | 2.0 | 2.0 | 1.2 | 2.0 | 2.0 |
| Composition ratio[2] (wt %) | 0.01 | 0.02 | 0.02 | 0.01 | 0.02 | 0.02 |
| Preliminary activation <polyethylene (A)> Intrinsic viscosity $[\eta_E]$ (dl/g) | 30.2 | 34.0 | 34.0 | — | — | — |
| Generated amount[1] (g/g) | 32.0 | 22.0 | 22.0 | — | — | — |
| Composition ratio[2] (wt %) | 0.21 | 0.26 | 0.24 | — | — | — |
| Addition polymerization <polypropylene (C)> Intrinsic viscosity $[\eta_C]$ (dl/g) | 2.8 | 2.8 | 2.8 | 2.8 | 2.8 | 2.8 |
| Generated amount[1] (g/g) | 2.2 | 2.0 | 2.0 | 2.2 | 2.0 | 2.0 |
| Composition ratio[2] (wt %) | 0.01 | 0.02 | 0.02 | 0.01 | 0.02 | 0.02 |
| Polymerization process (I) Ethylene (wt %) | 0 | 0 | 2.1 | 0 | 0 | 2.1 |

TABLE 3-continued

| | Examples | | | Comparative Examples | | |
|---|---|---|---|---|---|---|
| | 6 | 7 | 8 | 8 | 9 | 10 |
| Intrinsic viscosity [$\eta_{PP}$] (dg/l) | 2.32 | 1.60 | 1.88 | 2.29 | 1.71 | 1.98 |
| Composition ratio[2] (wt %) | 85.7 | 78.8 | 82.3 | 86.1 | 78.6 | 81.9 |
| Propylene process (II) Ethylene (wt %) | 57 | 65 | 81 | 56 | 66 | 80 |
| Intrinsic viscosity [$\eta_{RC}$] (dl/g) | 4.84 | 3.22 | 2.96 | 5.29 | 2.97 | 2.70 |
| Composition ratio[2] (wt %) | 14.1 | 20.9 | 17.4 | 13.9 | 21.4 | 18.1 |
| Propylene (co-)polymer Intrinsic viscosity [$\eta_P$] (dl/g) | 2.63 | 1.87 | 2.00 | 2.71 | 1.98 | 2.11 |
| Propylene (co-)polymer composition Ethylene (wt %) | 8.2 | 13.8 | 14.3 | 7.8 | 14.1 | 14.5 |
| Intrinsic viscosity [$\eta_T$] (dl/g) | 2.69 | 1.95 | 2.08 | 2.71 | 1.98 | 2.11 |
| Melt tension (MS) (cN) | 5.2 | 2.1 | 2.5 | 3.3 | 0.8 | 1.1 |
| Crystallization temperature (° C.) | 121.9 | 121.5 | 116.8 | 116.0 | 115.8 | 110.3 |
| MFR initial (g/10 minutes) | 0.52 | 3.0 | 2.0 | 0.48 | 2.8 | 2.1 |
| final (g/10 minutes) | 0.51 | 3.1 | 1.9 | 0.48 | 2.9 | 2.0 |
| ΔMFR (g/10 minutes) | −0.01 | 0.1 | −0.1 | 0.00 | 0.1 | −0.1 |

Note 1: Generated amount (g) per 1 g of transitional metal compound catalyst component
Note 2: Composition ratio (wt %) in the propylene (co-)polymer composition

Example 9

(1) Preparation of catalyst composition including transition metal component

Using the same conditions as example 1, a supported titanium catalyst component was obtained.

(2) Preparation of preactivated catalyst

Using the same conditions as example 1, a preactivated catalyst slurry was obtained.

(3) Production of polypropylene composition (main (co-) polymerization of propylene)

After providing a nitrogen gas atmosphere in a 500 liter capacity stainless steel polymerization container with an agitator, 240 liters of n-hexane, 780 millimole of triethyl aluminum (organic metal compound (AL2)), 78 millimole of diisopropyldimethoxy silane (electron donor (E2)) and ½ amount of the preactivated catalyst slurry obtained as mentioned above were added at 20° C. Then after supplying so as to have the hydrogen/propylene ratio and the propylene/ethylene ratio at 0.04 and 0.03 respectively and the temperature was raised to 60° C., polypropylene, hydrogen and ethylene were supplied continuously for two hours while maintaining the gas phase pressure inside the polymerization reactor at 0.79 MPa to implement the copolymerization of propylene' α-olefin.

After the polymerization period, 1 liter of methanol was introduced into the polymerization reactor and the deactivation of catalyst was conducted at 60° C. for 15 minutes. Then after discharging unreacted gas, solvent was separated and the polymer was dried to obtain 41.0 kg of a polymer having an intrinsic viscosity [$\eta_T$] of 1.91 dl/g.

The obtained polymer was a polypropylene' α-olefin random copolymer composition containing 0.24 weight % of polyethylene (A) according to the preliminary activating polymerization as the (a) component and the intrinsic viscosity [$\eta_P$] of the propylene' α-olefin copolymer as the (b) component was 1.83 dl/g.

Subsequently, using the same conditions as example 1, polymer pellets were prepared with an extruder. Various physical properties of the pellets were measured and evaluated to find the MFR, the crystallization temperature, and the melt tension (MS) to be 3.7 g/10 minutes, 115.2° C. and 1.8 cN, respectively.

Example 10

(1) Preparation of catalyst composition including transition metal compound

Using the same conditions as example 3, a supported titanium catalyst component was obtained.

(2) Preparation of preactivated catalyst Using the same conditions as example 3, a preactivated catalyst slurry was obtained.

(3) Production of polypropylene composition (main (co-) polymerization of propylene)

25 kg of polypropylene powders were introduced to a 110 liter capacity continuous type horizontal gas phase reactor (length/diameter =3.7) with an agitator, and further, a preactivated catalyst slurry as the supported titanium catalyst component at the rate of 0.81 g/h, and 15 weight % n-hexane solution of triethyl aluminum (organic metal compound (AL2)) and diisopropyldimethoxy silane (electron donor (E2)) were supplied continuously so as to have the molar ratios with respect to titanium atoms in the supported titanium catalyst component of 90 and 15, respectively.

Under the condition of the polymerization temperature of 60° C., hydrogen and ethylene were supplied so as to have the hydrogen/propylene ratio and the ethylene/propylene ratio in the polymerization reactor of 0.02. Further, by supplying propylene so as to maintain the pressure inside the polymerization reactor at 1.77 MPa to conduct the gas phase polymerization of propylene continuously for 150 hours.

During the polymerization period, polymer was taken out from the polymerization reactor at the rate of 12 kg/h so as to keep the polymer level inside the polymerization reactor at 60 volume % .

The taken-out polymer was treated by contacting with a nitrogen gas containing 5 volume % of water vapor at 100° C. for 30 minutes to obtain a polymer having an intrinsic viscosity [$\eta_T$] of 1.95 dl/g.

The ratio of polyethylene (A) generated by the preliminary activating treatment in the polymer was 0.22 weight % and the intrinsic viscosity [$\eta_P$] of the propylene' α-olefin block copolymer composition (b) was 1.89 dl/g.

Subsequently, using the same conditions as example 1, polymer pellets were prepared with an extruder. Various physical properties of the pellets were measured and evaluated to find the MFR, the crystallization temperature, and the melt tension (MS) to be 3.2 g/10 minutes, 110.0° C. and 1.9 cN, respectively.

Example 11

(1) Preparation of catalyst composition including transition metal compound

Using the same conditions as example 1, a supported titanium catalyst component was obtained.

(2) Preparation of preactivated catalyst Using the same conditions as example 1, a preactivated catalyst slurry was obtained.

(3) Production of polypropylene composition (main (co) polymerization of propylene)

After providing a nitrogen gas atmosphere in a 500 liter capacity stainless steel polymerization reactor with an agitator, 240 liters of n-hexane, 780 millimole of triethyl aluminum (organic metal compound (AL2)), 78 millimole of diisopropyldimethoxy silane (electron donor (E2)) and ½ amount of the preactivated catalyst slurry obtained as mentioned above were added at 20° C. Then after supplying so as to have the hydrogen/propylene ratio, the hydrogen/ethylene ratio and the propylene/butene-1 ratio of 0.08, 0.025 and 0.038, respectively and the temperature was raised to 60° C., propylene, hydrogen, ethylene and butene-1 were supplied continuously for two hours while maintaining the gas phase pressure inside the polymerization reactor at 0.79 MPa to implement the copolymerization of propylene' α-olefin.

After the polymerization period, 1 liter of methanol was introduced into the polymerization reactor and the deactivation of catalyst was conducted at 60° C. for 15 minutes. Then after discharging unreacted gas, solvent was separated and the polymer was dried to obtain 39.6 kg of a polymer having an intrinsic viscosity $[\eta_T]$ of 1.67 dl/g.

The obtained polymer was a propylene' α-olefin copolymer composition containing 0.25 weight % of polyethylene (A) according to the preliminary activating polymerization as the (a) component and the intrinsic viscosity $[\eta_P]$ of the propylene' α-olefin olefin copolymer composition as the (b) component was 1.59 dl/g.

Subsequently, using the same conditions as example 1, polymer pellets were prepared with an extruder. Various physical properties of the pellets were measured and evaluated to find the MFR, the crystallization temperature, and the melt tension (MS) to be 7.6 g/10 minutes, 110.3° C. and 1.3 cN, respectively.

Comparative Example 11

Using the same conditions as comparative example 3, a supported titanium catalyst slurry was obtained. Using the supported titanium catalyst slurry, a propylene' α-olefin block copolymer composition was produced using the same conditions as example 9 (3) to prepare an evaluation specimen of comparative example 11.

Various physical properties of the obtained propylene' α-olefin block copolymer composition are shown in Table 4.

Comparative Example 12

Using the same conditions as comparative example 5, a supported titanium catalyst slurry was obtained. Using the supported titanium catalyst slurry, a propylene' α-olefin block copolymer composition was produced using the same conditions as example 10 (3) to prepare an evaluation specimen of comparative example 12.

Various physical properties of the obtained propylene' α-olefin block copolymer composition are shown in Table 4.

Comparative Example 13

Using the same conditions as comparative example 3, a supported titanium catalyst slurry was obtained. Using the supported titanium catalyst slurry, a propyleneea' α-olefin block copolymer composition was produced using the same conditions as example 11 (3) to prepare an evaluation specimen of comparative example 13.

Various physical properties of the obtained propylene' α-olefin block copolymer composition are shown in Table 4.

TABLE 4

| | Examples | | | Comparative Examples | | |
|---|---|---|---|---|---|---|
| | 9 | 10 | 11 | 11 | 12 | 13 |
| Preliminary polymerization <polypropylene (B)> Intrinsic viscosity $[\eta_B]$ (dl/g) | 2.8 | 2.7 | 2.8 | 2.8 | 2.7 | 2.8 |
| Generated amount[1] (g/g) | 2.0 | 1.2 | 2.0 | 2.0 | 1.2 | 2.0 |
| Composition ratio[2] (wt %) | 0.02 | 0.01 | 0.02 | 0.02 | 0.01 | 0.02 |
| Preliminary activation <polyethylene (A)> Intrinsic viscosity $[\eta_E]$ (dl/g) | 34.0 | 30.2 | 34.0 | — | — | — |
| Generated amount[1] (g/g) | 22.0 | 32.0 | 22.0 | — | — | — |
| Composition ratio[2] (wt %) | 0.24 | 0.22 | 0.25 | — | — | — |
| Addition polymerization <polypropylene (C)> Intrinsic viscosity $[\eta_C]$ (dl/g) | 2.8 | 2.8 | 2.8 | 2.8 | 2.8 | 2.8 |
| Generated amount[1] (g/g) | 2.0 | 2.2 | 2.0 | 2.0 | 2.2 | 2.0 |
| Composition ratio[2] (wt %) | 0.02 | 0.01 | 0.02 | 0.02 | 0.01 | 0.02 |
| Polymerization process Ethylene (wt %) | 2.7 | 4.6 | 2.4 | 2.5 | 4.9 | 2.4 |
| Butene-1 (wt %) | 0 | 0 | 3.9 | 0 | 0 | 3.8 |
| Intrinsic viscosity $[\eta_D]$ (dg/l) | 1.83 | 1.89 | 1.59 | 1.97 | 1.97 | 1.69 |
| Composition ratio[2] (wt %) | 99.7 | 99.8 | 99.7 | 100 | 100 | 100 |
| Propylene (co-)polymer Intrinsic viscosity $[\eta_P]$ (dl/g) | 1.83 | 1.89 | 1.59 | 1.97 | 1.97 | 1.69 |
| Propylene (co-)polymer composition Ethylene (wt %) | 2.9 | 4.8 | 2.7 | 2.5 | 4.9 | 2.4 |
| Butene-1 (wt %) | 0 | 0 | 3.9 | 0 | 0 | 3.8 |
| Intrinsic viscosity $[\eta_T]$ (dl/g) | 1.91 | 1.95 | 1.67 | 1.97 | 1.97 | 1.69 |
| Melt tension (MS) (cN) | 1.8 | 1.9 | 1.3 | 0.7 | 0.7 | 0.3 |
| Crystallization temperature (° C.) | 115.2 | 110.0 | 110.3 | 109.4 | 102.9 | 104.8 |
| MFR initial (g/10 minutes) | 3.7 | 3.2 | 7.6 | 3.5 | 3.1 | 8.1 |
| final (g/10 minutes) | 3.6 | 3.0 | 7.6 | 3.4 | 2.9 | 7.9 |
| ΔMFR (g/10 minutes) | −0.1 | −0.2 | 0.0 | −0.1 | −0.2 | −0.2 |

Note 1: Generated amount (g) per 1 g of transitional metal compound catalyst component
Note 2: Composition ratio (wt %) in the propylene (co-)polymer composition

Example 12

(1) Preparation of catalyst composition including transition metal compound

Using the same conditions as example 1, a supported titanium catalyst component was obtained.

(2) Preparation of preactivated catalyst

Using the same conditions as example 1, a preliminary activating polymerization with ethylene and an addition polymerization with propylene were conducted without a preliminary polymerization with propylene.

A polymer obtained by the preliminary activating polymerization process in the same conditions was analyzed and it was found that 22.2 g of polyethylene (A) existed per 1 g of the supported titanium catalyst component, and the intrinsic viscosity $[\eta_E]$ of the polymer measured in tetralin at 135° C. was 32.5 dl/g.

A polymer generated by the preliminary activating polymerization process using the same conditions and further treated by an addition polymerization was analyzed and it was found that 2.0 g of polymer existed per 1 g of the supported titanium catalyst component only by the addition polymerization, and the intrinsic viscosity $[\eta_E]$ of the polymer measured in tetralin at 135° C. was 2.3 dl/g.

(3) Production of polypropylene composition (main (co-) polymerization of propylene)

Using the prepared preactivated catalyst, the main polymerization of propylene was conducted using the same conditions as example 1 to produce polypropylene. The obtained polypropylene was pelletized using the same conditions as example 1 to obtain an evaluation specimen of comparative example 12.

Various physical properties of the obtained polypropylene are shown in Table 5.

Comparative Example 14

A preactivated catalyst was prepared using the same conditions as example 1 except that the preliminary activating polymerization with propylene or the preliminary activating polymerization with ethylene was not conducted and only the addition polymerization with propylene was conducted. The obtained preactivated catalyst was used for the main polymerization of propylene using the same conditions as example 1 to produce polypropylene. The obtained polypropylene was pelletized using the same conditions as example 1 to obtain an evaluation specimen of comparative example 14.

Various physical properties of comparative example 14 are shown in Table 5.

Example 13 and Comparative Example 15

Polypropylene compounds having different polyethylene (A) contents were produced using the same conditions as example 1 except that the preliminary activating polymerization with propylene was not conducted and the conditions of the preliminary activating polymerization with ethylene were changed. The polypropylene compounds were treated using the same process as example 1 to obtain evaluation specimens of example 13 and comparative example 15.

Various physical properties of example 13 and comparative example 15 are shown in Table 5.

Example 14

(1) Preparation of catalyst composition including transition metal compound

Using the same conditions as example 3, a supported titanium catalyst component was obtained.

(2) Preparation of preactivated catalyst

Using the same conditions as example 3 except that the preliminary polymerization with propylene was not conducted, the preliminary activating polymerization with ethylene and the addition polymerization with propylene were conducted.

A polymer obtained by the preliminary activating polymerization in the same conditions was analyzed and it was found that 32.0 g of polyethylene (A) existed per 1 g of the supported titanium catalyst component, and the intrinsic viscosity $[\eta_E]$ of the polymer measured in tetralin at 135° C. was 29.8 dl/g.

A polymer generated by the preliminary activating polymerization using the same conditions and further an addition polymerization was analyzed and it was found that 2.2 g of polymer existed per 1 g of the supported titanium catalyst component only by the addition polymerization, and the intrinsic viscosity $[\eta_A]$ of polymer measured in tetralin at 135° C. was 3.4 dl/g.

(3) Production of polypropylene composition (main (co-) polymerization of propylene)

Using the prepared preactivated catalyst, the main polymerization of propylene was conducted using the same conditions as example 3 to produce polypropylene. The obtained polypropylene was pelletized using the same conditions as example 3 to obtain an evaluation specimen of comparative example 14.

Various physical properties of the obtained polypropylene are shown in Table 5.

Comparative Example 16

A propylene (co-)polymer composition was produced using the same conditions as example 3 except that the preliminary activating treatment of (2) was not conducted and the polymerization of propylene was conducted under the presence of the solid titanium catalyst obtained in (1) under the conditions the same as (3) to obtain an evaluation specimen of comparative example 16.

Various physical properties of the obtained polypropylene are shown in Table 5.

TABLE 5

| | Examples | | | Comparative Examples | | |
|---|---|---|---|---|---|---|
| | 12 | 13 | 14 | 14 | 15 | 16 |
| Preliminary activation <polyethylene (A)> Intrinsic viscosity $[\eta_E]$ (dl/g) | 32.5 | 32.5 | 29.8 | — | 32.5 | — |
| Generated amount[1] (g/g) | 22.2 | 4.5 | 32.0 | — | 0.005 | — |
| Composition ratio[2] (wt %) | 0.25 | 0.05 | 0.18 | — | 0.0001 | — |
| Addition polymerization <polypropylene (C)> Intrinsic viscosity $[\eta_C]$ (dl/g) | 2.3 | 2.3 | 3.4 | 2.0 | 2.3 | — |
| Generated amount[1] (g/g) | 2.0 | 2.0 | 2.2 | 2.0 | 2.0 | — |
| Composition ratio[2] (wt %) | 0.02 | 0.02 | 0.02 | 0.02 | 0.02 | — |
| Polymerization process Intrinsic viscosity $[\eta_D]$ (dl/g) | 1.89 | 1.89 | 1.75 | 1.89 | 1.89 | 1.75 |
| Composition ratio[2] (wt %) | 99.7 | 99.9 | 99.8 | 100 | 100 | 100 |
| Propylene (co-)polymer Intrinsic viscosity $[\eta_P]$ (dl/g) | 1.89 | 1.89 | 1.75 | 1.89 | 1.89 | 1.75 |
| Propylene (co-)polymer composition Intrinsic viscosity $[\eta_T]$ (dl/g) | 1.97 | 1.91 | 1.80 | 1.89 | 1.89 | 1.75 |
| Melt tension (MS) (cN) | 3.7 | 1.6 | 1.9 | 0.8 | 0.9 | 0.6 |
| Crystallization temperature (° C.) | 121.5 | 120.8 | 121.0 | 116.1 | 116.2 | 116.0 |
| MFR initial (g/10 minutes) | 3.5 | 4.2 | 6.0 | 4.5 | 4.5 | 7.2 |
| final (g/10 minutes) | 3.6 | 4.3 | 6.1 | 4.6 | 4.6 | 7.4 |
| ΔMFR (g/10 minutes) | 0.1 | 0.1 | 0.1 | 0.1 | 0.1 | 0.2 |

Note 1: Generated amount (g) per 1 g of transitional metal compound catalyst component Note 2: Composition ratio (wt %) in the propylene (co-)polymer composition

Example 15

(1) Preparation of catalyst composition including transition metal compound

Using the same conditions as example 1, a supported titanium catalyst component was obtained.

(2) Preparation of preactivated catalyst

Using the same conditions as example 5 except that the preliminary polymerization with propylene or the addition polymerization with propylene was not conducted, the preliminary activating polymerization with a gas mixture of ethylene-propylene was conducted.

An ethylene-propylene copolymer generated by the preliminary activating polymerization using the same conditions was analyzed and it was found that the propylene polymerization unit was 0.8 weight % (measured with $^{13}C$-NMR), 25 g of ethylene-propylene existed per 1 g of the supported titanium catalyst component, and the intrinsic viscosity $[\eta_E]$ of the polymer measured in tetralin at 135° C. was 30.0 dl/g.

(3) Production of polypropylene composition (main (co-) polymerization of propylene)

Using the prepared preactivated catalyst, the main polymerization of propylene was conducted using the same conditions as example 1 to produce polypropylene. The obtained polypropylene was pelletized using the same conditions as example 1 to obtain an evaluation specimen of comparative example 15.

Various physical properties of the obtained polypropylene are shown in Table 6.

Comparative Example 17

A propylene (co-)polymer composition was produced using the same conditions as example 1 except that the preliminary activating treatment of (2) was not conducted and the polymerization of propylene was conducted under the presence of the solid titanium catalyst obtained in (1) under the conditions the same as (3) to obtain an evaluation specimen of comparative example 17.

Various physical properties of the obtained polypropylene are shown in Table 6.

Comparative Example 18

A propylene (co-)polymer composition was produced by the polymerization of propylene using the same conditions as example 1 except that the preliminary activation with propylene or the addition polymerization with propylene was not conducted, the preliminary activating polymerization with ethylene was replaced by the preliminary activating treatment with a gas mixture of ethylene-propylene and 240 g of propylene was introduced into the polymerization reactor to obtain an evaluation specimen of comparative example 18.

Various physical properties of the obtained polypropylene are shown in Table 6.

Example 16

Comparative Example 19

Polypropylene compounds having different polyethylene (A) contents were produced using the same conditions as example 1 except that the preliminary activating polymerization with propylene or the addition polymerization with propylene was not conducted and the conditions of the preliminary activating polymerization with ethylene were changed. The polypropylene compounds were treated using the same process as example 1 to obtain evaluation specimens of example 16 and comparative example 19.

Various physical properties of example 16 and comparative example 19 are shown in Table 6.

Example 17

(1) Preparation of catalyst composition including transition metal compound

Using the same conditions as example 3, a supported titanium catalyst component was obtained.

(2) Preparation of preactivated catalyst

Using the same conditions as example 3 except that the preliminary polymerization with propylene or the addition polymerization with propylene was not conducted, the preliminary activating polymerization with ethylene was conducted.

A polymer obtained by the preliminary activating polymerization process using the same conditions was analyzed and it was found that 29 g of polyethylene (A) existed per 1 g of the supported titanium catalyst component, and the intrinsic viscosity $[\eta_E]$ of the polymer measured in tetralin at 135° C. was 35.5 dl/g.

(3) Production of polypropylene composition (main (co-) polymerization of propylene)

Using the prepared preactivated catalyst, the main polymerization of propylene was conducted with the same conditions as example 5 to produce polypropylene. The obtained polypropylene was pelletized using the same conditions as example 1 to obtain an evaluation specimen of example 17.

Various physical properties of the obtained polypropylene are shown in Table 6.

TABLE 6

| | Examples | | | Comparative Examples | | |
|---|---|---|---|---|---|---|
| | 15[3] | 16 | 17 | 17 | 18[4] | 19 |
| Preliminary activation <polyethylene (A)> Intrinsic viscosity $[\eta_E]$ (dl/g) | 30.0 | 30.0 | 35.5 | — | 3.3 | 30.0 |
| Generated amount 1 (g/g) | 25.0 | 6.5 | 29.0 | — | 16.6 | 0.005 |
| Composition ratio[2] (wt %) | 0.35 | 0.09 | 0.18 | — | 0.23 | 0.0001 |
| Polymerization process Intrinsic viscosity $[\eta_D]$ (dl/g) | 1.89 | 1.89 | 1.68 | 1.89 | 1.89 | 1.89 |
| Composition ratio[2] (wt %) | 99.6 | 99.9 | 99.8 | 100 | 99.8 | 100 |
| Propylene (co-)polymer Intrinsic viscosity $[\eta_P]$ (dl/g) | 1.89 | 1.89 | 1.68 | 1.89 | 1.89 | 1.89 |
| Propylene (co-)polymer composition Intrinsic viscosity $[\eta_T]$ (dl/g) | 1.99 | 1.92 | 1.81 | 1.89 | 1.89 | 1.89 |
| Melt tension (MS) (cN) | 2.7 | 1.4 | 1.4 | 0.8 | 0.8 | 0.8 |
| Crystallization temperature (° C.) | 120.9 | 119.8 | 120.0 | 116.1 | 116.2 | 116.2 |
| MFR initial (g/10 minutes) | 3.3 | 4.1 | 5.9 | 4.5 | 4.5 | 4.5 |
| final (g/10 minutes) | 3.3 | 4.2 | 6.0 | 4.6 | 4.5 | 4.6 |
| ΔMFR (g/10 minutes) | 0.0 | 0.1 | 0.1 | 0.1 | 0.0 | 0.1 |

Note 1: Generated amount (g) per 1 g of transitional metal compound catalyst component
Note 2: Composition ratio (wt %) in the propylene (co-)polymer composition
Note 3: Comparative example 15; a gas mixture of ethylene and propylene was used as the monomer for the preliminary activation
Note 4: Comparative example 18; propylene was used as the monomer for the preliminary activation

Example 18

Using the same conditions as example 1 except that 0.1 weight part of a phosphorous type antioxydant tris(2,4-di-t-butyl phenyl) phosphite was added to 100 weight parts of the obtained polypropylene composition in place of 0.1 weight part of a phenol type antioxydant 2,6-di-t-butyl-p-cresol in example 1 (3), pellets were obtained by pelletizing with an extruder at 230° C. Various physical properties of the pellets were measured and evaluated to find the MFR, the crystallization temperature, and the melt tension (MS) to be 3.6 g/10 minutes, 119.5° C. and 2.1 cN, respectively. Detailed physical properties are shown in Table 7.

Example 19

Using the same conditions as example 2 except that a phosphorous type antioxydant tris(2,4-di-t-butyl phenyl) phosphite was added to 100 weight parts of the obtained polypropylene composition in place of a phenol type antioxydant 2,6-di-t-butyl-p-cresol in example 2 (3), a polypropylene composition was produced to prepare an evaluation specimen of example 19.

Various physical properties of the obtained polypropylene are shown in Table 7.

Comparative Examples 20–23

Using the same conditions except that a phosphorous type antioxydant tris(2,4-di-t-butyl phenyl) phosphite was added to 100 weight parts of the obtained polypropylene composition in place of a phenol type antioxydant 2,6-di-t-butyl-p-cresol in comparative examples 1 to 4, polypropylene compositions were produced to prepare an evaluation specimens of comparative examples 20 to 23.

Various physical properties of the obtained polypropylene are shown in Table 7.

TABLE 7

|  | Examples | | Comparative Examples | | | |
| --- | --- | --- | --- | --- | --- | --- |
|  | 18 | 19 | 20 | 21[3] | 22 | 23 |
| Preliminary polymerization <polypropylene (B)> Intrinsic viscosity [$\eta_B$] (dl/g) | 2.8 | 2.8 | 2.8 | 2.8 | 2.8 | — |
| Generated amount[1] (g/g) | 2.0 | 2.0 | 2.0 | 2.0 | 2.0 | — |
| Composition ratio[2] (wt %) | 0.02 | 0.02 | 0.02 | 0.02 | 0.02 | — |
| Preliminary activation <polyethylene (A)> Intrinsic viscosity [$\eta_E$] (dl/g) | 34.0 | 34.0 | 34.0 | 2.8 | — | — |
| Generated amount[1] (g/g) | 22.0 | 4.5 | 0.005 | 22.0 | — | — |
| Composition ratio[2] (wt %) | 0.25 | 0.05 | 0.0001 | 0.25 | — | — |
| Addition polymerization <polypropylene (C)> Intrinsic viscosity [$\eta_C$] (dl/g) | 2.8 | 2.8 | 2.8 | 2.8 | 2.8 | — |
| Generated amount[1] (g/g) | 2.0 | 2.0 | 2.0 | 2.0 | 2.0 | — |
| Composition ratio[2] (wt %) | 0.02 | 0.02 | 0.02 | 0.02 | 0.02 | — |
| Polymerization process Intrinsic viscosity [$\eta_D$] (dg/l) | 1.89 | 1.90 | 1.89 | 1.89 | 1.89 | 1.67 |
| Composition ratio[2] (wt %) | 99.7 | 99.9 | 100 | 99.7 | 100 | 100 |
| Propylene (co-)polymer Intrinsic viscosity [$\eta_P$] (dl/g) | 1.89 | 1.90 | 1.89 | 1.89 | 1.89 | 1.67 |
| Propylene (co-)polymer composition Intrinsic viscosity [$\eta_T$] (dl/g) | 1.97 | 1.92 | 1.89 | 1.89 | 1.89 | 1.67 |
| Melt tension (MS) (cN) | 2.1 | 1.2 | 0.9 | 0.8 | 0.8 | 6.8 |
| Crystallization temperature (° C.) | 119.5 | 118.3 | 116.8 | 116.1 | 116.0 | 129.4 |
| MFR initial (g/10 minutes) | 3.6 | 4.2 | 4.6 | 4.5 | 4.5 | 9.2 |
| final (g/10 minutes) | 3.7 | 4.3 | 4.6 | 4.6 | 4.6 | 17.5 |

TABLE 7-continued

|  | Examples | | Comparative Examples | | | |
| --- | --- | --- | --- | --- | --- | --- |
|  | 18 | 19 | 20 | 21[3] | 22 | 23 |
| ΔMFR (g/10 minutes) | 0.1 | 0.1 | 0.0 | 0.1 | 0.1 | 8.3 |
| YI initial | −0.5 | −0.4 | 0.5 | −0.6 | −0.4 | 1.0 |
| final | 1.5 | 1.5 | 1.4 | 1.5 | 1.6 | 3.5 |
| ΔYI | 2.0 | 1.9 | 1.9 | 2.1 | 2.0 | 2.5 |

Note 1: Generated amount (g) per 1 g of transitional metal compound catalyst component
Note 2: Composition ratio (wt %) in the propylene(co-)polymer composition
Note 3: Comparative example 21; propylene was used as the monomer for the preliminary activation Examples 20–21

Using the same conditions as example 3 and example 5 except that a phosphorous type antioxydant tris(2,4-di-t-butyl phenyl) phosphite was added to 100 weight parts of the obtained polypropylene composition in place of a phenol type antioxydant 2,6-di-t-butyl-p-cresol, polypropylene compositions were produced to prepare evaluation specimens of examples 20 and 21.

Various physical properties of the obtained polypropylene are shown in Table 8.

Comparative Examples 24–26

Using the same conditions as comparative examples 5 to 7 except that a phosphorous type antioxydant tris(2,4-di-t-butyl phenyl) phosphite was added to 100 weight parts of the obtained polypropylene composition in place of a phenol type antioxydant 2,6-di-t-butyl-p-cresol, polypropylene compositions were produced to prepare evaluation specimens of examples 24 to 26.

Various physical properties of the obtained polypropylene are shown in Table 8.

TABLE 8

|  | Examples | | Comparative Examples | | |
| --- | --- | --- | --- | --- | --- |
|  | 20 | 21 | 24 | 25 | 26[3] |
| Preliminary polymerization <polypropylene (B)> Intrinsic viscosity [$\eta_B$] (dl/g) | 2.7 | 2.7 | 2.7 | 2.7 | — |
| Generated amount[1] (g/g) | 1.2 | 1.2 | 1.2 | 1.2 | — |
| Composition ratio[2] (wt %) | 0.01 | 0.01 | 0.01 | 0.01 | — |
| Preliminary activation <polyethylene (A)> Intrinsic viscosity [$\eta_E$] (dl/g) | 30.2 | 22.5 | — | — | 32.5 |
| Generated amount[1] (g/g) | 32.0 | 22.0 | — | — | — |
| Composition ratio[2] (wt %) | 0.18 | 0.12 | — | — | 0.25 |
| Addition polymerization <polypropylene (C)> Intrinsic viscosity [$\eta_C$] (dl/g) | 2.8 | 2.2 | 2.8 | 2.2 | — |
| Generated amount[1] (g/g) | 2.2 | 2.1 | 2.2 | 2.1 | — |
| Composition ratio[2] (wt %) | 0.01 | 0.01 | 0.01 | 0.01 | — |
| Polymerization process Intrinsic viscosity [$\eta_D$] (dg/l) | 1.75 | 1.52 | 1.75 | 1.52 | 1.89 |
| Composition ratio[2] (wt %) | 99.8 | 99.9 | 100 | 100 | 99.7 |
| Propylene (co-)polymer Intrinsic viscosity [$\eta_P$] (dl/g) | 1.75 | 1.52 | 1.75 | 1.52 | 1.89 |

TABLE 8-continued

| | Examples | | Comparative Examples | | |
|---|---|---|---|---|---|
| | 20 | 21 | 24 | 25 | 26[3] |
| Propylene (co-)polymer composition Intrinsic viscosity [$\eta_T$] (dl/g) | 1.80 | 1.54 | 1.75 | 1.52 | 1.97 |
| Melt tension (MS) (cN) | 1.2 | 1.7 | 0.6 | 0.3 | 1.0 |
| Crystallization temperature (° C.) | 119.0 | 118.5 | 116.1 | 115.2 | 116.0 |
| MFR initial (g/10 minutes) | 6.0 | 15.4 | 7.2 | 16.7 | 3.5 |
| final (g/10 minutes) | 6.1 | 15.6 | 7.3 | 16.5 | 3.6 |
| ΔMFR (g/10 minutes) | 0.1 | 0.2 | 0.1 | −0.2 | 0.1 |
| YI initial | −0.8 | −0.4 | −0.8 | −0.3 | −0.5 |
| final | 1.4 | 1.5 | 1.3 | 1.8 | 1.5 |
| ΔYI | 2.2 | 1.9 | 2.1 | 2.1 | 2.0 |

Note 1: Generated amount (g) per 1 g of transitional metal compound catalyst component
Note 2: Composition ratio (wt %) in the propylene, α-olefin copolymer composition
Note 3: Comparative example 26; mechanical simple mixing of polyethylene and main polymerization polypropylene

Example 22

Using the same conditions as example 1 except that 0.09 weight part of a phosphorous type antioxydant tris(2,4-di-t-butyl phenyl) phosphite and 0.01 weight part of a phenol type antioxidant 2,6-di-t-butyl-p-cresol were added to 100 weight parts of the obtained polypropylene composition in place of 0.1 weight part of a phenol type antioxydant 2,6-di-t-butyl-p-cresol in example 1 (3), polypropylene composition was produced with an extruder. Various physical properties of the obtained polypropylene composition were measured and evaluated to find the intrinsic viscosity [$\eta_T$], the MFR, the crystallization temperature, and the melt tension (MS) to be 1.97 dl/g, 3.5 g/10 minutes, 120.7° C. and 2.8 cN, respectively. Detailed physical properties are shown in Table 9.

Example 23

Using the same conditions as example 1 (3) except that 0.08 weight part of a phosphorous type antioxydant tris(2, 4-di-t-butyl phenyl) phosphite and 0.02 weight part of dimyristyl thiodipropionate were added to 100 weight parts of the obtained polypropylene composition in place of 0.1 weight part of a phenol type antioxydant 2,6-di-t-butyl-p-cresol, a polypropylene composition was produced with an extruder as in example 1. Various physical properties of the obtained polypropylene composition were measured and evaluated to find the intrinsic viscosity [$\eta_T$], the MFR, the crystallization temperature, and the melt tension (MS) to be 1.97 dl/g, 3.5 g/10 minutes, 119.8° C. and 2.5 cN, respectively. Detailed physical properties are shown in Table 9.

TABLE 9

| | Examples | |
|---|---|---|
| | 22 | 23 |
| Preliminary polymerization <polypropylene (B)> Intrinsic viscosity [$\eta_B$] (dl/g) | 2.8 | 2.8 |
| Generated amount [1] (g/g) | 2.0 | 2.0 |
| Composition ratio [2] (wt %) | 0.02 | 0.02 |
| Preliminary activation <polyethylene (A)> Intrinsic viscosity [$\eta_E$] (dl/g) | 34.0 | 34.0 |
| Generated amount [1] (g/g) | 22.0 | 22.0 |
| Composition ratio [2] (wt %) | 0.25 | 0.25 |
| Addition polymerization <polypropylene (C)> Intrinsic viscosity [$\eta_C$] (dl/g) | 2.8 | 2.8 |
| Generated amount [1] (g/g) | 2.0 | 2.0 |
| Composition ratio [2] (wt %) | 0.02 | 0.02 |
| Polymerization process Intrinsic viscosity [$\eta_D$] (dl/g) | 1.89 | 1.89 |
| Composition ratio [2] (wt %) | 99.7 | 99.7 |
| Propylene (co-)polymer Intrinsic viscosity [$\eta_P$] (dl/g) | 1.89 | 1.89 |
| Propylene (co-)polymer composition Intrinsic viscosity [$\eta_T$] (dl/g) | 1.97 | 1.97 |
| Melt tension (MS) (cN) | 2.8 | 2.5 |
| Crystallization temperature (° C.) | 120.7 | 119.8 |
| MFR initial (g/10 minutes) | 3.5 | 3.5 |
| final (g/10 minutes) | 3.6 | 3.6 |
| ΔMFR (g/10 minutes) | 0.1 | 0.1 |
| YI initial | −0.5 | −0.6 |
| final | 2.5 | 2.1 |
| ΔYI | 3.0 | 2.7 |

Note
[1]: Generated amount (g) per 1 g of transitional metal compound catalyst component
Note
[2]: Composition ratio (wt %) in the propylene (co-)polymer composition

Example 24

(1) Preparation of catalyst composition including transition metal compound

Using the same conditions as example 1, a supported titanium catalyst component was obtained.

(2) Preparation of preactivated catalyst

Using the same conditions as example 1, a preactivated catalyst slurry was obtained.

(3) Production of polypropylene composition (main (co) polymerization of propylene)

After providing a nitrogen gas atmosphere in a 500 liter capacity stainless steel polymerization reactor with an agitator, 240 liters of n-hexane, 780 millimole of triethyl aluminum (organic metal compound (AL2)), 78 millimole of diisopropyldimethoxy silane (electron donor (E2)) and ½ amount of the preactivated catalyst slurry obtained as mentioned above were added at 20° C. Then after introducing 95 liters of hydrogen into the polymerization reactor and the temperature was raised to 70° C., propylene was supplied continuously for 45 minutes while maintaining the gas phase pressure inside the polymerization reactor at 0.79 MPa to implement the polymerization process (I). After the polymerization process (I), the propylene supply was terminated and the temperature inside the polymerization reactor was cooled to 30° C. Hydrogen and unreacted gas were discharged. A part of the polymerization slurry was taken out and analyzed to find the MFR and the intrinsic viscosity $[\eta_{T1}]$ measured in tetralin at 135° C. to be 6.5 g/10 minutes and 1.78 dl/g, respectively. The intrinsic viscosity $[\eta_{P1}]$ obtained in the polymerization process (I) was 1.59 dl/g.

Then 45 liters of hydrogen was introduced into the polymerization reactor and the temperature inside the polymerization reactor was raised to 70° C., propylene was supplied continuously for 60 minutes while maintaining the polymerization temperature at 70° C. and the gas phase pressure inside the polymerization reactor at 0.98 MPa to implement the polymerization process (II). After the polymerization process (II), the propylene supply was terminated and the temperature inside the polymerization reactor was cooled to 30° C. Hydrogen and unreacted propylene were discharged. A part of the polymerization slurry was taken out and analyzed to find the MFR and the intrinsic viscosity $[\eta_{T2}]$ measured in tetralin at 135° C. to be 3.1 g/10 minutes, 2.01 dl/g, respectively. The intrinsic viscosity $[\eta_{P2}]$ obtained in the polymerization process (II) was 2.29 dl/g.

Then 30 liters of hydrogen was introduced into the polymerization reactor and the temperature inside the polymerization reactor was raised to 70° C., propylene was supplied continuously for 90 minutes while maintaining the polymerization temperature at 70° C. and the gas phase pressure inside the polymerization reactor at 0.98 MPa to implement the polymerization process (III). After the polymerization process (III), the propylene supply was terminated and the temperature inside the polymerization reactor was cooled to 30° C. Hydrogen and unreacted propylene were discharged.

After the polymerization period, 1 liter of methanol was introduced into the polymerization reactor and the deactivation of catalyst was conducted at 70° C. for 15 minutes. Then after discharging unreacted gas, solvent was separated and the polymer was dried to obtain 39.1 kg of a polymer having an intrinsic viscosity $[\eta_{T3}]$ of 2.33 dl/g. The intrinsic viscosity $[\eta_{P3}]$ of the polymer obtained in the polymerization process (III) was 3.86 dl/g.

The obtained polymer was a polypropylene polymer composition containing 0.25 weight % of polyethylene (A) according to the preliminary activating polymerization as the (a) component and the intrinsic viscosity $[\eta_P]$ of the (b) component was 2.25 dl/g.

The weight ratios of the polymerization process (I), the polymerization process (II) and the polymerization process (III) are calculated from the magnesium content in the powders in each stage and shown in Table 10.

Subsequently, using the same conditions as example 1, polymer pellets were prepared with an extruder. Various physical properties of the pellets were measured and evaluated to find the MFR, the crystallization temperature, and the melt tension (MS) to be 1.3 g/10 minutes, 122.3° C. and 9.9 cN, respectively.

Various physical properties of the obtained propylene polymer composition are shown in Table 10.

Comparative Example 27

Using the same conditions as comparative example 3, a supported titanium catalyst slurry was obtained. Using the supported titanium catalyst slurry, a propylene polymer composition was produced using the same conditions as example 24 (3) to prepare an evaluation specimen of the comparative example 27.

Various physical properties of the obtained propylene polymer composition are shown in Table 10.

TABLE 10

| | Ex 24 | Com Ex 27 |
|---|---|---|
| Preliminary polymerization <polypropylene (B)> Intrinsic viscosity $[\eta_B]$ (dl/g) | 2.8 | 2.8 |
| Generated amount [1] (g/g) | 2.0 | 2.0 |
| Composition ratio [2] (wt %) | 0.02 | 0.02 |
| Preliminary activation <polyethylene (A)> Intrinsic viscosity $[\eta_E]$ (dl/g) | 34.0 | — |
| Generated amount [1] (g/g) | 22.0 | — |
| Composition ratio [2] (wt %) | 0.25 | — |
| Addition polymerization <polypropylene (C)> Intrinsic viscosity $[\eta_C]$ (dl/g) | 2.8 | 2.8 |
| Generated amount [1] (g/g) | 2.0 | 2.0 |
| Composition ratio [2] (wt %) | 0.02 | 0.02 |
| Polymerization process (I) Intrinsic viscosity $[\eta_{P1}]$ (dl/g) | 1.59 | 1.77 |
| Composition ratio [2] (wt %) | 43.9 | 40.9 |
| Polymerization process (II) Intrinsic viscosity $[\eta_{P2}]$ (dl/g) | 2.29 | 2.21 |
| Composition ratio [2] (wt %) | 38.9 | 37.0 |
| Polymerization process (III) Intrinsic viscosity $[\eta_{P3}]$ (dl/g) | 3.86 | 3.84 |
| Composition ratio [2] (wt %) | 16.9 | 22.1 |
| Propylene (co-)polymer Intrinsic viscosity $[\eta_P]$ (dl/g) | 2.25 | 2.39 |
| Propylene (co-)polymer composition Intrinsic viscosity $[\eta_T]$ (dl/g) | 2.33 | 2.39 |
| Melt tension (MS) (cN) | 9.9 | 3.4 |
| Crystallization temperature (° C.) | 122.3 | 116.3 |
| MFR initial (g/10 minutes) | 1.3 | 1.1 |
| final (g/10 minutes) | 1.4 | 1.1 |
| ΔMFR (g/10 minutes) | 0.1 | 0.0 |

Note
[1]: Generated amount (g) per 1 g of transitional metal compound catalyst component
Note
[2]: Composition ratio (wt %) in the propylene (co-)polymer composition

Example 25

50 weight % of the propylene polymer composition of example 1 and 50 weight % of the propylene polymer composition of comparative example 3 were mixed, and 0.1 weight % of 2,6-di-t-butyl-p-cresol and 0.1 weight % of calcium stearate were mixed. The mixture was pelletized with an extruder having a screw diameter of 40 mm at 230° C. Various physical properties of the tained pellets are shown in Table 11.

TABLE 11

| | Ex 25 |
|---|---|
| Preliminary polymerization <polypropylene (B)> Intrinsic viscosity $[\eta_B]$ (dl/g) | 2.8 |
| Composition ratio [1] (wt %) | 0.02 |
| Preliminary activation <polyethylene (A)> | 34.0 |

TABLE 11-continued

| | Ex 25 |
|---|---|
| Intrinsic viscosity [$\eta_E$] (dl/g) | |
| Composition ratio ¹ (wt %) | 0.12 |
| Addition polymerization <polypropylene (C)> | 2.8 |
| Intrinsic viscosity [$\eta_C$] (dl/g) | |
| Composition ratio ¹ (wt %) | 0.02 |
| Propylene (co-)polymer | 1.89 |
| Intrinsic viscosity [$_P$] (dl/g) | |
| Propylene (co-)polymer composition | 1.93 |
| Intrinsic viscosity [$\eta_T$] (dl/g) | |
| Melt tension (MS) (cN) | 2.4 |
| Crystallization temperature (° C.) | 119.8 |
| MFR initial (g/10 minutes) | 4.0 |
| final (g/10 minutes) | 4.1 |
| ΔMFR (g/10 minutes) | 0.1 |

Example 26

Using the same conditions as example 1 except that the amount of the preactivated catalyst containing a high molecular weight polyethylene was altered to 0.24 weight % and 0.46 weight %, polypropylene compositions were obtained. The obtained polypropylene compositions were analyzed as mentioned below.

(1) Transmission electron microscope (TEM) observation

The transmission electron microscope (TEM) observation was conducted as follows. Pellet specimens were preheated for three minutes with a heat-press set at 200° C., press-molded for 5 minutes under the pressure of 50 kg/cm $^2$, and solidified with a cooling press of 50° C. for three minutes to obtain a plate-like testing piece of 1 mm thickness. After trimming, the test piece was treated with electron staining of a vapor of an aqueous solution of $RuO_4$ to apply contrast for the TEM observation. The aqueous solution of RuO $_4$ was produced by dissolving 0.6 g of $NaIO_4$ (made by Wako Pure Chemical Industries, Ltd., guaranteed reagent) and 0.1 g of $RuCl_3.nH_2O$ (made by Wako Pure Chemical Industries, Ltd.) in 10 ml of pure water. The test piece was put in a sealed container with the aqueous solution of $RuO_4$ and left for 48 hours in a room temperature for staining. Although staining was conducted by a vapor from an aqueous solution in this invention, other methods can be used as well to obtain the same effect, such as staining by soaking in an aqueous solution of $RuO_4$ or by sublimated gas from an $RuO_4$ crystal. The stained specimen was cut to form ultra-thin slices of approximately 80 nm thickness with the Ultramicrotome made by JEOL, Ltd. using a knife angle of 45°. The ultra-thin slices were observed with the JEM-100CX.TEM made by JEOL, Ltd. with an acceleration voltage of 100 kV.

A photograph observed with the above mentioned TEM with 75000 magnification is shown as FIG. 1. As apparently seen from FIG. 1, a high molecular weight polyethylene having a numerical average particle size of approximately 70 nm was dispersed in the polymer of this embodiment. It was also observed that the high molecular weight polyethylene has a lamella structure.

Figure 2:
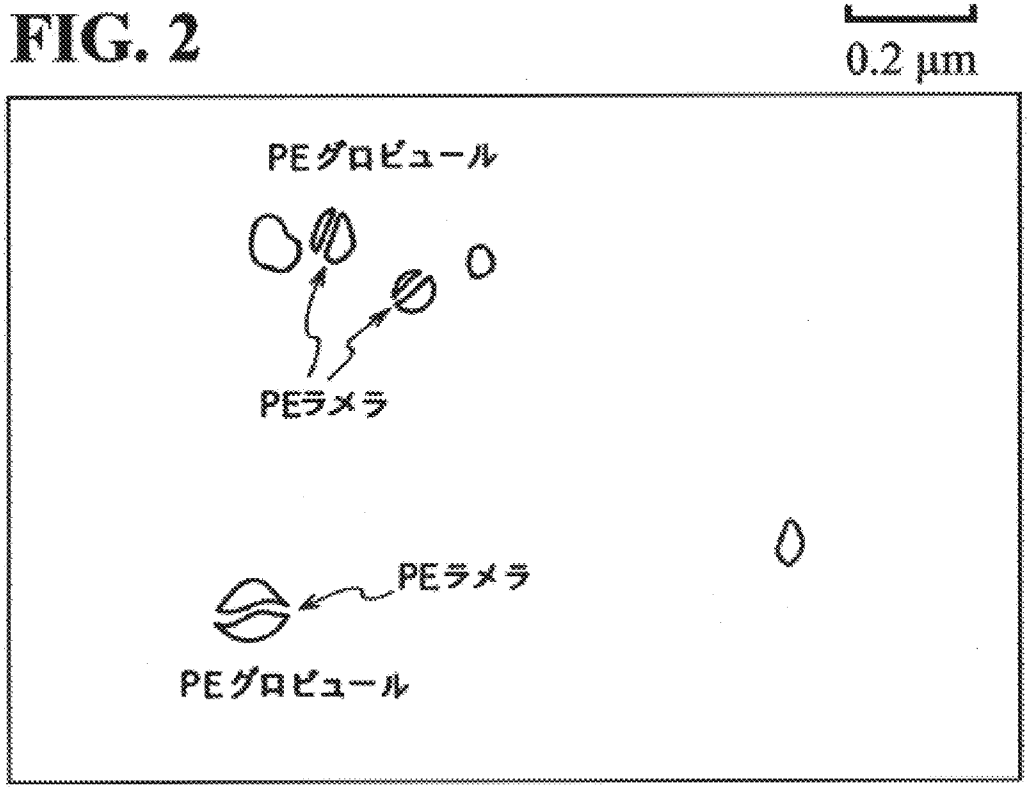
FIG. 2 is a traced diagram explaining the photograph of FIG. 1.

FIG. 2 is a traced diagram of FIG. 1 with explanation to facilitate understanding. The globule and the lamella structure of the high molecular weight polyethylene are added for explanation.

Figure 3:
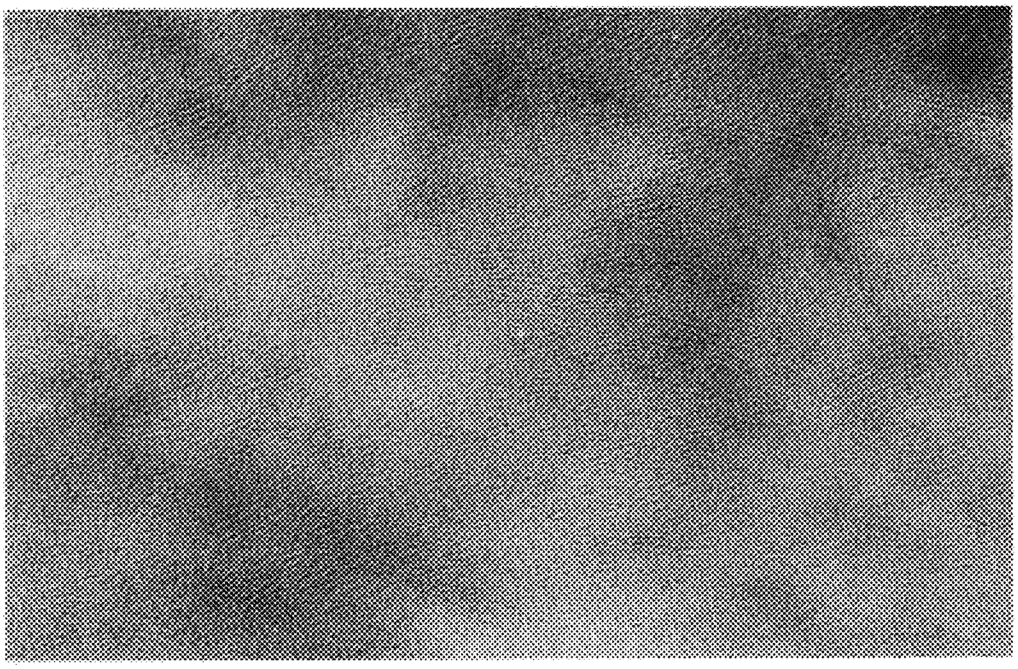
FIG. 3 is a TEM photograph of polypropylene that has generally been known.
Figure 4:
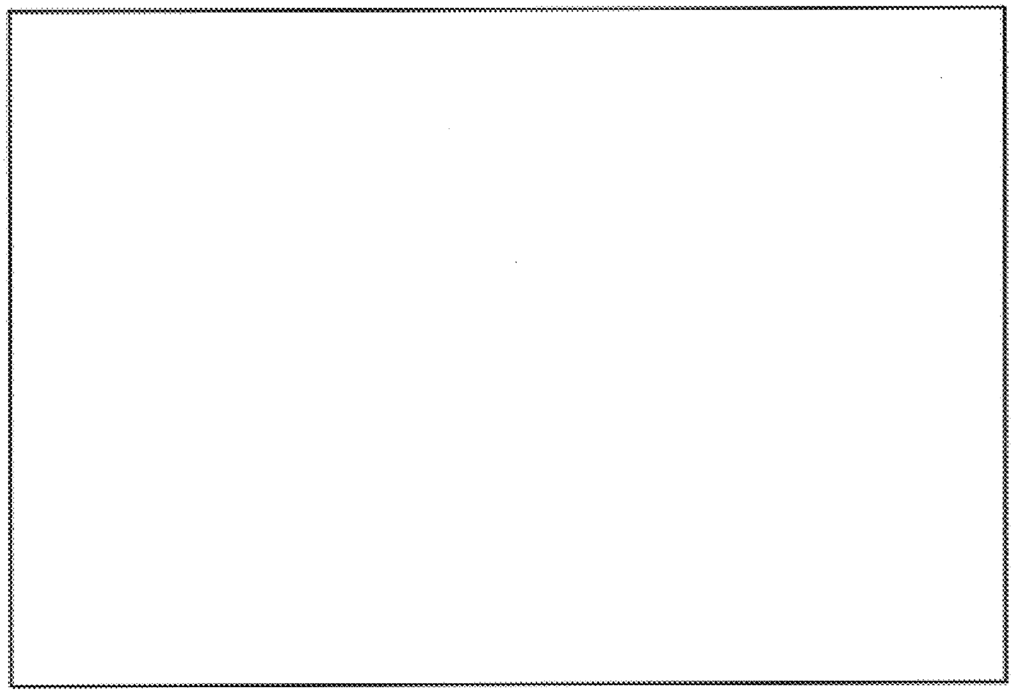
FIG. 4 is a traced diagram for explaining the photograph of FIG. 3.

On the other hand, particles are not dispersed in conventional well-known polypropylenes as described in the TEM photograph (FIG. 3) and its traced diagram (FIG. 4).

(2) Rheological analysis

① Sample production for Rheometrics Mechanical Spectrometer (RMS-800) measurement Pellets for RMS-800 measurement (mixture of 0.1 weight % of a thermal stabilizer: 2,6-di-t-butyl-p-cresol (BHT) and 0.1 weight % of a lubricant:calcium stearate) were pressed with a plate having a 25 mm diameter of 200° C. The plate was set in the RMS-800 for measurement.

② Elongational viscosity measurement (i) A thermal stabilizer (BHT:0.1 weight %, lubricant calcium stearate: 0.1 weight %) was added to powders and blended with a Henschel mixer for three minutes.

(ii) The above mentioned blend was pelletized with an extruder having a diameter of 40 mm with the temperature of 230° C.

(iii) Strands having a uniform diameter were produced from the above mentioned pellets with a Melt Tension Tester having a 3 mm orifice diameter from Toyo Seiki Seisaku-sho, Ltd. at a temperature of 210° C. and the extruding rate of 5 mm/minute after the preheating time of 5 minutes before extruding.

Hereinafter the Theological behavior will be explained 1. About G'

Figure 5:
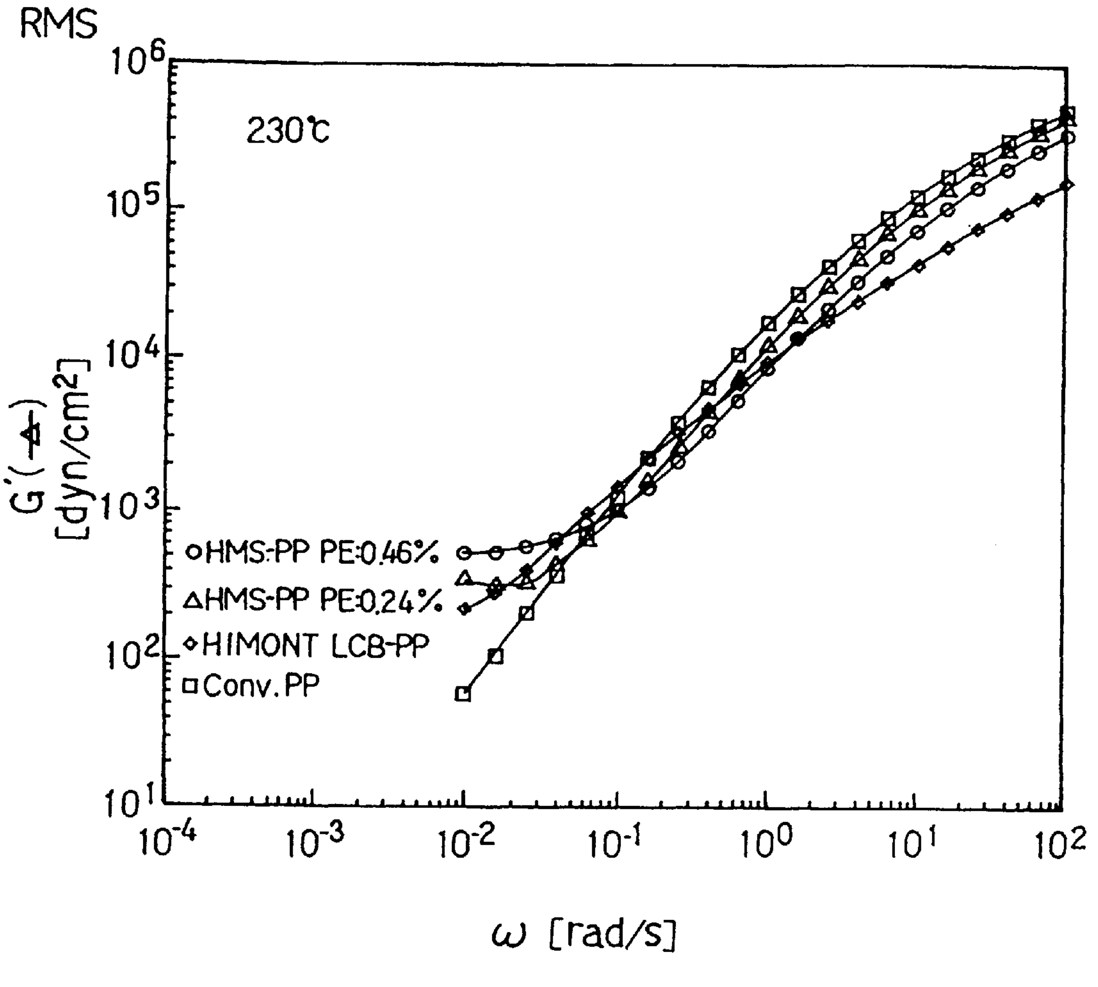
FIGS. 5 to 7 are charts showing the rheology behavior of the polymer composition according to Example 26 of the present invention and the relationship between a storage elastic modulus G'and a frequency ω)
Figure 6:
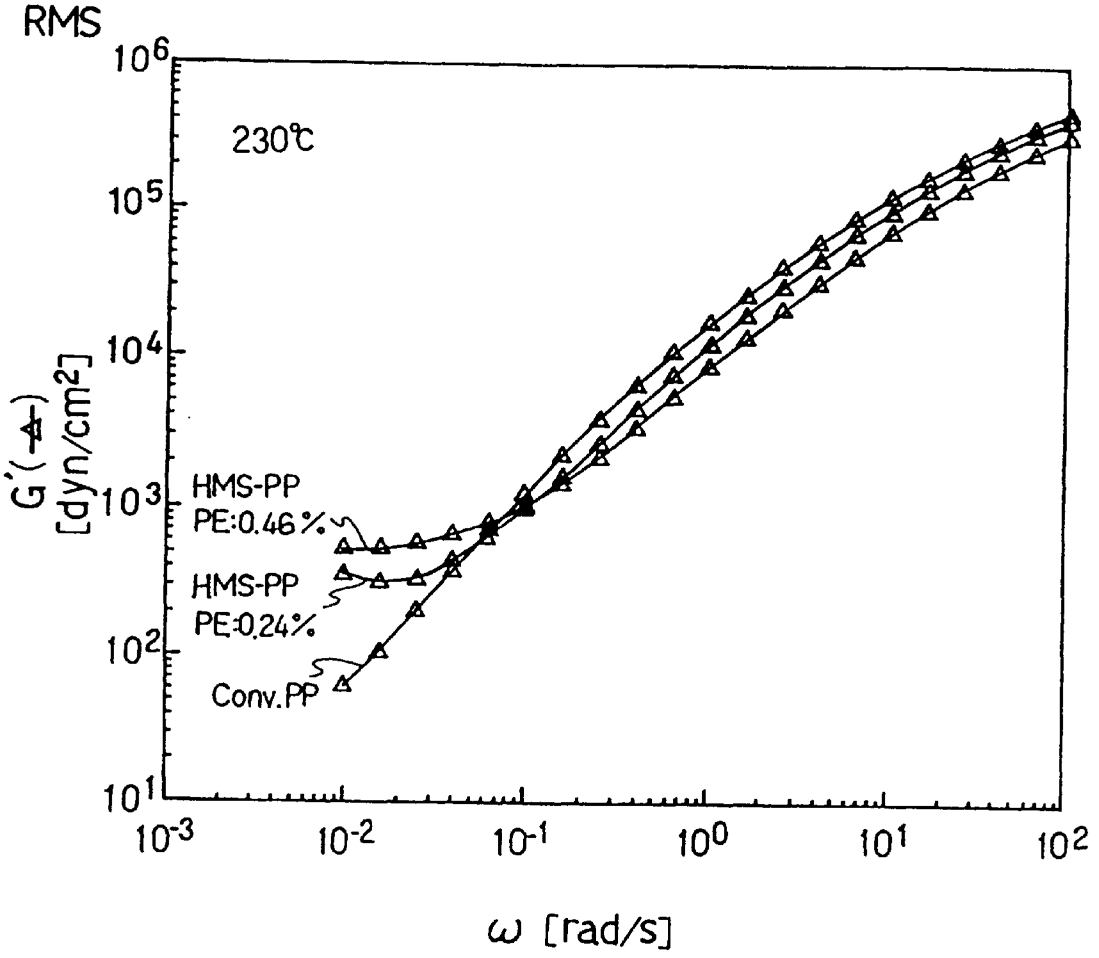
Figure 7:
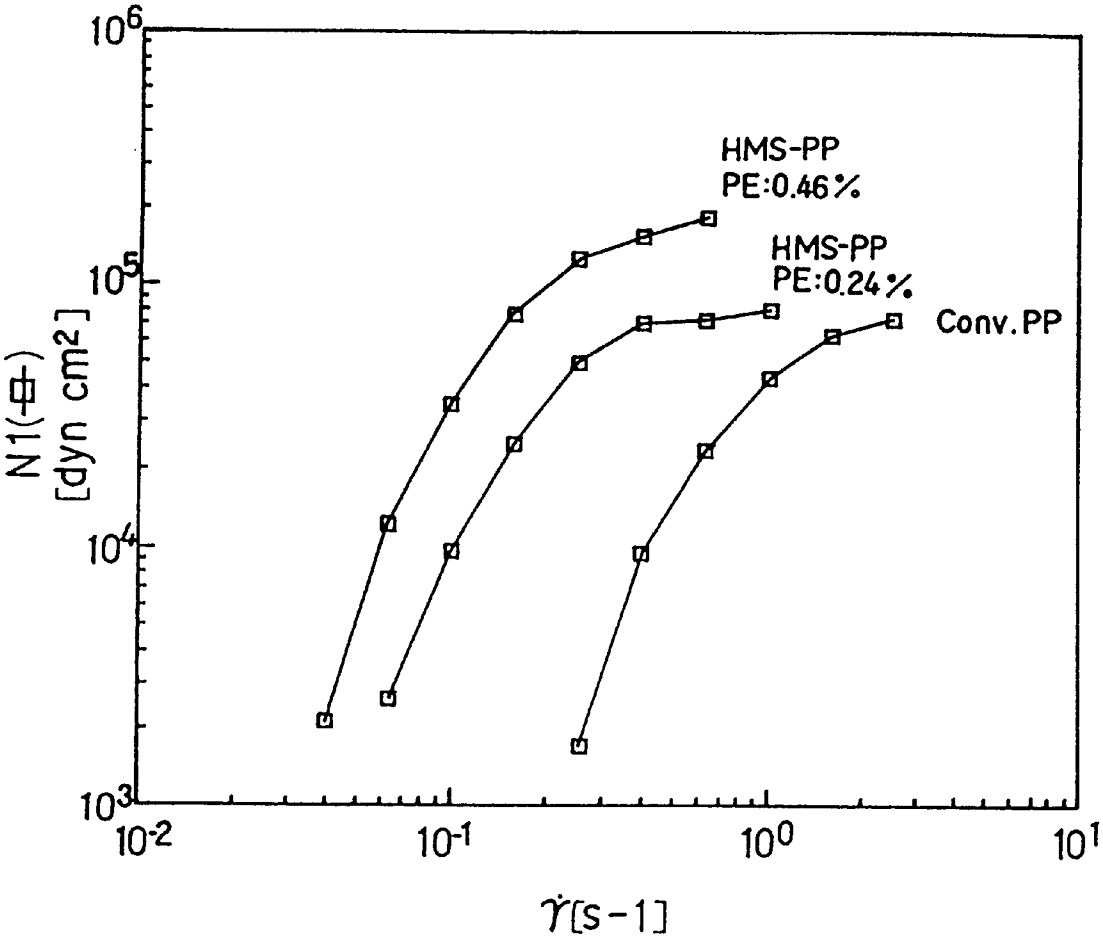

With respect to a molten product, a storage elastic modulus G' at 230° C. was measured with a strain in a linear range of frequencies of $10^{-2}$ to $10^2$ [rad/sec] with a Rheometrics Mechanical Spectrometer RMS-800 made by Rheometrics Incorporated having a parallel plate with a 25 mm diameter attached thereto. the results are shown in FIGS. 5 to 7.

As illustrated in FIGS. 5 and 6 (vertical axis:storage elastic modulus G', horizontal axis:frequency ω), G' of a polymer of the present invention (hereinafter abbreviated as "HMS-PP") has a second plateau in a lower frequency region, which is not seen in a conventional example, Conv. PP. The height of the second plateau increases according to the amount of the pretreated PE. The second plateau is known to be found in copolymers or polymers filled with inorganic compounds having a configuration in which rubber particles are dispersed in a plastic phase as islands. It is regarded as caused by a long-term alleviation mechanism derived from the dispersion phase structure. It is considered that the second plateau appears because HMS-PP has dispersed ultra-high molecular amount PE particles on a sub-micron order. "HIMONT LCB-PP" in FIG. 5 denotes an electron beam crosslinked polypropylene produced with an electron beam radiation method of Himont Incorporated. What is important is that the electron beam crosslinked polypropylene does not have a second plateau neither. 2. About $N_1$ The first normal stress differences $N_1$ of a molten product at 190° C., 230° C. and 250° C. were measured in a shear rate range of $10^{-2}$ to 10 [$sec^{-1}$] with a Rheometrics Mechanical Spectrometer RMS-800 made by Rheometrics Incorporated having a cone plate with a diameter of 25 mm and a cone angle of 0.1 radian attached thereto.

The measurement was initiated after 30 minutes from setting a sample and stabilizing the temperature. The time to achieve a constant flow state was determined by a preliminary measurement.

Preliminary measurement: A constant flow was applied to 150 [S] at 0.01 [$s^{-1}$] and 100 [S] samples at 0.1 [$s^{-1}$] and the minimum time to reach a predetermined viscosity was found.

Figure 8:
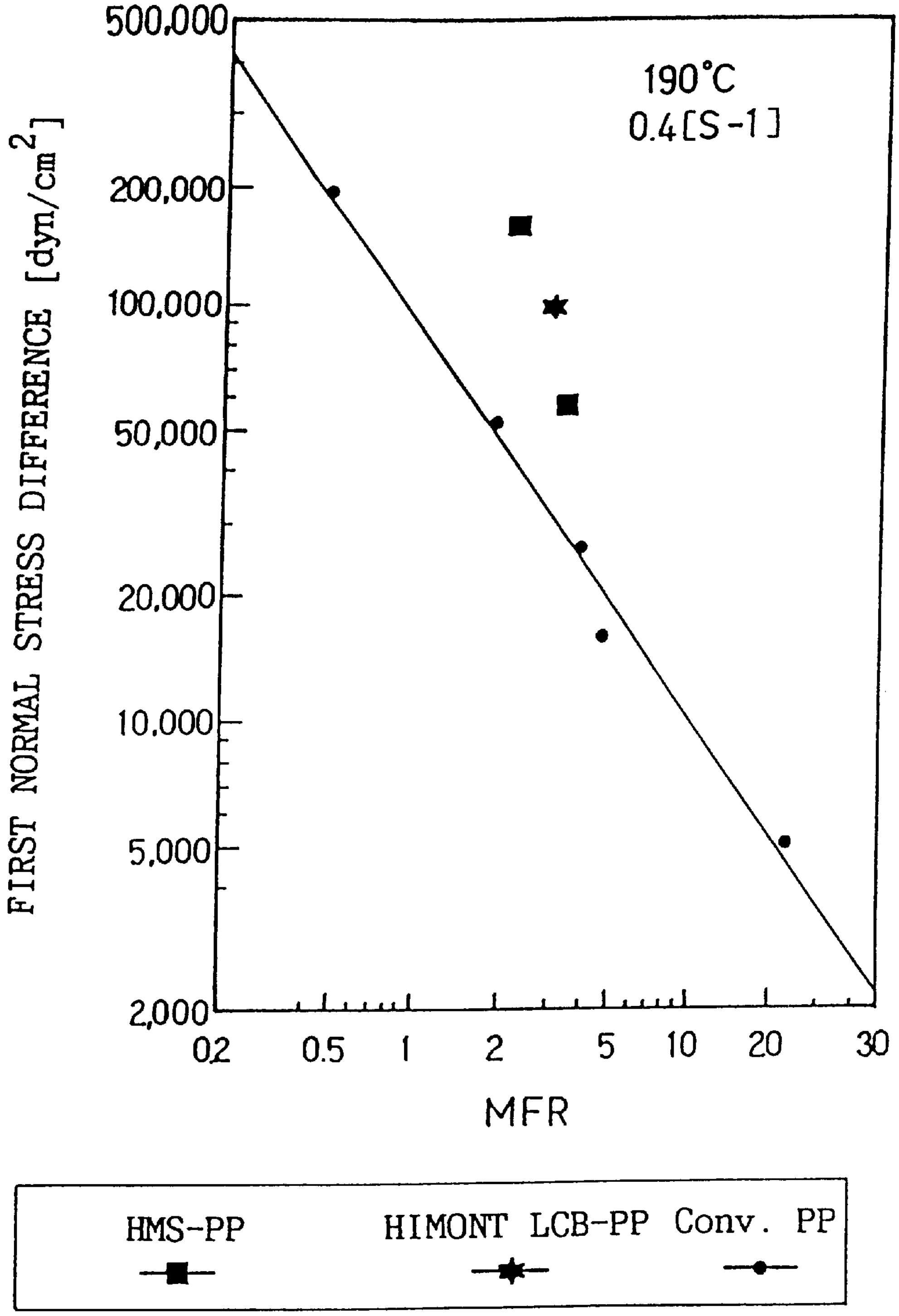
FIGS. 8 and 9 are charts showing the rheology behavior of the polymer composition according to Example 26 of the present invention and the relationship between a first normal stress difference $N_1$ and a shearing rate γ.
Figure 9:
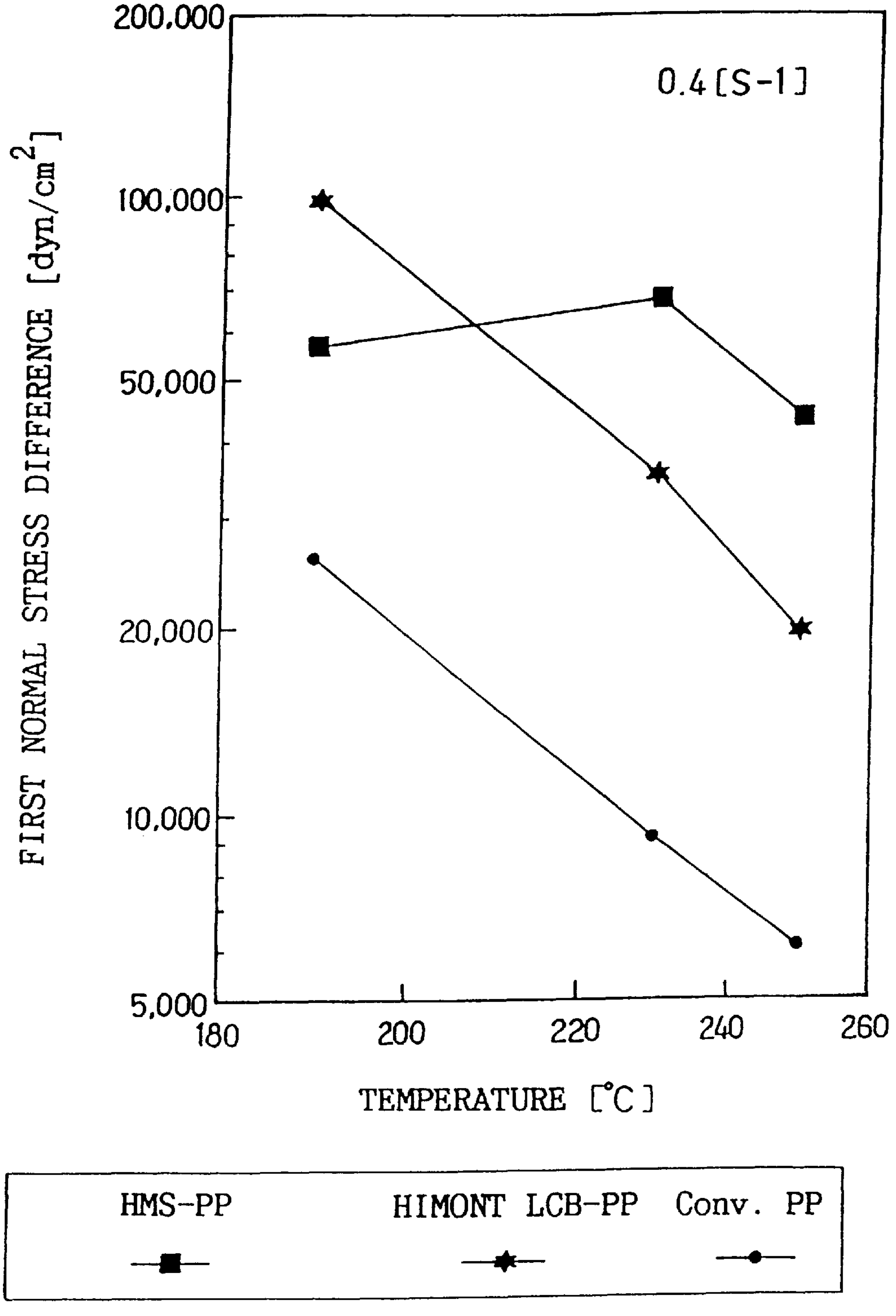

As can be seen in FIG. 7 (vertical axis: first normal stress difference $N_1$, horizontal axis: shear rate γ), FIG. 8 (vertical axis: first normal stress difference $N_1$, horizontal axis: MFR), $N_1$ of HMS-PP is higher than that of Conv. PP, and increases according to the pretreated PE amount. One having an $N_1$ higher than that of Conv. PP is the PP made by an electron radiation method of Himont Incorporated. But as illustrated in FIG. 9 (vertical axis first normal stress difference $N_1$, vertical axis: temperature), an $N_1$ of a Conv. PP or an electron beam radiation method PP lowers as the temperature rises, whereas the temperature dependency of the HMS-PP is small. 3. About G(t)

An alleviated elastic modulus G(t) of a molten product at 230° C. was measured with a strain of 500% and a time scale of 330 [s] with a Rheometrics Mechanical Spectrometer RMS-800 made by Rheometrics Incorporated having a cone plate with a diameter of 25 mm and a cone angle of 0.1 radian attached thereto. Specifically, samples were set between cone plates having a cone angle of 0.1, and the lower plate was rotated 28.65° in an instant to cause a 500% strain. The angle of 28.65° was determined in the following manner. The 500% strain means that the strain γ is expressed by 5. According to the formula $\gamma = K\alpha \times \theta$ wherein Kα is a strain constant and θ is an angle displacement (rad), θ expressed by γ/Kα. In this case, Kα is 10 according to 1/0.1 provided that the cone angle is 0.1. Therefore, θ comes to be 5/10, that is 0.5 (rad), equal to 28.65 °.

Figure 10:
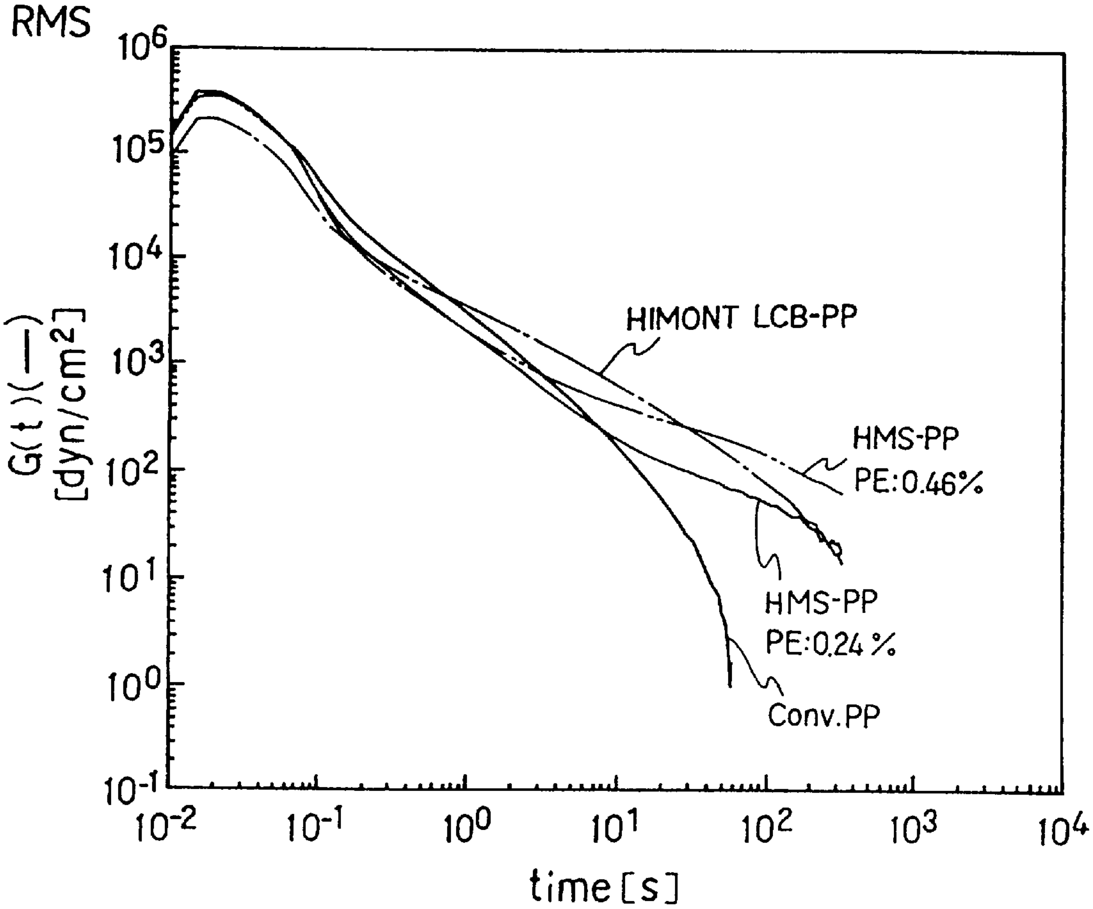
FIGS. 10 and 11 are charts showing the rheology behavior of the polymer composition according to Example 26 of the present invention and the relationship between a relaxation elastic modulus G(t) and time.
Figure 11:
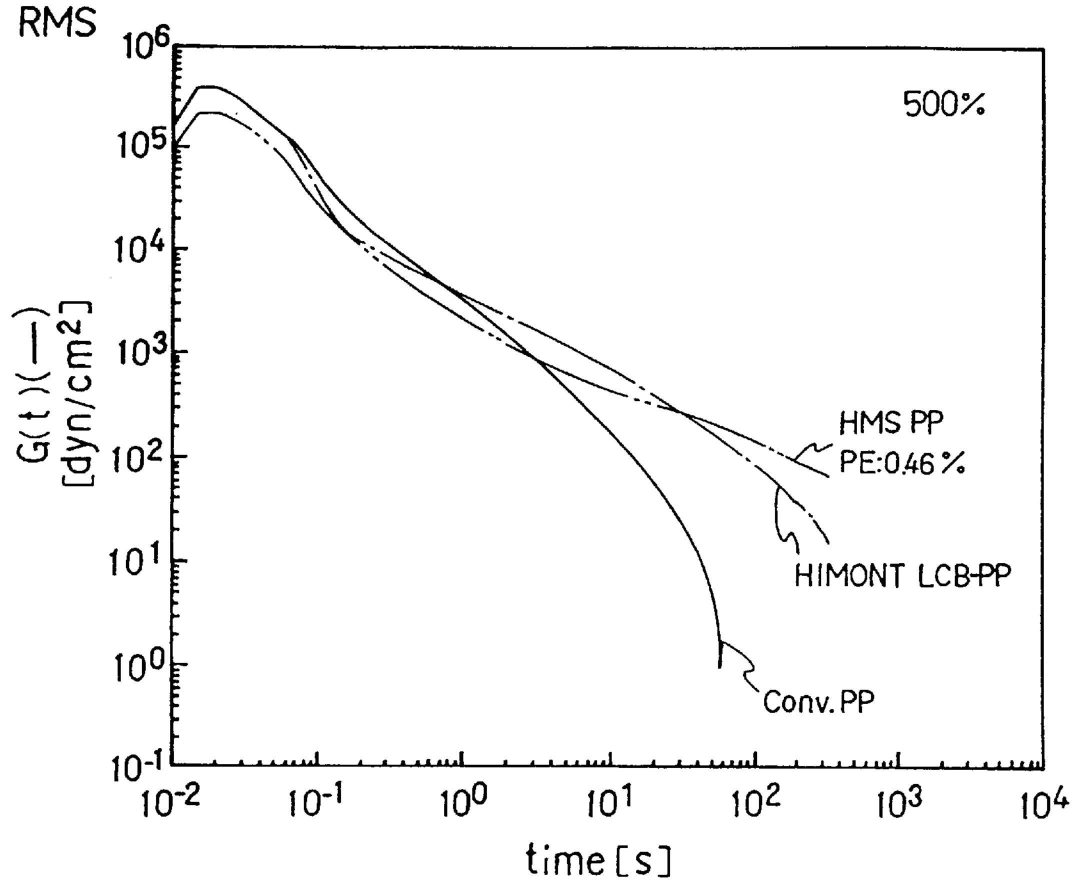

As illustrated in FIGS. 10 and 11 (vertical axis alleviated elastic modulus G(t), horizontal axis:time), the G(t) curve of HMS-PP has a tilt almost the same as that of Conv. PP at a short time end, but the tilt becomes moderate at a long time end to show a long time side plateau. An end region was not observed within the measurement time scale (330 [s] or less), and the starting point of the long time plateau moves toward the short time side according to the increase of the pretreated PE amount.

The tilt of the G(t) curve of PP by the electron beam radiation production method of Himont Incorporated is moderate compared with that of Conv. PP or HMS-PP, but does not show a long time plateau and has an end region as in the case of Conv. PP.

A long time plateau of the G(t) curve is observed also in PP having a two way molecular weight distribution.

4. About elongational viscosity

Strands having a uniform diameter were preheated for 5 minutes in a silicone oil bath of 180° C. and elongated at a constant strain rate (0.05, 0.10, 0.30) with Melten Reometer made by Toyo Seiki Seisaku-sho Ltd. to measure an elongational viscosity. The above mentioned elongational viscosity meter measured the tension and the strand diameter with the passage of time (the strand diameter was measure with a CCD camera).

Figure 12:
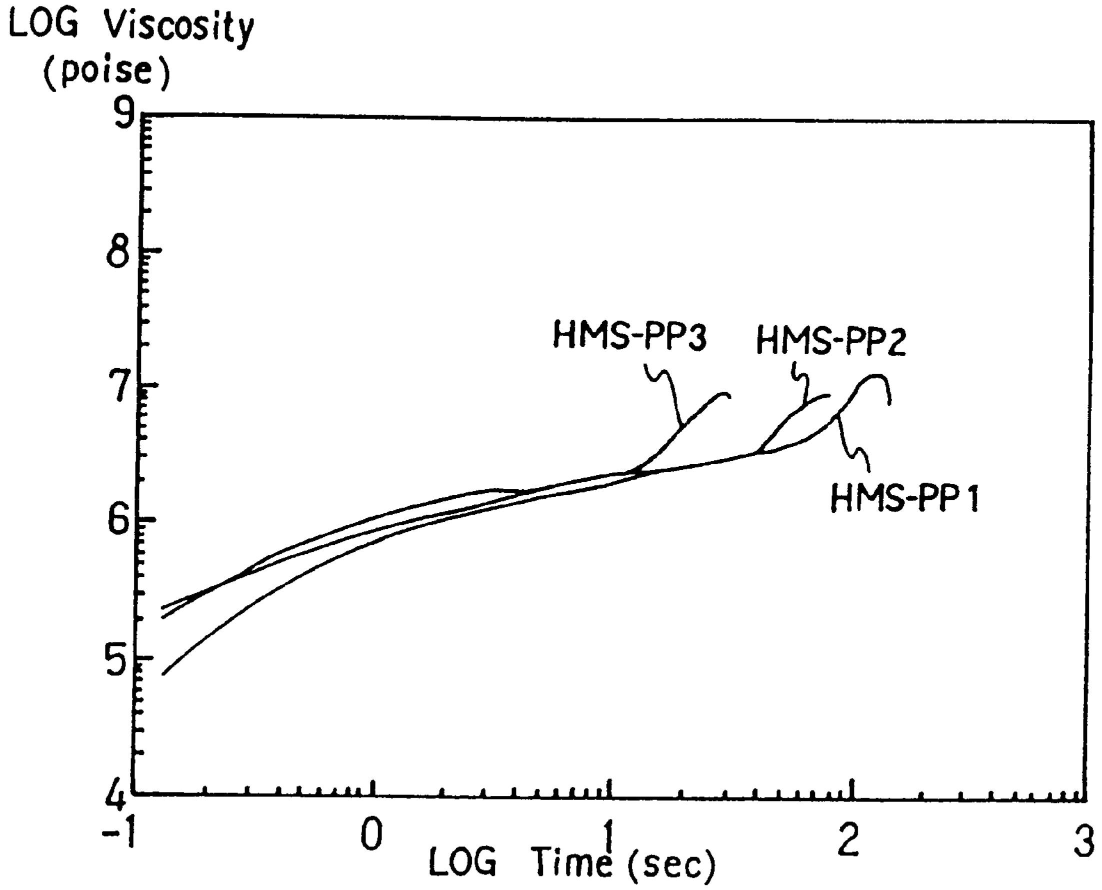
FIGS. 12 and 13 are charts showing the rheology behavior of the polymer composition according to Example 26 of the present invention and the relationship between an elongational viscosity and time.

FIG. 12 (vertical axis:elongational viscosity, horizontal axis:time) illustrates a case in which a polypropylene composition was obtained using the same conditions as example 1 except that the amount of the preactivated catalyst containing a high molecular weight polyethylene was changed to 0.46 weight % and the amount of hydrogen was changed. Elongational viscosities of the obtained polypropylene composition were measured with different strain rates (γ). The measurement conditions are shown in Table 12and the measurement results are shown in FIG. 12.

TABLE 12

| Sample No. | MFR (g/10 minutes) | strain rate ($sec^{-1}$) |
|---|---|---|
| HMSPP-1 | 0.5 | 0.021 |
| HMSPP-2 | 0.5 | 0.037 |
| HMSPP-3 | 0.5 | 0.128 |

Figure 13:
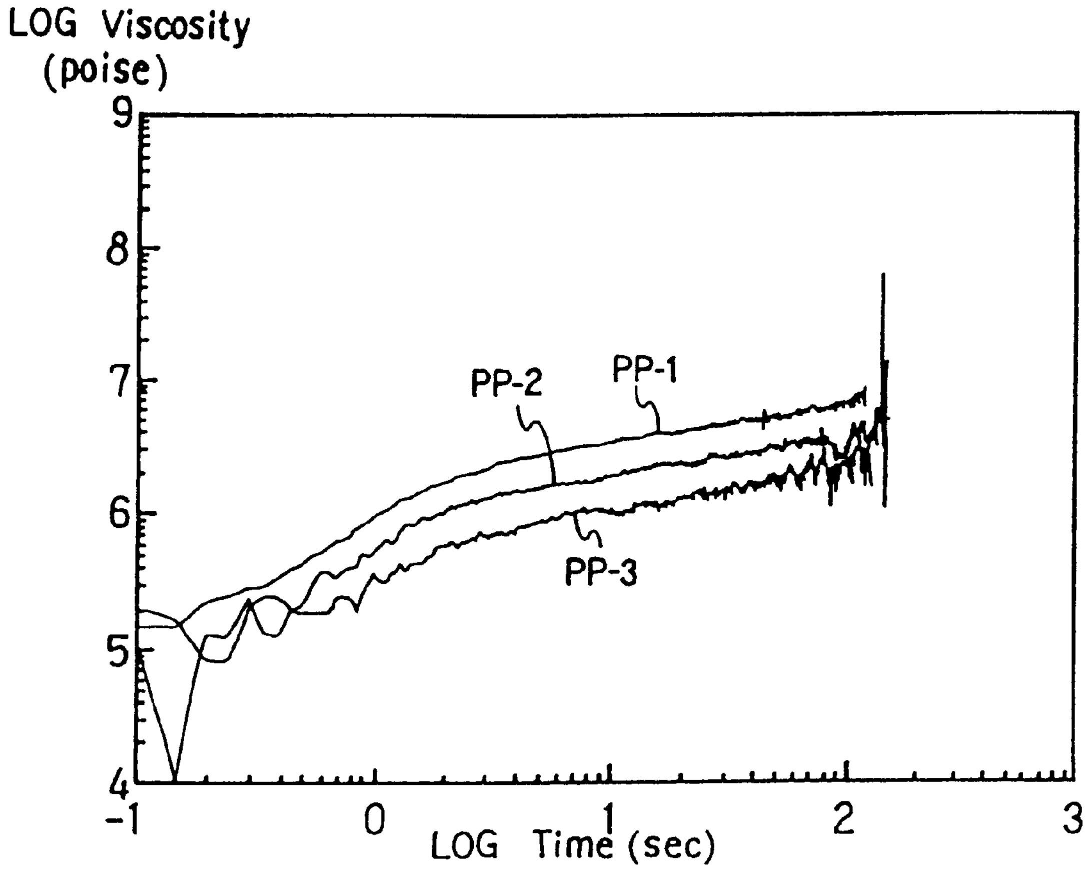

FIG. 13 (vertical axis:elongational viscosity, horizontal axis:time) illustrates a case in which a polypropylene composition was obtained using the same conditions as comparative example 3 except that the amount of hydrogen was changed. Elongational viscosities of the obtained polypropylene composition were measured with different strain rates (γ). The measurement conditions are shown in Table 13 and the measurement results are shown in FIG. 13.

TABLE 13

| Sample No. | MFR (g/10 minutes) | strain rate ($sec^{-1}$) |
|---|---|---|
| Conv. PP-1 | 0.5 | 0.021 |
| Conv. PP-2 | 1 | 0.020 |
| Conv. PP-3 | 2 | 0.017 |

As described above, the elongational viscosity value of a Comv.PP converges to a constant value even when a large deformation by elongation was applied (Table 13). whereas an HMS-PP shows a stain hardening property with a viscosity rise beyond a certain amount of deformation (Table 12). The viscosity rise is advantageous in a forming molding or a blow molding having a large deformation. The strain hardening property is seen in an electron beam radiation production method PP or an ionomer of Himont Incorporated. However, the phenomenon cannot be seen in a bulk polypropylene composition.

As heretofore mentioned, it was confirmed that the HMS-PP of the present invention shows, or remarkably shows the above mentioned advantageous features compared with a blank PP without adding a preactivated catalyst containing a high molecular weight ethylene regardless of homo PP, random PP or block PP. It is presumably because of the interaction among dispersed high molecular weight ethylene molecules and polypropylene molecules.

It was also confirmed that even when the preactivated catalyst powders containing a high molecular weight ethylene were blended to a base PP, the above mentioned rheological behavior does not appear.

As this invention may be embodied in several forms without departing from the spirit of essential characteristics thereof, the present embodiments are therefore illustrative and not restrictive, since the scope of the invention is defined by the appended claims rather than by the description preceding them, and al changes that fall within metes and bounds of the claims, or equivalence of such metes and bounds are therefore intended to embraced by the claims.

What is claimed is:

1. An olefin (co-)polymer composition comprising: 0.01 to 5.0 weight parts of a high molecular weight polyethylene which is an ethylene homopolymer or an ethylene-α-olefin copolymer containing 50 weight % or more of ethylene units; and 100 weight parts of a polypropylene which is a polypropylene homopolymer or a copolymer of propylene with at least one of ethylene or α-olefins having 4–12 carbon atoms containing 50 weight % or more of propylene units, wherein said high molecular weight polyethylene has an intrinsic viscosity ($\eta_E$) of 15 to 100 dl/g measured in tetrahydronaphthalene at 135° C. and said high molecular weight polyethylene exists as dispersed fine particles having a numerical average particle size of 10 to 500 nm.

2. The olefin (co-)polymer composition according to claim 1, wherein the following relationship is satisfied in the state of bulk where a rubber component or an inorganic filler is not contained:

$$\log (G')(\omega=10^0))-\log(G'(\omega=10^{-2}))<2,$$

where a storage modulus is G'($\omega=10^0$) at a frequency of $\omega=10^0$ and a storage modulus is G'($\omega=10^{-2}$) at a frequency of $\omega=10^{-2}$ for the composition melted at 230° C.

3. The olefin (co-)polymer composition according to claim 1, wherein the following relationship is satisfied in the state where electron beam radiation is not performed:

$$\log (N_1) > -\log (MFR) + 5$$

where MFR denotes a melt flow rate measured based on the condition 14 of Table 1 of the JIS K 7210, which is a weight of the composition melted at 230° C. and extruded through a die with an inner diameter of 2.095±0.005 mm in 10 minutes when a load of 2.16 kg is applied, and $N_1$ denotes a first normal stress difference with a shear rate of $4\times10^{-1}$ (sec $^{-1}$) at 190° C.

4. The olefin (co-)polymer composition according to claim 1, wherein the following relationship is satisfied:

$$(N_1(190° C.)-N_1(250° C.))/N_1(190° C.)<0.6$$

a first normal stress difference being expressed by $N_1$ (190° C.) and $N_1$(250° C.) with a shear rate of $4\times10^{-1}$ (sec$^{-1}$).

5. The olefin (co-)polymer composition according to claim 1, wherein the following relationship is satisfied:

$$(MS(190° C.)-MS(250° C.))/MS(190° C.)<3.1$$

a melt tension expressed by MS (190° C.) and MS (250° C.) with a shear rate of $3\times10^{-1}$ (sec$^{-1}$).

6. The olefin (co-)polymer composition according to claim 1, wherein the following relationship is satisfied:

$$\{G(t=10)-G(t=300)\}/G(t=10)<1$$

a relaxation elastic modulus being expressed by G (t=10) at t=10 (sec), and a relaxation elastic modulus being expressed by G (t=300) at t=300 (sec) on the condition of 500% of a strain of the composition melted 200° C.

7. The olefin (co-)polymer composition according to claim 1, wherein a rapid growth of elongational viscosity occurs in a large deformation region.

8. The olefin (co-)polymer composition according to claim 1, wherein said high molecular weight polyethylene fine particles are added before or during polymerization of the polypropylene.

9. The olefin (co-)polymer composition according to claim 1, wherein 0.001 to 2 weight parts of at least one stabilizer selected from the group consisting of a phenol antioxidant and a phosphoric antioxidant is added to 100 weight parts of the olefin (co-)polymer composition.

10. The olefin (co-)polymer composition according to claim 1, wherein the polypropylene is produced in the presence of a preactivated catalyst, the high molecular weight polyethylene is supported by a polyolefin producing catalyst, said preactivated catalyst comprises the high molecular weight polyethylene and the polyolefin producing catalyst, and said polyolefin producing catalyst comprises a transition metal compound catalytic component containing at least a titanium compound, 0.01 to 1000 mol of an organic metal compound (AL1) comprising a metal selected from group I, group II, group XII or group XIII or the periodic table per 1 mol of the transition metal atom, and 0 to 500 mol of an electron donor (E1) per 1 mol of the transition metal atom.

11. The olefin (co-)polymer composition according to claim 10, wherein the polypropylene is obtained by polymerizing propylene alone or copolymerizing propylene with at least one of ethylene or α-olefins having 4 to 12 carbon atoms in the presence of the preactivated catalyst, wherein the preactivated catalyst further comprises an organic metal compound (AL2) and an electron donor (E2), said organic metal compound (AL2) is a compound of a metal selected from groups I, II, XII or XIII of the periodic table, the total content of the organic metal compounds (AL1) and (AL2) is 0.05 to 5000 mole per mole of the transition metal atom in the preactivated catalyst, and the total content of the electron donors (E1) and (E2) is 0 to 3000 mole per mole of the transition metal atom in the preactivated catalyst.

12. The olefin (co-)polymer composition according to claim 1, wherein the polypropylene is produced by mixing a) a polypropylene, which is produced in the presence of a preactivated catalyst, wherein the high molecular weight polyethylene is supported by a polyolefin producing catalyst, said preactivated catalyst comprises said high molecular weight polyethylene and said polvolefin producing catalyst, and said polyolefin producing catalyst comprises a transition metal compound catalytic component containing at least a titanium compound, 0.01 to 1000 mol of an organic metal compound (AL1) comprising a metal selected from group I, group II, group XII or group XIII of the periodic table per 1 mol of the transition metal atom, and 0 to 500 mol of an electron donor (E1) per 1 mol of the transition metal atom, and b) another polypropylene which is a propylene homopolymer or a copolymer of propylene with at least one of ethylene and α-olefins having 4 to 12 carbon atoms containing 50 weight % or more of propylene polymerization units.

13. The olefin (co-)polymer composition according to claim 1, wherein the intrinsic viscosity ($\eta_T$) of the olefin (co-)polymer composition which is measured in tetrahydronaphthalene at 135° C. is 0.2 to 10 dl/g.

14. The olefin (co-)polymer composition according to claim 1, wherein the olefin (co-)polymer composition satisfies the following relationship between a melt tension (MS) at 230° C. and an intrinsic viscosity ($\eta_T$) measured in tetrahydronaphthalene at 135° C.:

$$\log (MS) > 4.24 \times \log(\eta_T) - 120.$$

15. The olefin (co-)polymer composition according to claim 10, wherein the preactivated catalyst supports 0.01 to 5000 g of the high molecular weight polyethylene with an intrinsic viscosity ($\eta_E$) of 15 to 100 dl/g measured in tetrahydronaphthalene at 135° C. per 1 g of the transition metal compound catalytic component.

16. The olefin (co-)polymer composition according to claim 10, wherein the preactivated catalyst supports 0.01 to 100 g of a polypropylene (B) and 0.01 to 500 g of the high molecular weight polyethylene per 1 g of the transition metal compound catalytic component, said polypropylene (B) has an intrinsic viscosity ($\eta_B$) of less than 15 dl/g measured in tetrahydronaphthalene at 135° C., and is a propylene homopolymer or a copolymer of propylene with at least one of ethylene and α-olefins having 4–12 carbon atoms comprising 50 weight % or more of propylene units, and said high molecular weight polyethylene has an intrinsic viscosity ($\eta_E$)15 to 100 dl/g measured in tetrahydronaphthalene at 135° C.

17. The olefin (co-)polymer composition according to claim 1, wherein the olefin (co-)polymer composition satisfies the following relationship between a melt tension (MS) at 230° C. and an intrinsic viscosity ($\eta_T$) measured in tetrahydronaphthalene at 135° C.:

$$4.24\times\log(\eta_T)+0.24>\log(MS)>4.24\times\log(\eta_T)-1.05.$$

18. The olefin (co-)polymer composition according to claim 16, wherein the polypropylene (B) has an intrinsic viscosity ($\eta_B$) which satisfies the following relationship among said ($\eta_B$), the intrinsic viscosity ($\eta_E$) the high molecular weight polyethylene (A) and the intrinsic viscosity $\eta_T$ of said olefin (co-)polymer composition:

$$(\eta_T)<(\eta_B)<(\eta_E).$$

19. A method for producing an olefin (co-)polymer composition comprising the steps of:

a preliminary activating polymerization process which comprises polymerizing ethylene alone or copolymerizing ethylene and one or more α-olefins having 3 to 12 carbon atoms in the presence of a polyolefin producing catalyst to form a high molecular weight polyethylene (A), which is a polyethylene homopolymer or an ethylene-α-olefin copolymer comprising 50 weight % or more of ethylene units, thereby obtaining a preactivated catalyst which comprises said polyolefin producing catalyst and said high molecular weight polyethylene (A) supported by said catalyst, wherein said high molecular weight polyethylene (A) has an intrinsic viscosity ($\eta_E$) of 15 to 100 dl/g measured in tetrahydronaphthalene at 135° C., and a main polymerization process which comprises polymerizing propylene alone or copolymerizing propylene with at least one of ethylene and α-olefins having 4 to 12 carbon atoms in the presence of said preactivated catalyst to form a polypropylene containing 50 weight percent or more of propylene units.

20. The method for producing an olefin (co-)polymer composition according to claim 19, wherein said polyolefin producing catalyst comprises (i) a transition metal compound catalytic component including at least a titanium compound, (ii) an organic metal compound (AL1) and (iii) an electron donor (E1), said organic metal compound (AL1) is a compound of a metal selected from groups I, II, XII or XIII of the periodic table, the content of the organic metal compound (AL1) is 0.01 to 1000 mole per mole of the transition metal atom, the content of the electron donor (E1) is 0 to 500 mole per mole of the transition metal atom and the content of said high molecular weight polyethylene (A) supported is 0.01 to 5000 g per 1 gram of the transition metal compound catalytic component.

21. The method for producing an olefin (co-)polymer composition according to claim 20, further comprising a step of adding an organic metal compound (AL2) and an electron donor (E2) to the preactivated catalyst, wherein the total content of the organic metal compounds (AL1) and (AL2) in the preactivated catalyst is 0.05 to 5000 mole per 1 mole of the transition metal atom in the preactivated catalyst, and the total content of the electron donors (E1) and (E2) in the preactivated catalyst is 0 to 3000 mole per 1 mole of the transition metal atom in the preactivated catalyst.

22. The method for producing an olefin (co-)polymer composition according to claim 19, further comprising a step of adding 0.001 to 2 weight parts of at least one stabilizer selected from the group consisting of a phenolic antioxidant and a phosphoric antioxidant to 100 parts of the polypropylene after the main (co-)polymerization.

23. The method for producing an olefin (co-)polymer composition according to claim 19, wherein the high molecular weight polyethylene (A) is observed by transmission electron microscope (TEM) as dispersed fine particles having a numerical average particle size of 10 to 500 nm in a press-molded piece produced by using said olefin (co-) polymer composition as a molding material.

24. A method for producing an olefin (co-)polymer composition comprising the steps of:

a preliminary polymerization process which comprises polymerizing propylene alone or copolymerizing propylene with at least one of ethylene or α-olefins having 4 to 12 carbon atoms in the presence of a polyolefin producing catalyst to form a polypropylene (B), which is a propylene homopolymer or a propylene-α-olefin copolymer comprising containing 50 weight % or more of propylene units, thereby forming a preliminary polymerized catalyst which comprises said polyolefin producing catalyst and said polypropylene (B) supported by the polyolefin producing catalyst, wherein said polypropylene (B) has an intrinsic viscosity ($\eta_B$) of less than 15 dl/g measured in tetrahydronaphthalene at 135° C., a preliminary activating polymerization process which comprises polymerizing ethylene alone or copolymerizing ethylene with at least one of an α-olefin having 3 to 12 carbon atoms in the presence of the preliminary (co-)polymerized catalyst to form a high molecular weight polyethylene (A), which is an ethylene homopolymer or an ethylene-α-olefin copolymer comprising 50 weight % or more of ethylene units, thereby forming a preactivated catalyst which comprises said preliminary (co-)polymerized catalyst and said high molecular weight polyethylene (A) supported by the preliminary (co-)polymerized catalyst, wherein said high molecular weight polyethylene (A) has an intrinsic viscosity ($\eta_E$) of 15 to 100 dl/g measured in tetahydronaphthalene at 135° C., and a main polymerization process which comprises polymerizing propylene alone or copolymerizing propylene with at least one of ethylene or α-olefins having 4 to 12 carbon atoms in the presence of the preactived catalyst to obtain a polypropylene, containing 50 weight % or more of propylene units.

25. The method for producing an olefin (co-)polymer composition according to claim 24, wherein said polyolefin producing catalyst comprises (i) a transition metal compound catalytic component including at least a titanium compound, (ii) an organic metal compound (AL1) and (iii) an electron donor (E1), said organic metal compound (AL1) is a compound of a metal selected from groups I, II, XII or XIII of the periodic, the content of the organic metal compound (AL1) is 0.01 to 1000 mole per mole of the transition metal atom, the content of the electron donor (E1) is 0 to 500 mole per 1 mole of the transition metal atom, and the amount of said polypropylene (B) obtained in said preliminary polymerization process is 0.01 to 100 g per 1 g of said transition metal compound catalytic component, and the amount of said high molecular weight polyethylene (A) obtained in said preliminary activating polymerization process is 0.01 to 5000 g per 1 g of said transition metal compound catalytic component.

26. The method for producing an olefin (co-)polymer composition according to claim 24, further comprising a step of adding 0.001 to 2 weight parts of at least one stabilizer selected from the group consisting of a phenolic antioxidant and a phosphoric antioxidant to 100 parts of the polypropylene after the main polymerization.

27. The method for producing an olefin (co-)polymer composition according to claim 24, wherein the high molecular weight polyethylene (A) is observed by transmission electron microscope (TEM) as dispersed fine particles having a numerical average particle size of 10 to 500 nm in a press-molded piece produced by using said olefin (co-) polymer composition as a molding material.

28. A method for producing an olefin (co-)polymer composition comprising the steps of:

a preliminary polymerization process which comprises polymerizing propylene alone or copolymerizing propylene with at least one of an α-olefin having 4 to 12 carbon atoms in the presence of a polyolefin producing catalyst to obtain a polypropylene (B) containing 50 weight % or more of propylene units, thereby forming a preliminary polymerized catalyst which comprises said polyolefin producing catalyst and said polypropylene (B) supported by the polyolefin producing catalyst, wherein said polypropylene (B) has an intrinsic viscosity ($\eta_B$) of less than 15 dl/g measured in tetrahydronaphthalene at 135° C., a preliminary activating polymerization process which comprises polymerizing ethylene alone or copolymerizing ethylene with at least one of ethylene and α-olefins having 3 to 12 carbon atoms in the presence of said preliminary polymerized catalyst to obtain a high molecular weight polyethylene (A), which is an ethylene homopolymer or an ethylene-α-olefin copolymer comprising 50 weight % or more of ethylene units to obtain a preactivated catalyst which comprises said preliminary polymerized catalyst and said high molecular weight polyethylene (A) supported by the preliminary polymerized catalyst, wherein said high molecular weight polyethylene (A) has an intrinsic viscosity ($\eta_E$) of 15 to 100 dl/g measured in tetrahydronaphthalene at 135° C., an additional polymerization process which comprises polymerizing propylene alone or copolymerizing propylene with at least one of ethylene or an α-olefin of 4–12 carbon atoms, in the presence of said preactivated catalyst to form a polyolefin (C), thereby obtaining an additionally polymerized preactivated catalyst and said polyolefin (C) supported by said preactivated catalyst, wherein said polyolefin (C) has an intrinsic viscosity $\eta_C$ within the range of the intrinsic viscosity ($\eta_E$) of said high molecular weight polyethylene measured in tetrahydronaphthalene at 135° C., and a main polymerization process which comprises polymerizing propylene alone or copolymerizing propylene with at least one of ethylene and α-olefins having 4 to 12 carbon atoms in the presence of said additionally polymerized preactivated catalyst to obtain a polypropylene containing 50 weight % or more of propylene units.

29. The method for producing an olefin (co-)polymer composition according to claim 28, wherein said polyolefin producing catalyst comprises (i) a transition metal compound catalytic component including at least a titanium compound, (ii) an organic metal compound (AL1) and (iii) an electron donor (E1), said organic metal compound (AL1) is a compound of a metal selected from groups I, II, XII or XIII of the periodic, the content of the organic metal compound (AL1) is 0.01 to 1000 mole per mole of the transition metal atom, the content of the electron donor (E1) is 0 to 500 mole per 1 mole of the transition metal atom, and the amount of said polypropylene (B) obtained in said preliminary polymerization process is 0.01 to 100 g per 1 g of said transition metal compound catalytic component, and the amount of said high molecular weight polyethylene (A) obtained in said preliminary activation polymerization process is 0.01 to 5000 g per 1 g of said transition metal compound catalytic component, and the amount of the olefin used in the additional polymerization is 0.01 to 100 g per 1 gram of said transition metal compound catalytic component.

30. The method for producing an olefin (co-)polymer composition according to claim 28, further comprising a step of adding 0.001 to 2 weight parts of at least one stabilizer selected from the group consisting of a phenolic antioxidant and a phosphoric antioxidant to 100 parts of the polypropylene after main polymerization.

31. The method for producing an olefin (co-)polymer composition according to claim 28, wherein the high molecular weight polyethylene (A) is observed by transmission electron microscope (TEM) as dispersed fine particles having a numerical average particle size of 10 to 500 nm in a press-molded piece produced by using said olefin (co-) polymer composition as a molding material.

32. A method for producing an olefin (co-)polymer composition comprising the steps of:

a preliminary polymerization process which comprises polymerizing propylene alone or copolymerizing propylene with at least one of ethylene or α-olefins having 4 to 12 carbon atoms in the presence of a polyolefin producing catalyst which comprises (i) a transition metal compound catalytic component including at least a titanium compound, (ii) an organic metal compound (AL1), and (iii) an electron donor (E1), to form a polypropylene (B) containing 50 weight % or more of propylene units, thereby obtaining a preliminary polymerized catalyst which comprises said polyolefin producing catalyst and said polypropylene (B) supported by the polyolefin producing catalyst, wherein said polypropylene (B) has an intrinsic viscosity ($\eta_B$) of less than 15 dl/g measured in tetrahydronaphthalene at 135° C., a preliminary activating polymerization process which comprises polymerizing ethylene alone or copolymerization of ethylene with at least one of an α-olefin having 3 to 12 carbon atoms in the presence of said preliminary polymerized catalyst to obtain a high molecular weight polyethylene (A), which is an ethylene homopolymer or an ethylene-α-olefin copolymer comprising 50 weight % or more of ethylene units thereby obtaining a preactivated catalyst which comprises said preliminary polymerized catalyst and said high molecular weight polyethylene supported by the preliminary polymerized catalyst, wherein said high molecular weight polyethylene (A) has an intrinsic viscosity ($\eta_E$) of 15 to 100 dl/g measured in tetrahydronaphthalene at 135° C., and a main polymerization process which comprises polymerizing propylene alone or copolymerization of propylene with at least one of ethylene or α-olefins having 4 to 12 carbon atoms in the presence of the preactivated catalyst, an organic metal compound (AL2) and an electron donor (E2), to form a polypropylene containing 50 weight % or more of propylene units, wherein said organic metal compounds (AL1) and (AL2) are each independently a compound of a metal selected from groups I, II, XII or XIII of the periodic table, the amount of the organic metal compound (AL1) is 0.01 to 1000 mole per mole of the transition metal atom, and the total amount of the organic metal compounds (AL1) and (AL2) is 0.05 to 5000 mole per mole of the transition metal atom in the preactivated catalyst, the amount of the electron donor (E1) is 0 to 500 mole per mole of the transition metal atom, and the total amount of said electron donors (E2) and (E1) is 0 to 3000 mole per 1 mole of the transition metal atom in the preactivated catalyst.

33. A method for producing an olefin (co-)polymer composition comprising the steps of:

a preliminary polymerization process which comprises polymerizing propylene alone or copolymerizing propylene with at least one of ethylene or α-olefins having 4 to 12 carbon atoms in the presence of a polyolefin producing catalyst which comprises (i) a transition metal compound catalytic component including at least a titanium compound, (ii) an organic metal compound (AL1), and (iii) an electron donor (E1), to form a polypropylene (B) containing 50 weight % or more of propylene units, thereby obtaining a preliminary polymerized catalyst which comprises said polyolefin producing catalyst and said polypropylene supported by the polyolefin producing catalyst, wherein said polypropylene (B) has an intrinsic viscosity ($\eta_B$) of less than 15 dl/g measured in tetrahydronaphthalene at 135° C., a preliminary activating polymerization process which comprises polymerizing ethylene alone or copolymerizing ethylene with at least one of an α-olefin having 3 to 12 carbon atoms in the presence of said preliminary polymerized catalyst to obtain a preactivated catalyst which comprises said preliminary polymerized catalyst and said high molecular weight polyethylene supported by the preliminary (co-)polymerized catalyst to form a high molecular weight polyethylene (A), which is an ethylene homopolymer or an ethylene-α-olefin copolymer comprising 50 weight % or more of ethylene units, wherein said high molecular weight polyethylene (A) has an intrinsic viscosity ($\eta_E$) of 15 to 100 dl/g measured in tetrahydronaphthalene at 135° C., an additional polymerization process comprising polymerization of propylene alone or copolymerization of propylene and at leasty one of ethylene or an α-olefin of 4–12 carbon atoms in the presence of said preactivated catalyst to form a polyolefin (C), thereby obtaining an additionally polymerized preactivated catalyst comprising said preactivated catalyst and said polyolefin (C) supported by said preactivated catalyst, wherein said polyolefin (C) has an intrinsic viscosity ($\eta_C$) within the range of the intrinsic viscosity ($\eta_E$) of said high molecular weight polyethylene (A) measured in tetrahydronaphthalene at 135° C., and a main polymerization process which comprises polymerizing propylene alone or copolymerizing propylene with at least one of ethylene or α-olefins having 4 to 12 carbon atoms in the presence of said additionally polymerized preactivated catalyst, an organic metal compound (AL2) and an electron donor (E2), thereby forming a polypropylene containing 50 weight % or more of propylene units, wherein said organic metal compounds (AL1) and (AL2) are each independently a compound of a metal selected from groups I, II, XII or XIII of the periodic table, the amount of the organic metal compound (AL1) is 0.01 to 1000 mole per mole of the transition metal atom, and the total amount of the organic metal compounds (AL1) and (AL2) is 0.05 to 5000 mole per mole of the transition metal atom in the preactivated catalyst, the amount of the electron donor (E1) is 0 to 500 mole per mole of the transition metal atom, and the total amount of said electron donors (E2) and (E1) is 0 to 3000 mole per 1 mole of the transition metal atom in the preactivated catalyst.

* * * * *

UNITED STATES PATENT AND TRADEMARK OFFICE

CERTIFICATE OF CORRECTION

PATENT NO. : 6,156,845
DATED : December 5, 2000
INVENTOR(S) : Saito et al.

It is certified that error appears in the above-identified patent and that said Letters Patent is hereby corrected as shown below:

Drawings,
Sheet 1 of 11: Error in writing on Figure 2. Writing should be changed from Japanese to English as shown below:

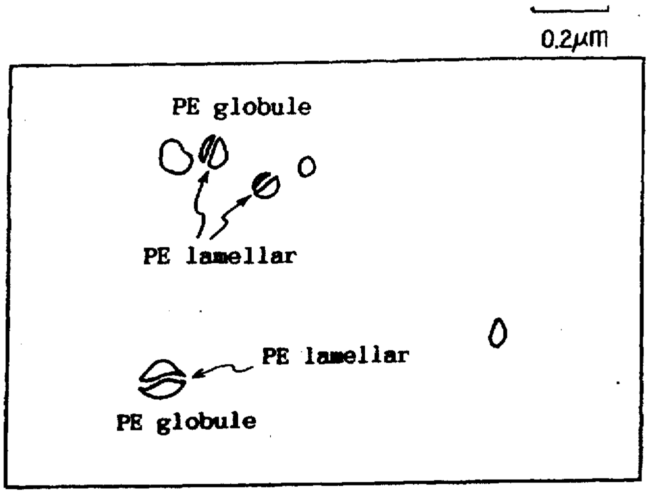

FIG. 2

Signed and Sealed this

Fifth Day of March, 2002

Attest:

Attesting Officer

JAMES E. ROGAN
*Director of the United States Patent and Trademark Office*